(12) United States Patent
Hasuda et al.

(10) Patent No.: US 9,645,476 B2
(45) Date of Patent: *May 9, 2017

(54) CAMERA ACCESSORY, CAMERA ACCESSORY MOUNT, CAMERA BODY AND CAMERA BODY MOUNT

(71) Applicant: NIKON CORPORATION, Tokyo (JP)

(72) Inventors: Masanori Hasuda, Fujisawa (JP); Noriyasu Kotani, Tokyo (JP); Hideaki Hoshikawa, Koshigaya (JP)

(73) Assignee: NIKON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/211,395

(22) Filed: Jul. 15, 2016

(65) Prior Publication Data

US 2016/0320690 A1 Nov. 3, 2016

Related U.S. Application Data

(63) Continuation of application No. 14/722,929, filed on May 27, 2015, which is a continuation of application
(Continued)

(30) Foreign Application Priority Data

Sep. 6, 2010 (JP) ................................ 2010-198864
Jan. 28, 2011 (JP) ................................ 2011-016804

(51) Int. Cl.
*G03B 17/56* (2006.01)
*G03B 17/14* (2006.01)

(52) U.S. Cl.
CPC .......... *G03B 17/565* (2013.01); *G03B 17/14* (2013.01); *G03B 17/566* (2013.01)

(58) Field of Classification Search
USPC ........................................................ 396/531
See application file for complete search history.

(56) References Cited

U.S. PATENT DOCUMENTS

| 4,307,954 A | 12/1981 | Ludwig |
| 4,659,203 A | 4/1987 | Niwa et al. |

(Continued)

FOREIGN PATENT DOCUMENTS

| JP | S56-123528 A | 9/1981 |
| JP | S60-053943 A | 3/1985 |

(Continued)

OTHER PUBLICATIONS

Apr. 28, 2015 Office Action issued in Japanese Patent Application No. 2012-153745.
(Continued)

*Primary Examiner* — Clayton E LaBalle
*Assistant Examiner* — Dennis Hancock
(74) *Attorney, Agent, or Firm* — Oliff PLC

(57) ABSTRACT

A camera accessory can be detachably engaged with a camera body that includes a camera body mount, and is equipped with an accessory mount assuming a bayonet structure with a first tab, a second tab and a third tab set over intervals in a circumferential direction running along a circumference of a circle and projecting from the circumference along a radial direction. The accessory mount can be inserted through the camera body mount without any of the first through third tabs being hindered by any of three camera body-side tabs at the camera body mount, as long as the accessory mount is inserted into the camera body mount at a correct interlock phase. The accessory mount includes a restricting member disposed near the third tab.

4 Claims, 35 Drawing Sheets

Related U.S. Application Data

No. 13/225,959, filed on Sep. 6, 2011, now Pat. No. 9,075,287.

(56) References Cited

U.S. PATENT DOCUMENTS

| | | | |
|---|---|---|---|
| 4,802,738 | A | 2/1989 | Ando et al. |
| 5,461,445 | A | 10/1995 | Kikuchi |
| 5,778,271 | A | 7/1998 | Kawasaki et al. |
| 5,946,516 | A | 8/1999 | Yoshida et al. |
| 6,351,612 | B1 | 2/2002 | Misawa |
| 2005/0025472 | A1 | 2/2005 | Sugita et al. |
| 2005/0030410 | A1 | 2/2005 | Tsukatani et al. |
| 2005/0031338 | A1 | 2/2005 | Koyama et al. |
| 2006/0216023 | A1 | 9/2006 | Tokiwa et al. |
| 2010/0046102 | A1 | 2/2010 | Ho |
| 2012/0201532 | A1 | 8/2012 | Hasuda et al. |

FOREIGN PATENT DOCUMENTS

| | | |
|---|---|---|
| JP | H03-229229 A | 10/1991 |
| JP | H04-60624 A | 2/1992 |
| JP | H05-127242 A | 5/1993 |
| JP | H09-211645 A | 8/1997 |
| JP | S63-017436 A | 1/1998 |
| JP | 2005-070712 A | 3/2005 |
| JP | 2005-099066 A | 4/2005 |
| JP | 2005-140846 A | 6/2005 |
| JP | 2008-015267 A | 1/2008 |
| JP | 2010-250149 A | 11/2010 |

OTHER PUBLICATIONS

Jun. 4, 2013 Office Action issued in Japanese Application No. 2010/282918.
Feb. 15, 2013 Office Action issued in U.S. Appl. No. 13/225,919.
May 24, 2013 Office Action issued in U.S. Appl. No. 13/225,959.
Nov. 15, 2013 Office Action issued in U.S. Appl. No. 13/225,959.
May 15, 2014 Office Action issued in U.S. Appl. No. 13/225,959.
Nov. 20, 2014 Office Action issued in U.S. Appl. No. 13/225,959.
Mar. 17, 2015 Notice of Allowance issued in U.S. Appl. No. 13/225,959.
Feb. 17, 2016 Office Action issued in U.S. Appl. No. 14/722,929.
Jul. 13, 2015 Office Action issued in U.S. Appl. No. 14/722,929.

FRONT ←——————→ REAR

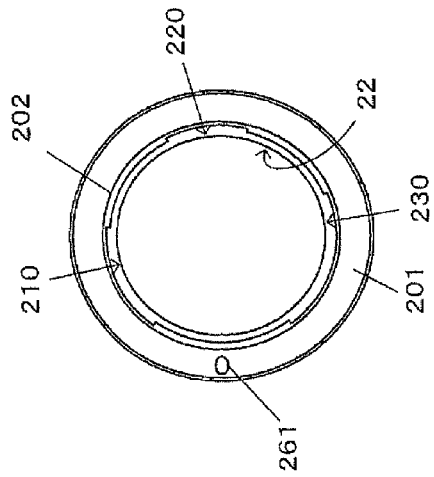
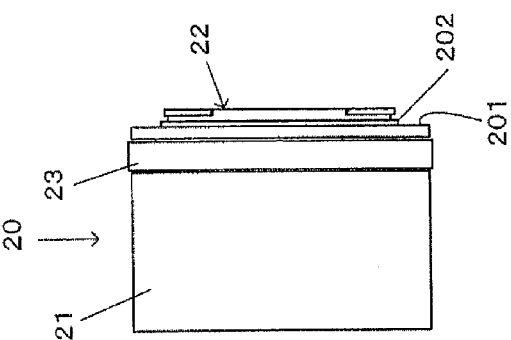
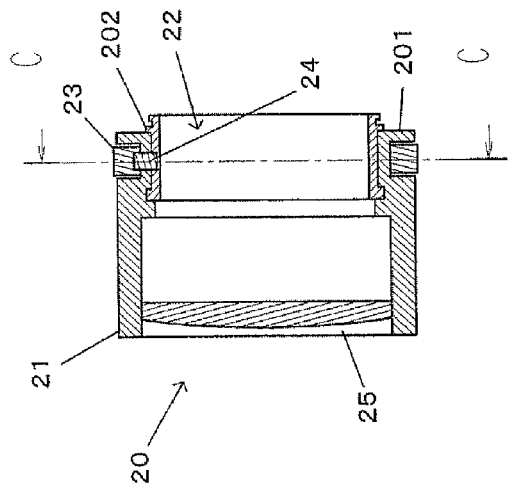

CAMERA ACCESSORY, CAMERA ACCESSORY MOUNT, CAMERA BODY AND CAMERA BODY MOUNT

CROSS-REFERENCE TO THE RELATED APPLICATION

This application is a Continuation of U.S. application Ser. No. 14/722,929 filed May 27, 2015, which is a Continuation of U.S. application Ser. No. 13/225,959 filed Sep. 6, 2011, which claims priority to the following Japanese Patent Applications:

Japanese Patent Application No. 2010-198864 filed Sep. 6, 2010

Japanese Patent Application No. 2011-016804 filed Jan. 28, 2011; the entire contents of all applications being incorporated herein by reference.

BACKGROUND OF THE INVENTION

1. Field of the Invention

The present invention relates to an accessory mount and a body mount adopting a bayonet structure, via which a camera accessory and a camera body can be detachably engaged with each other, and a camera accessory and a camera body equipped with the mounts.

2. Description of Related Art

A camera accessory, such as an exchangeable lens, and a camera body assuming structures that allow them to be detachably engaged with each other via a mount system adopting a bayonet structure are known in the related art. Such camera accessory and camera body are engaged with each other by first inserting a camera accessory mount through a camera body mount at the correct interlock phase and then rotating the camera accessory along a predetermined direction (mounting direction) around the incident light optical axis. The camera accessory can be dismounted from the camera body by first rotating the camera accessory engaged with the camera body along a direction (dismounting direction) opposite from the mounting direction and then pulling the camera accessory forward relative to the camera body.

Japanese Laid Open Patent Publication No. H5-127242 discloses a system that includes a camera accessory and a camera body structured as described above, whereby a projecting portion formed at the camera accessory comes in contact with a side end of a tab at the camera body mount when the camera accessory is being mounted at or dismounted from the camera body, so as to restrict the range of rotation of the camera accessory along the mounting direction or the dismounting direction.

SUMMARY OF THE INVENTION

However, the optimal operability of the mounting/dismounting operation is not fully accomplished in the related art.

A camera accessory that can be detachably engaged with a camera body that includes a camera body mount, and is equipped with an accessory mount assuming a bayonet structure with a first tab, a second tab and a third tab set over intervals in a circumferential direction running along a circumference of a circle with a predetermined diameter and projecting from the circumference along a radial direction, according to a first aspect of the present invention, the accessory mount can be inserted through the camera body mount without any of the first through third tabs being hindered by any of three camera body-side tabs at the camera body mount, as long as the accessory mount is inserted into the camera body mount at a correct interlock phase; the first tab, the second tab and the third tab extend over varying lengths along the circumferential direction; the first tab extends over a greatest length along the circumferential direction among the first through third tabs; the third tab extends over a smallest length along the circumferential direction among the first through third tabs; the accessory mount includes a restricting member disposed near the third tab; when the first through third tabs are rotated along the circumference in a first rotating direction in order to mount the accessory mount, having been inserted at the correct interlock phase, at the body mount, the restricting member comes into contact with a side end of one camera body-side tab among the camera body-side tabs, thereby restricting a rotation range in the first rotating direction; and when the first through third tabs are rotated along the circumference in a second rotating direction opposite from the first rotating direction in order to dismount the accessory mount from the body mount, the restricting member comes into contact with a side end of a camera body-side tab different from the one camera body-side tab, thereby restricting a rotation range in the second rotating direction.

According to a second aspect of the present invention, in the camera accessory according to the first aspect, it is preferable that insertion of the accessory mount through the camera body mount is disallowed if the accessory mount is positioned at a phase other than the correct interlock phase, with at least two tabs among the first tab, the second tab and the third tab coming into contact with at least two of the camera body-side tabs.

According to a third aspect of the present invention, in the camera accessory according to the first aspect, it is preferable that the first tab at the accessory mount having been inserted at the correct interlock phase and engaged with the camera body mount overlaps a camera body-side tab assuming an uppermost position when the camera body is set with a longitudinal orientation achieved by rotating the upright camera body assuming a lateral orientation by approximately 90°.

According to a fourth aspect of the present invention, in the camera accessory according to the first aspect, the first tab, the second tab and the third tab may be fixed to a main body of the camera accessory.

According to a fifth aspect of the present invention, in the camera accessory according to the first aspect, the first tab, the second tab and the third tab may be rotatably disposed so as to be allowed to rotate along the circumferential direction relative to a main body of the camera accessory.

According to a sixth aspect of the present invention, in the camera accessory according to the first aspect, it is preferable that the first tab, the second tab and the third tab are made up with a tab present over an angular range of 56.5° to 115°, a tab present over an angular range of 172.5° to 214.5° and a tab present over an angular range of 272° to 343.5° at the accessory mount engaged with the body mount, along a clockwise direction relative to a nine o'clock direction viewed from a rear side of the accessory mount.

According to a seventh aspect of the present invention, in the camera accessory according to the first aspect, it is preferable that angles defining circular arcs representing lengths of the first tab, the second tab and the third tab extending along a circumferential direction are respectively 71.5°, 58.5° and 42°.

According to an eighth aspect of the present invention, in the camera accessory according to the seventh aspect, it is preferable that when the first tab, the second tab and the third tab are rotated along the circumferential direction by 40.5° in order to mount the accessory mount, having been inserted at the correct interlock phase, with the body mount, the accessory mount becomes engaged with the body mount.

An accessory mount according to a ninth aspect of the present invention is disposed at the camera accessory according to the first aspect.

A camera body with which a camera accessory that includes an accessory mount can be detachably mounted, equipped with a body mount adopting a bayonet structure with a first tab, a second tab and a third tab disposed over intervals along a circumferential edge of a circular opening at the camera body and projecting from the circumferential edge along a radius of the circular opening, according to a tenth aspect of the present invention, the body mount allows insertion of the accessory mount as long as the accessory mount is inserted at a correct interlock phase, without any of the first tab, the second tab and the third tab coming into contact with any of three accessory-side tabs at the accessory mount; the first tab and the second tab are disposed next to each other; an interval between the first tab and the second tab is narrowest among intervals between tabs set next to each other among the first through third tabs; and an angle by which the accessory mount, having been inserted at the correct interlock phase, is allowed to rotate relative to the body mount is defined by the interval between the first tab and the second tab.

According to a 11th aspect of the present invention, in the camera body according to the first aspect, it is preferable that the first tab includes a first end portion that faces opposite the second tab disposed next to the first tab; the second tab includes a second end portion that faces opposite the first tab disposed next to the second tab; and the angle by which the accessory mount, having been inserted at the correct interlock phase, is allowed to rotate relative to the body mount is an angle representing a range between a phase at which a restricting member disposed at the accessory mount comes into contact with the first end portion and a phase at which the restricting member comes into contact with the second end portion.

According to a 12th aspect of the present invention, in the camera body according to the tenth aspect of the present invention, it is preferable that the body mount disallows insertion of the accessory mount at a phase other than the correct interlock phase with at least two of the first tab, the second tab and the third tab coming into contact with at least two of the accessory-side tabs.

According to a 13th aspect of the present invention, in the camera body according to the tenth aspect, it is preferable that the first tab assumes an uppermost position when the camera body is set upright in a lateral orientation; the first tab and the third tab are disposed next to each other; the first tab includes a third end portion that faces opposite the third tab disposed next to the first tab; and when the first tab and either the second tab or the third tab come into contact with two of the accessory-side tabs at a total of two contact locations, a contact area at the first tab includes an area near the third end portion thereof.

According to a 14th aspect of the present invention, in the camera body according to the 13th aspect, it is preferable that the opening is formed at a front side of the camera body; and the first tab extends along a circumference of the opening with a part thereof passing through a point at a top center of the opening when the camera body assumes the lateral orientation.

According to a 15th aspect of the present invention, the camera body according to the 14th aspect may further comprise elastic members that individually apply force to the accessory-side tabs over ranges extending between the accessory-side tabs and the first through third tabs, toward a rear surface of the camera body when the accessory-side tabs are rotated along the circumference of the opening in order to mount the accessory mount, having been inserted at the correct interlock phase with the body mount, wherein: the first tab, the second tab and the third tab include restricting portions that restrict movement of the accessory-side tabs by coming into contact with the accessory-side tabs having moved toward a front side of the camera body against the force applied by the elastic members.

According to a 16th aspect of the present invention, in the camera body according to the 15th aspect, a restricting portion included in the first tab may assume a position directly above a center of the opening along a vertical direction when the camera body is set in the lateral orientation.

According to a 17th aspect of the present invention, in the camera body according to the 14th aspect, it is preferable that the first tab, the second tab and the third tab extend over varying lengths along the circumference of the opening; and of the intervals each present between two consecutive tabs among the first tab, the second tab and the third tab, an interval between two tabs, occupying positions on two sides of a point set at a bottom center of the opening when the camera body assumes the lateral orientation, is largest.

According to an 18th aspect of the present invention, in the camera body according to the 14th aspect, it is preferable that the first tab, the second tab and the third tab are made up with a tab present over an angular range of 76° to 130°, a tab present over an angular range of 177.5° to 226° and a tab present over an angular range of 304.5° to 15° (375°) along a counterclockwise direction relative to a three o'clock direction when the opening at the camera body assuming the lateral orientation is viewed from a front side.

According to a 19th aspect of the present invention, in the camera body according to the tenth aspect, it is preferable that angular ranges measured along the circumferential edge of the opening, which represent sizes of the first tab, the second tab and the third tab are respectively 54°, 48.5° and 70.5°.

According to a 20th aspect of the present invention, in the camera body according to the tenth aspect of the present invention, it is preferable that angular ranges measured along the circumferential edge of the opening, which represent intervals between tabs disposed next to each other among the first through third tabs are 47.5° for the interval between the first tab and the second tab, 78.5° for the interval between the second tab and the third tab and 61° for the interval between the third tab in the first tab.

According to 21st aspect of the present invention, in the camera body according to the 18th aspect, it is preferable that when the accessory-side tabs are rotated along the circumference of the opening by 40.5° in order to mount the accessory mount, having been inserted at the correct interlock phase, with the body mount, the accessory mount becomes engaged with the body mount.

According to a 22nd aspect of the present invention, in the camera body according to the tenth aspect, it is preferable that when an accessory mount according to claim 12 is positioned at the correct interlock phase, the body mount allows insertion of the accessory mount without any of the first tab, the second tab and the third tab coming into contact with any of three accessory-side tabs at the accessory mount, and disallows insertion of the accessory mount at a phase other than the correct interlock phase with at least two of the first tab, the second tab and the third tab coming into contact with at least two of the accessory-side tabs.

A body mount according to a 23rd aspect of the present invention is disposed at the camera body according to the tenth aspect.

According to a 24th aspect of the present invention, in the camera accessory according to the first aspect, it is preferable that when the camera accessory mount is positioned at the correct interlock phase relative to a body mount disposed at a camera body according to claim 10, insertion through the camera body mount is allowed without any of the first tab, the second tab and the third tab coming into contact with any of three camera body-side tabs at the camera body mount and at a phase other than the correct interlock phase, insertion through the camera body mount is disallowed with at least two tabs among the first tab, the second tab and the third tab coming into contact with at least two of the camera body-side tabs.

An accessory mount according to a 25th aspect of the present invention is disposed at the camera accessory according to the 24th aspect.

BRIEF DESCRIPTION OF THE DRAWINGS

FIGS. 22A through 22D illustrate the variation example.

DESCRIPTION OF PREFERRED EMBODIMENTS

First Embodiment

Figure 1:
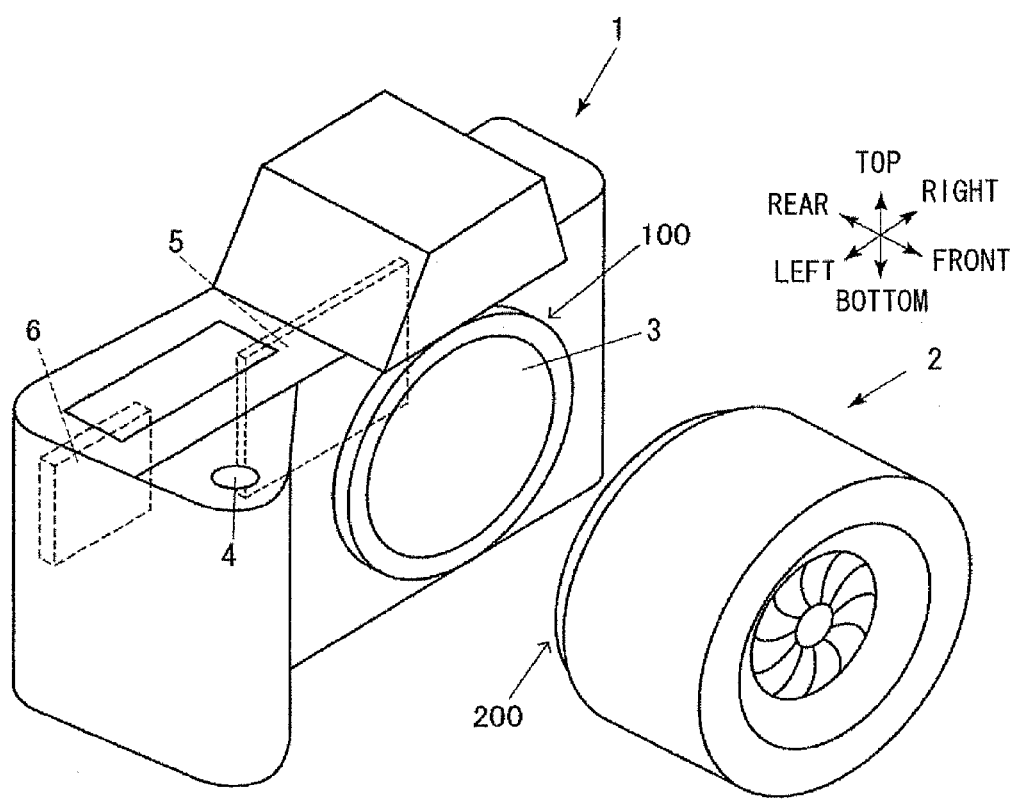
FIG. 1 is a perspective schematically illustrating a camera body with exchangeable lenses and a photographic lens that can be detachably mounted at the camera body, in conjunction with which the present invention may be adopted.

In reference to FIGS. 1 through 19, the camera accessory, the accessory mount, the camera body and the body mount achieved in a first embodiment of the present invention are described. FIG. 1 is a schematic perspective of a camera body 1 with an exchangeable photographic lens 2 that can be detachably mounted at the camera body 1, in conjunction with which the present invention is adopted. A shutter release button 4, an image sensor 5 and a control circuit 6 that controls various units of the camera body 1 are disposed at the camera body 1. Reference numeral 3 indicates a photographic optical path through which a subject image departing the photographic lens 2 is guided to the image sensor 5.

On the front side of the camera body 1, a body mount 100 assuming a bayonet structure is disposed via which a camera accessory, e.g., the photographic lens 2 or a converter lens used to adjust the focal length, is mounted at the body mount 100. On the rear side of the photographic lens 2, a lens mount, i.e., an accessory mount 200, via which the photographic lens 2 can be detachably mounted at the body mount 100, is disposed. It is to be noted that FIG. 1 does not include detailed illustrations of the structures adopted in the body mount 100 and the accessory mount 200. In addition, in the description of the embodiment, the front side (toward the subject) of the camera body 1 on which the photographic lens 2 is mounted is referred to as "forward" and the rear side of the camera body 1 where the image sensor 5 is mounted, is referred to as "rearward". A top-bottom direction, a left-right direction and a front-rear direction are defined as indicated in FIG. 1 for the camera body 1. FIG. 1 shows that the top-bottom direction relative to the camera body 1 matches the vertical direction. The attitude of the camera 1 shown in FIG. 1 is referred to as an upright attitude or a lateral orientation. The attitude of the camera body 1 assumed by rotating the camera body with the lateral orientation by 90° clockwise or counterclockwise viewed from the front side is referred to as a longitudinal orientation.

—Body Mount 100—

Figure 2:
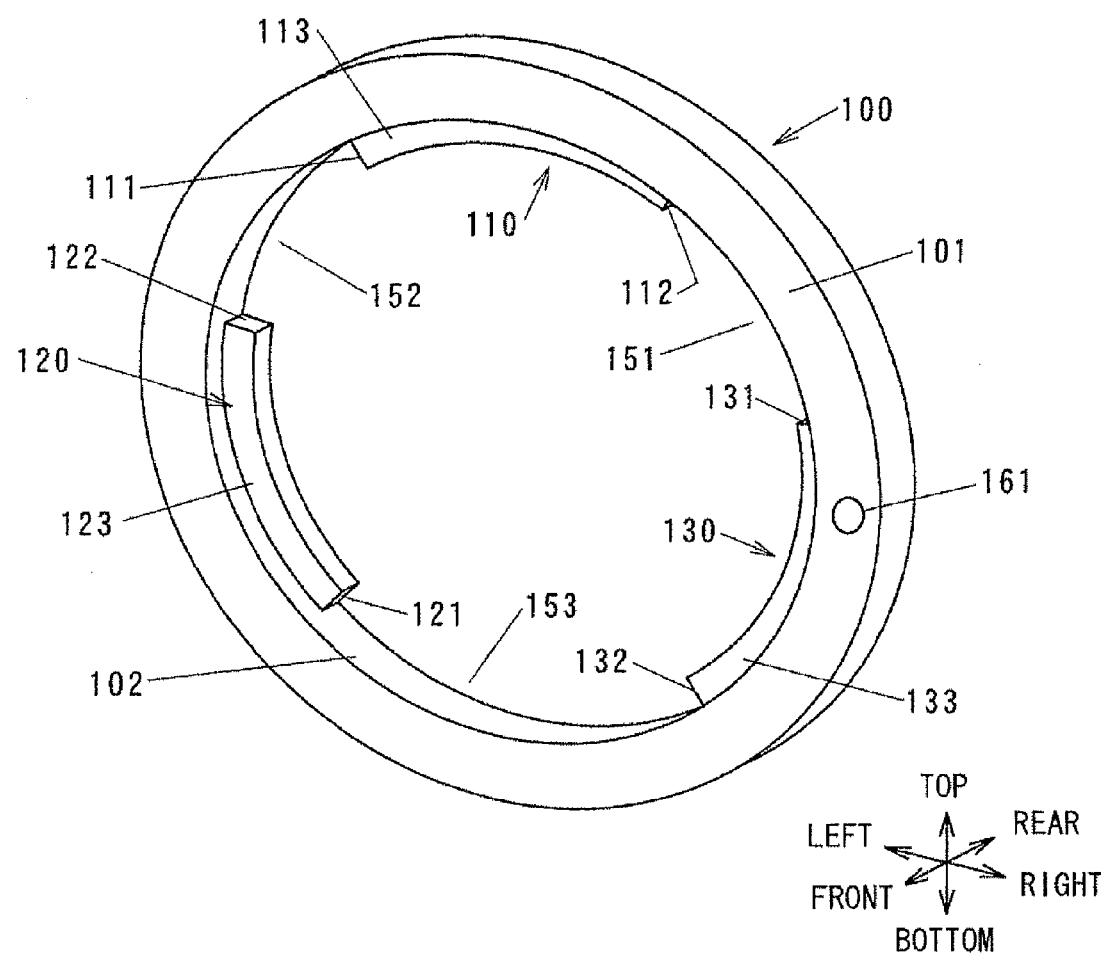
FIG. 2 is a perspective schematically illustrating the structure of the body mount, viewed along a diagonal direction from a front right viewpoint relative to the camera body.

FIG. 2 is a schematic perspective illustrating the structure of the body mount 100 viewed along a diagonal direction from a front right viewpoint relative to the camera body 1. The body mount 100 adopts a bayonet structure that includes three tabs (body-side tabs) set apart from one another along the circumferential edge of a circular opening (photographic optical path) at the camera body 1, each projecting inward from the outer side of the opening circumference. Among the three body-side tabs, the body-side tab located at the uppermost position is referred to as a body-side first tab 110, the body-side tab located next to the body-side first tab 110 along the counterclockwise direction in the figure is referred to as a body-side second tab 120 and the body-side tab located next to the body-side second tab 120 along the counterclockwise direction is referred to as a body-side third tab 130.

The space created between two consecutive body-side tabs, through which a tab (accessory-side tab) at the accessory mount 200 passes when the photographic lens 2 is being mounted or dismounted as explained later, is referred to as a body-side gap. The body-side gap present between the body-side third tab 130 and the body-side first tab 110 is referred to as a body-side first gap 151, the body-side gap located next to the body-side first gap 151 along the counterclockwise direction in the figure is referred to as a body-side second gap 152 and the body-side gap located next to the body-side second gap along the counterclockwise direction is referred to as a body-side third gap 153.

The surface of the body-side first tab 110 facing forward is referred to as a front surface 113, the counterclockwise side end of the body-side first tab 110 facing the body-side second gap 152 is referred to as a first side end 111, and the clockwise side end of the body-side first tab 110 facing the body-side first gap 151 is referred to as a second side end 112. Likewise, the surface of the body-side second tab 120 facing forward is referred to as a front surface 123, the side end of the body-side second tab 120 facing the body-side third gap 153 is referred to as a first side end 121 and the side end of the body-side second tab 120 facing the body-side second gap 152 is referred to as a second side end 122. The surface of the body-side third tab 130 facing forward is referred to as a front surface 133, the side end of the body-side third tab 130 facing the body-side first gap 151 is referred to as a first side end 131, and the side end of the body-side third tab 130 facing the body-side third gap 153 is referred to as a second side end 132. It is to be noted that the first side ends 111, 121 and 131 are tab ends formed facing toward a mounting direction, to be described in detail later, whereas the second side ends 112, 122 and 132 are tab ends formed facing toward a dismounting direction (opposite the mounting direction).

It is to be noted that, although not shown in FIG. 2, the surface of the body-side first tab 110 facing rearward is referred to as rear surface 114. Likewise, the surfaces of the body-side second tab 120 and the body-side third tab 130 facing rearward are respectively referred as a rear surface 124 and a rear surface 134.

Reference numeral 101 indicates a body mount reference surface. The body mount reference surface 101 is a ring-shaped flat surface formed so as to face toward the front side. As the photographic lens 2 is mounted at the camera body 1, the body mount reference surface 101 comes into contact with an accessory mount reference surface 201 of the accessory mount 200, which is to be described in detail later, thereby regulating the position assumed by the photographic lens 2 along the front-rear direction. Reference numeral 102 indicates an inner circumferential surface of the cylindrical body mount 100. The inner circumferential surface 102, which interlocks with a fitting portion of the accessory mount 200, to be detailed below, is used as a reference surface, in reference to which the optical axis of the photographic lens 2 is aligned with the optical axis of the camera body 1 (the central axis of the photographic optical path 3). Reference numeral 161 indicates a pin hole through which a pin (not shown) projects out or retracts in. The pin projecting out through the pin hole 161 disallows rotation of the mounted photographic lens 2 relative to the camera body 1.

—Accessory Mount 200—

Figure 3:
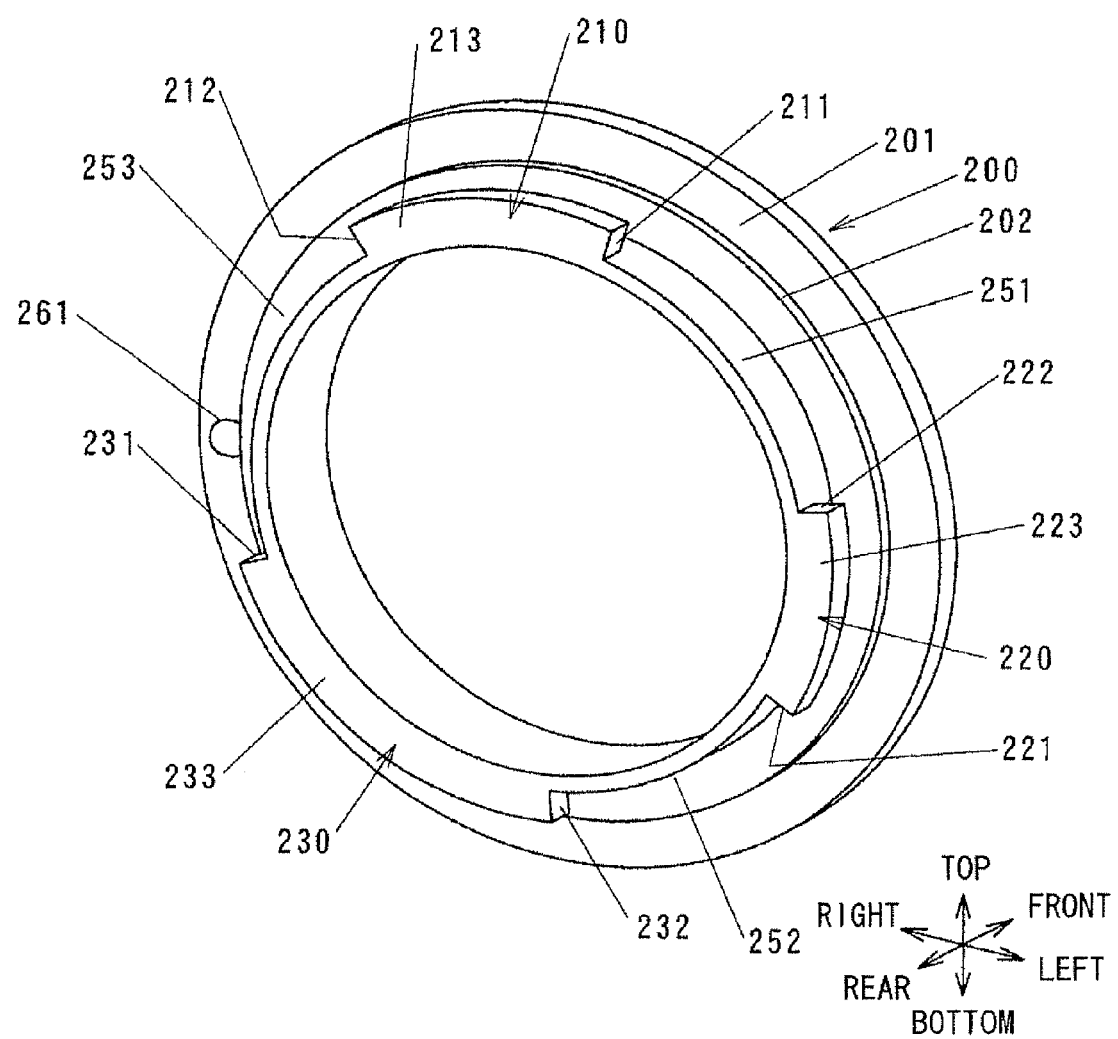
FIG. 3 is a perspective schematically illustrating the structure of the accessory mount, viewed along a diagonal direction from a rear left viewpoint relative to the photographic lens.

FIG. 3 is a perspective schematically illustrating the structure of the accessory mount 200 viewed along a diagonal direction from a rear left viewpoint relative to the photographic lens 2. It is to be noted that FIG. 3 shows the accessory mount 200 with the photographic lens 2 fully mounted at the camera body 1 (mounting complete state), i.e., in a photographing-enabled state. This means that the top-bottom/left-right orientation of the accessory mount 200 shown in FIG. 3 matches the top-bottom/left-right orientation of the camera body 1. Unless specifically noted, the following description is given by assuming that the top-bottom/left-right orientation of the accessory mount 200 is the orientation in the mounting complete state.

The accessory mount 200 adopts a bayonet structure that includes three tabs (accessory-side tabs) set apart from one another along the circumferential direction, each projecting from the inner side of the circumference toward the outer side of the circumference. Among the three accessory-side tabs, the accessory-side tab located at the uppermost position is referred to as an accessory-side first tab 210, the accessory-side tab located next to the accessory-side first tab 210 along the clockwise direction in the figure is referred to as an accessory-side second tab 220 and the accessory-side tab located next to the accessory-side second tab 220 along the clockwise direction is referred to as an accessory-side third tab 230.

The space created between two consecutive accessory-side tabs, through which a body-side tab passes when the photographic lens 2 is being mounted or dismounted as explained later, is referred to as an accessory-side gap. The accessory-side gap present between the accessory-side first tab 210 and the accessory-side second tab 220 is referred to as an accessory-side first gap 251, the accessory-side gap located next to the accessory-side first gap 251 along the clockwise direction in the figure is referred to as an accessory-side second gap 252 and the accessory-side gap located next to the accessory-side second gap along the clockwise direction is referred to as an accessory-side third gap 253.

The surface of the accessory-side first tab 210 facing rearward is referred to as a rear surface 213, the side end of the accessory-side first tab 210 facing the accessory-side first gap 251 is referred to as a first side end 211 and the side end of the accessory-side first tab 210 facing the accessory-side third gap 253 is referred to as a second side end 212. Likewise, the surface of the accessory-side second tab 220 facing rearward is referred to as a rear surface 223, the side end of the accessory-side second tab 220 facing the accessory-side second gap 252 is referred to as a first side end 221, and the side end of the accessory-side second tab 220 facing the accessory-side first gap 251 is referred to as a second side end 222. The surface of the accessory-side third tab 230 facing rearward is referred to as a rear surface 233, the side end of the accessory-side third tab 230 facing the accessory-side third gap 253 is referred to as a first side end 231 and the side end of the accessory-side third tab 230 facing the accessory-side second gap 252 is referred to as a second side end 232. The first side ends 211, 221 and 231 are tab ends formed toward the mounting direction to be described in detail later, whereas the second side ends 212, 222 and 232 are tab ends facing toward a direction (dismounting direction) opposite from the mounting direction.

It is to be noted that, although not shown in FIG. 3, the surface of the accessory-side first tab 210 facing forward is referred to as a front surface 214. Likewise, the surfaces of the accessory-side second tab 220 and the accessory-side third tab 230 facing forward are respectively referred to as a front surface 224 and a front surface 234.

Reference numeral 201 indicates an accessory mount reference surface. The accessory mount reference surface 201 is a ring-shaped flat surface formed so as to face rearward, and is in contact with the body mount reference surface 101 when the photographic lens 2 is fully mounted. Reference numeral 202 indicates a fitting portion. The fitting portion 202 is a cylindrical portion that fits at the inner circumferential surface 102 of the body mount 100 and is used for reference when aligning the optical axis of the photographic lens 2 with the optical axis of the camera body 1 (the central axis of the photographic optical path 3).

Reference numeral 261 indicates a pin hole. As a pin (not shown), which projects out or retracts into the pin hole 161 at the body mount 100, is inserted through the pin hole 261, rotation of the fully mounted photographic lens 2 relative to the camera body 1 (body mount 100) becomes disallowed and the photographic lens 2 thus becomes locked.

Figure 4:
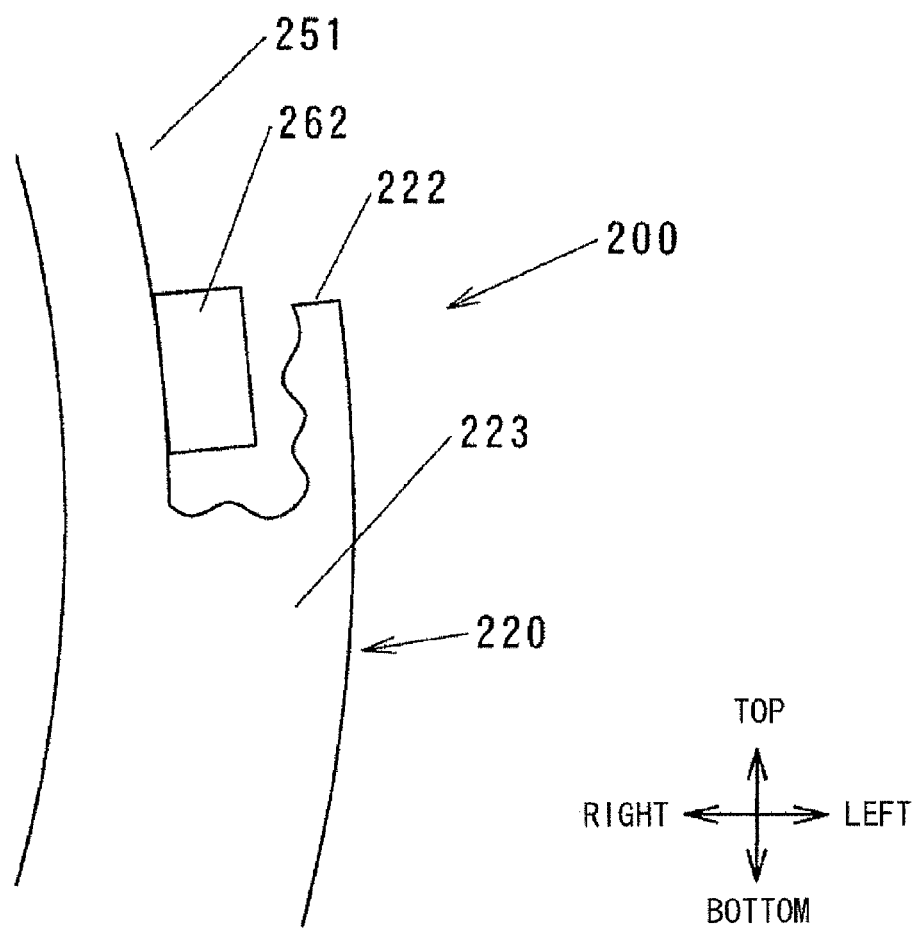
FIG. 4 indicates the position at which a restricting member is disposed.

Although not shown in FIG. 3, a restricting member 262, which limits the rotation range of the photographic lens 2 (accessory mount 200) relative to the camera body 1 (body mount 100) while the photographic lens 2 is mounted or dismounted, is disposed frontward relative to the accessory-side second tab 220 near its second side end 222, as shown in FIG. 4. The restriction of the rotation range achieved via the restricting member 262 will be described in detail later. The restricting member 262 may be, for instance, a headed pin screwed in from the outer side of the accessory mount 200 along the radial direction.

—Positions of Body-Side Tabs and Body-Side Gaps—

Figure 5:
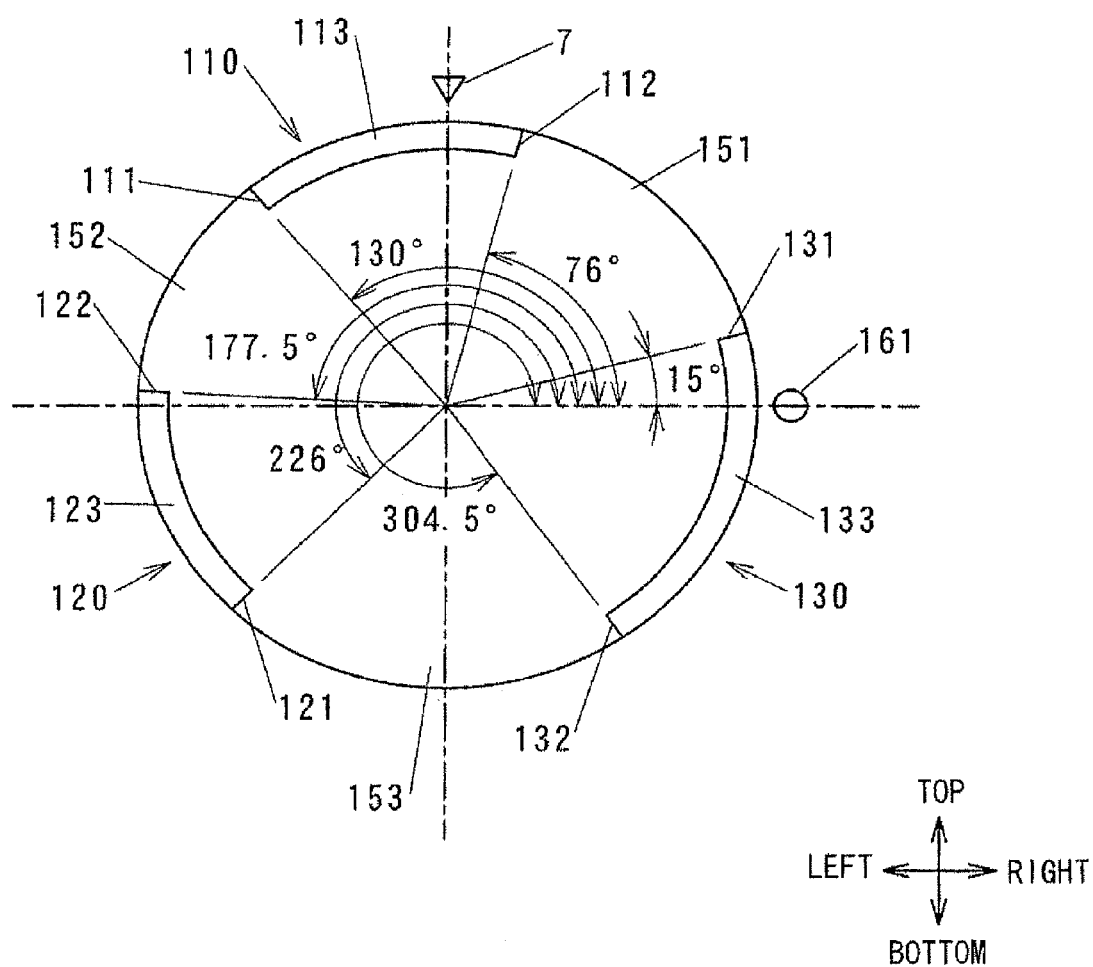
FIG. 5 indicates the positions of the body-side tabs and the body-side gaps at the body mount viewed from the front side of the camera body.

FIG. 5 indicates the positions of the body-side tabs and the body-side gaps at the body mount 100 viewed from the front side of the camera body 1. A reference angular position is taken along the three o'clock direction at the body mount 100 viewed from the front side of the camera body 1 and various angles representing the positions at which the body-side tabs are disposed, are assumed along the counterclockwise direction relative to the three o'clock direction. Namely, the body-side first tab 110 extends over an angular range of 76° to 130°, the body-side second tab 120 extends over an angular range of 177.5° to 226° and the body-side third tab 130 extends over an angular range of 304.5° to 15° (375°).

The sizes of the individual body-side tabs 110 to 130 can each be indicated by the corresponding angular range along the circumferential edge of the circular opening at the body mount 100. Namely, the body-side first tab 110 has a 54° angular range, the body-side second tab 120 has a 48.5° angular range and the body-side third tab 130 has a 70.5° angular range. Likewise, the sizes of the individual body-side gaps 151 to 153 can each be indicated by the corresponding angular range along the circumferential edge of the circular opening at the camera body 1. Namely, the body-side first gap 151 has a 61° angular range, the body-side second gap 152 has a 47.5° angular range and the body-side third gap 153 has a 78.5° angular range.

Reference numeral 7 in FIG. 5 indicates an index mark at the camera body 1. The index mark 7 is used as a reference mark when mounting the photographic lens 2 at the camera body 1. The index mark 7 assumes a 90° angular position counterclockwise relative to the reference three o'clock direction taken at the body mount 100 viewed from the front side of the camera body 1.

—Positions of Accessory-Side Tabs and Accessory-Side Gaps—

Figure 6:
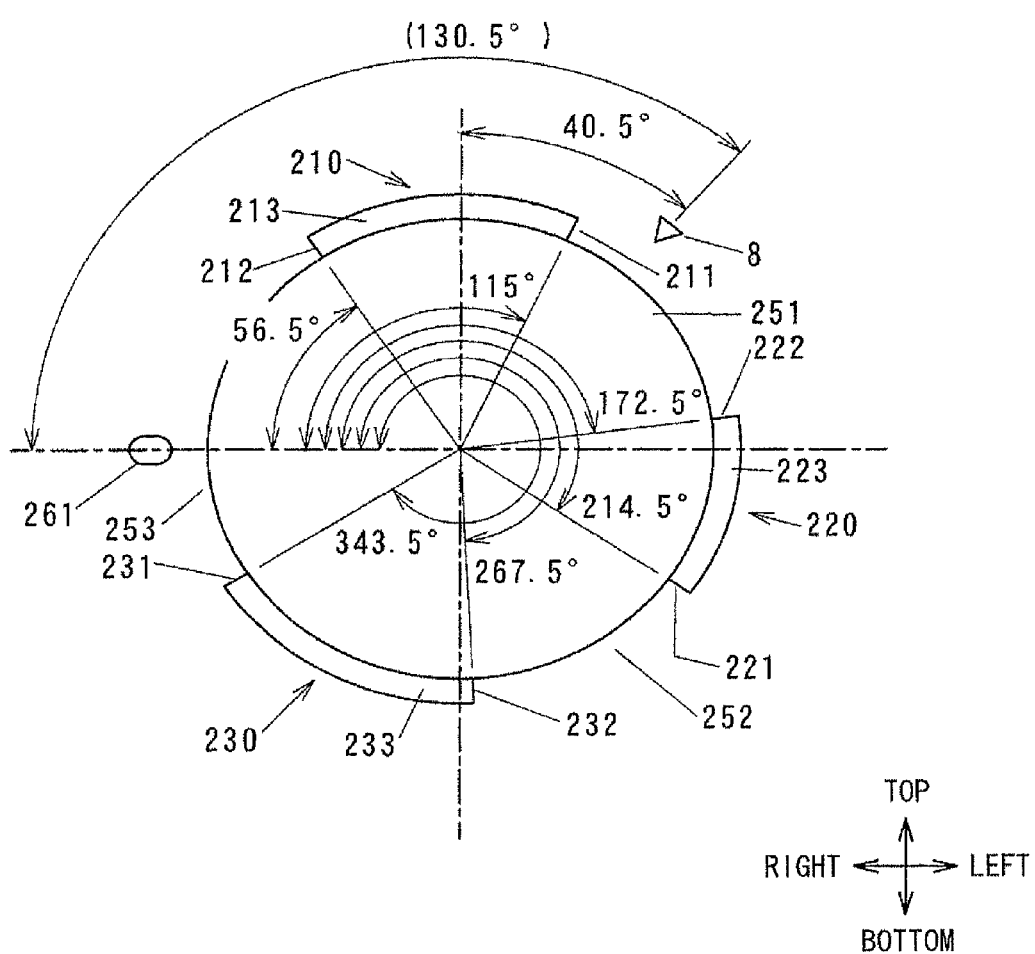
FIG. 6 indicates the positions of the accessory-side tabs and the accessory-side gaps at the accessory mount viewed from the rear side of the photographic lens.

FIG. 6 indicates the positions of the accessory-side tabs and the accessory-side gaps at the accessory mount 200 viewed from the rear side of the photographic lens 2. A reference angular position is taken along the nine o'clock direction at the accessory mount 200 viewed from the rear side of the photographic lens 2 fully mounted at the camera body. Various angles representing the positions at which the accessory-side first tabs are disposed, are assumed along the clockwise direction relative to the nine o'clock direction. Namely, the accessory-side first tab 210 extends over an angular range of 56.5° to 115°, the accessory-side second tab 220 extends over an angular range of 172.5° to 214.5°, and the accessory-side third tab 230 extends over an angular range of 267.5° to 343.5°.

The ranges over which the accessory-side tabs 210 to 230 extend along the circumference of the accessory mount 200 can each be indicated by the corresponding angular range along the circumference of the accessory mount 200. Namely, the accessory-side first tab 210 has a 58.5° angular range, the accessory-side second tab 220 has a 42° angular range and the accessory-side third tab 230 has a 76° angular range. Likewise, the sizes of the individual accessory-side gaps 251 to 253 can each be indicated by the corresponding angular range along the circumference of the accessory mount 200. Namely, the accessory-side first gap 251 has a 57.5° angular range, the accessory-side second gap 252 has a 53° angular range and the accessory-side third gap 253 has a 73° angular range.

Reference numeral 8 in FIG. 6 indicates an index mark at the photographic lens 2. The index mark 8 is used as a reference mark when mounting the photographic lens 2 at the camera body 1. The index mark 8 assumes a 130.5° angular position clockwise relative to the nine o'clock direction taken at the accessory mount 200 viewed from the rear side of the photographic lens 2 in the mounting complete state. This angle is equal to a value representing the sum of 90° and a mounting angle of 40.5° to be described in detail later.

As explained earlier, the restricting member 262 is disposed frontward relative to the accessory-side second tab 220 near its second side end 222. This means that the restricting member 262 is disposed near the accessory-side second tab 220 extending over the shortest range along the circumference of the accessory mount 200 (with the smallest angular range along the circumference of the accessory mount 200).

—Mounting the Photographic Lens 2 at the Camera Body 1—

Figure 7:
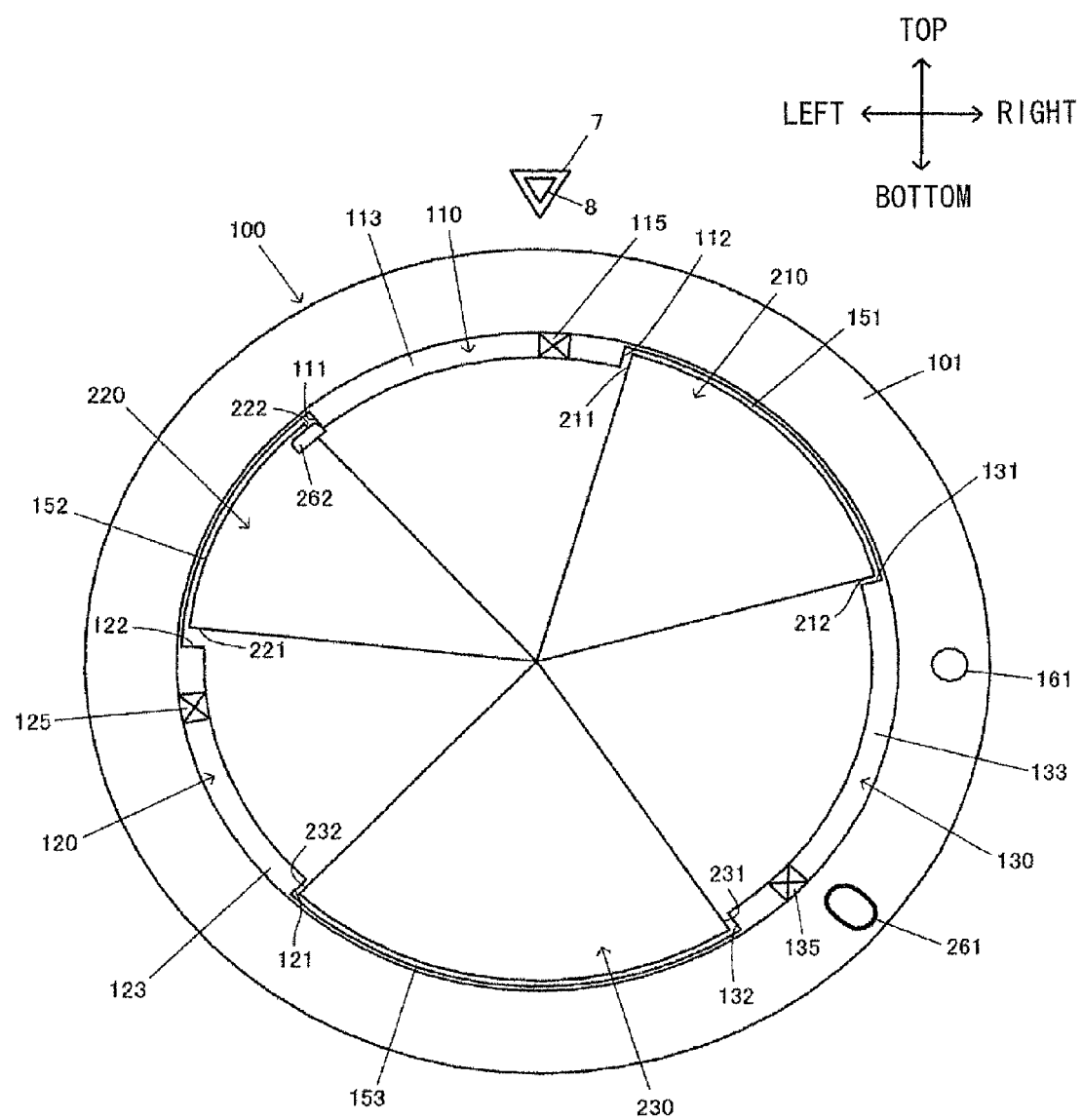
FIG. 7 shows a specific state of interference (state of overlap) between the body-side tabs and the accessory-side tabs.

The photographic lens 2 structured as described above is mounted at the camera body 1 through the following procedure. It is to be noted that the rotational position assumed by the photographic lens 2 relative to the camera body 1 when the axis extending along the front-rear direction through the center of the photographic optical path 3 of the camera body 1 and the optical axis of the photographic lens 2 are aligned with each other is to be hereafter referred to simply as an interlock phase. While sustaining the alignment of the axis extending along the front-rear direction through the center of the photographic optical path 3 at the camera body 1 and the optical axis of the photographic lens 2, the photographic lens 2 is mounted at the camera body 1 by aligning the rotational position of the index mark at the photographic lens 2 with the rotational position of the index mark at the camera body 1. When the two index marks are aligned, the photographic lens 2 and the camera body 1 achieve a positional relation relative to each other in which the body-side tabs 110 to 130 and the accessory-side tabs 210 to 230 do not interfere with each other, as shown in FIG. 7, and the accessory mount 200 can be thus inserted through the body mount 100 until the accessory mount reference surface 201 contacts the body mount reference surface 101. The interlock phase assumed in this state is to be referred to as a correct interlock phase. It is to be noted that in FIG. 7, showing a specific state of interference (state of overlap) between the body-side tabs 110 to 130 and the accessory-side tabs 210 to 230, the accessory-side tabs are shown as fan-shaped members in a schematic representation.

As the accessory mount 200 is inserted at the body mount 100 at the correct interlock phase, the accessory-side first tab 210 passes from front to back through the body-side first gap 151, the accessory-side second tab 220 passes from front to back through the body-side second gap 152 and the accessory-side third tab 230 passes from front to back through the body-side third gap 153. Likewise, the body-side first tab 110 passes from back to front through the accessory-side first gap 251 (no reference numeral appended in FIG. 7), the body-side second tab 120 passes from back to front through the accessory-side second gap 252 (no reference numeral appended in FIG. 7) and the body-side third tab 130 passes from back to front through the accessory-side third gap 253 (no reference numeral appended in FIG. 7), as the accessory mount 200 is inserted through the body mount 100 at the correct interlock phase.

Figure 8:
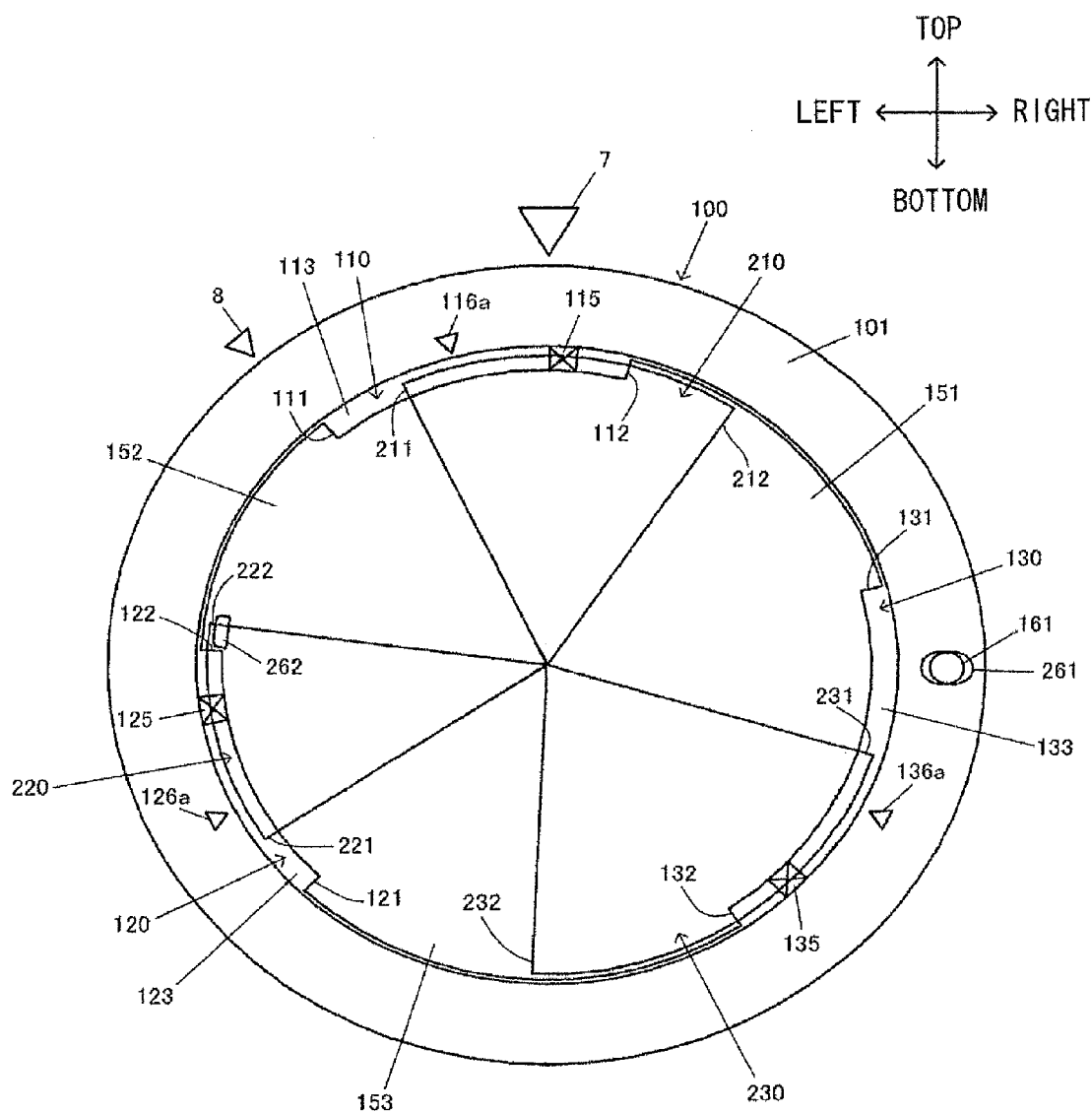
FIG. 8 shows a specific state of interference (state of overlap) between the body-side tabs and the accessory-side tabs.

As the photographic lens 2 is turned along the counterclockwise direction viewed from the front side of the camera body 1 after the accessory mount 200 is inserted through the body mount 100 at the correct interlock phase, the accessory-side first tab 210 takes up a position to the rear of the body-side first tab 110, the accessory-side second tab 220 takes up a position to the rear of the body-side second tab 120 and the accessory-side third tab 230 takes up a position to the rear of the body-side third tab 130. When the photographic lens 2 is turned by 40.5° relative to the correct interlock phase along the counterclockwise direction viewed from the front side of the camera body 1 as shown in FIG. 8, the restricting member 262 comes in contact with the second side end 122 of the body-side second tab 120, thereby preventing further rotation along the counterclockwise direction. In other words, once the photographic lens 2 is turned by 40.5° along the counterclockwise direction from the correct interlock phase, the accessory mount 200 becomes engaged with the body mount 100 (engagement of the accessory-side tabs and the body-side tabs is completed) and thus, the photographic lens 2 becomes fully mounted. The rotational angle of 40.5°, by which the photographic lens 2 is turned from the correct interlock phase to the phase at which mounting of the photographic lens 2 is completed, is to be referred to as a mounting angle. In addition, the counterclockwise turning direction mentioned above may be otherwise referred to as a mounting direction.

When the photographic lens 2 is fully mounted, the position of the pin hole 261 at the accessory mount 200 is aligned with the position of the pin hole 161 at the body mount 100. The pin (not shown) projecting out through the pin hole 161 at the body mount 100 is thus inserted through the pin hole 261.

—Dismounting the Photographic Lens 2 from the Camera Body 1—

The photographic lens 2 is dismounted from the camera body 1 through the following procedure. A button (not shown) disposed at the camera body 1 is depressed so as to retract the pin mentioned above from the pin hole 261. As the photographic lens 2 is turned back to the correct interlock phase along the clockwise direction viewed from the front side of the camera body 1 in this state, the accessory-side tabs and the body-side tabs become dismounted. When the photographic lens 2 is turned to the correct interlock phase, the restricting member 262 comes in contact with the first side end 111 of the body-side first tab 110, thereby preventing further rotation along the clockwise direction. In other words, the state shown in FIG. 7 is resumed. Since the body-side tabs 110 to 130 and the accessory-side tabs 210 to 230 do not interfere with each other at the correct interlock position, as explained earlier, the photographic lens 2 can be pulled forward and separated from the camera body 1. It is to be noted that the clockwise turning direction mentioned above may be otherwise referred to as a dismounting direction.

—State of Engagement Between Accessory-Side Tabs and Body-Side Tabs—

Figure 9:
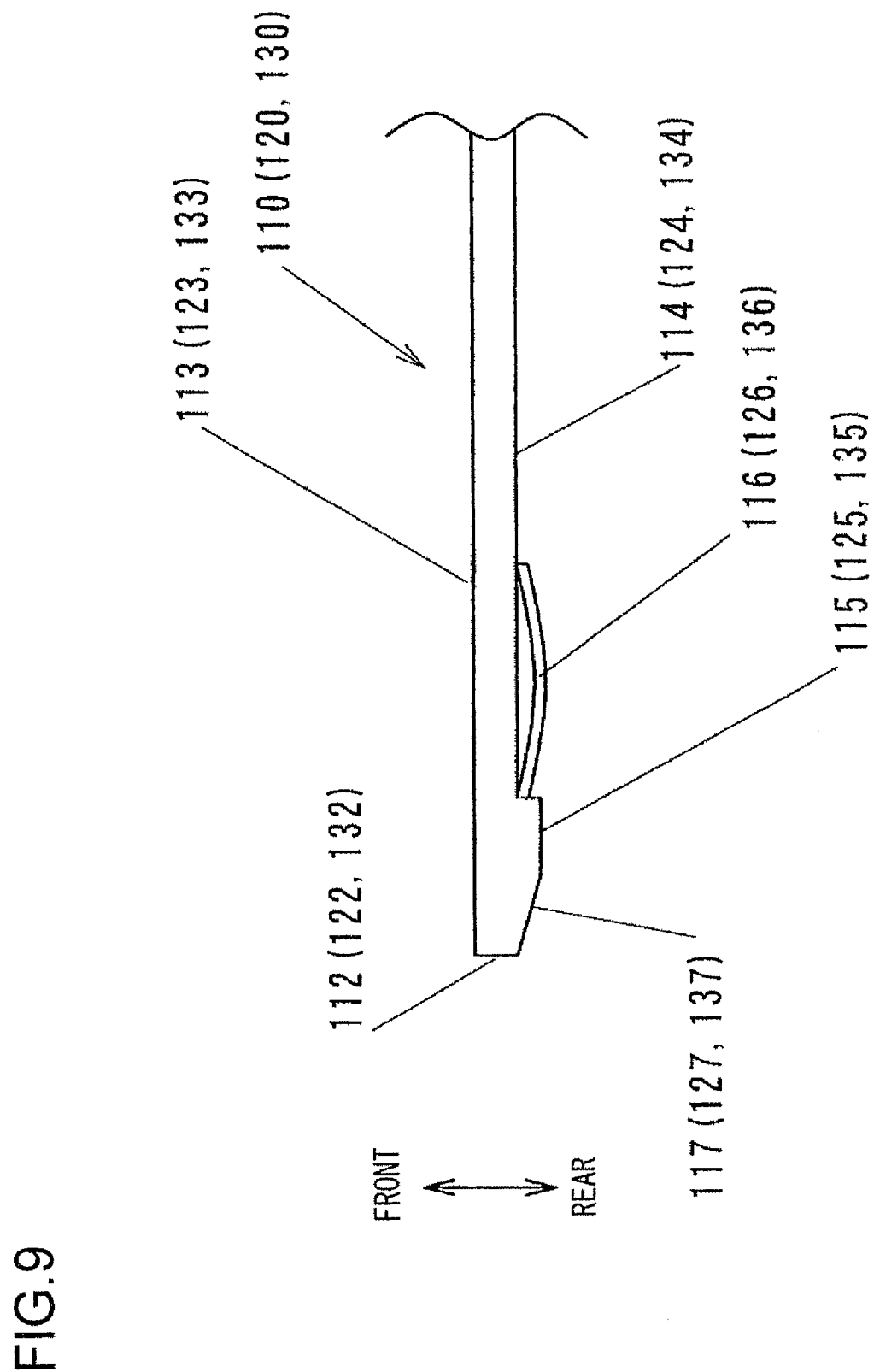
FIG. 9 schematically illustrates the body-side first tab expanded along the circumference in a view taken from the outer side along the radial direction.

FIG. 9 is a schematic view of the body-side first tab 110 expanded along the circumferential direction, taken from the outer circumferential side of the photographic lens 2. The body-side first tab 110 includes a tapered surface 117 formed on the side where the rear surface 114 is located, near the second side end 112. The tapered surface 117 is formed so as to allow the accessory-side first tab 210 to smoothly move into a position to the rear of the body-side first tab 110 while the photographic lens 2 is being mounted. A contact portion 115, constituted with a surface ranging perpendicular to the direction extending from front to rear relative to the body mount 100, is formed continuous to the tapered surface 117 at the body-side first tab 110 near the second side end 112. At the rear surface 114, a spring 116 is disposed at a position adjacent to the contact portion 115.

The spring 116 is an elastic member that comes in contact with the front surface 214 (not shown in FIG. 9) of the accessory-side first tab 210 having moved into the position to the rear of the body-side first tab 110 and presses the front surface 214 rearward. With the spring 116, a state in which the accessory mount reference surface 201 and the body mount reference surface 101 remain in contact with each other is sustained. If an external force that would cause the photographic lens 2 to tilt relative to the camera body 1 against the force applied by the spring 116 is applied to the photographic lens 2 having become fully mounted, the contact portion 115 comes in contact with the front surface 214 of the accessory-side first tab 210 to restrict any forward displacement of the accessory-side first tab 210. It is to be noted while the force applied by the spring 116 keeps the accessory mount reference surface 201 and the body mount reference surface 101 in contact (tight contact) with each other, the contact portion 115 is set slightly apart from the front surface 214 of the accessory-side first tab 210.

The body-side second tab 120 and the body-side third tab 130 adopt structures similar to that described above. Namely, the body-side second tab 120 includes a tapered surface 127 formed on the side where the rear surface 124 is located, near the second side end 122. A contact portion 125, constituted with a surface ranging perpendicular to the direction extending from front to rear relative to the body mount 100, is formed continuous to the tapered surface 127 at the body-side second tab 120 near the second side end 122. At the rear surface 124, a spring 126 is disposed at a position adjacent to the contact portion 125. The body-side third tab 130 includes a tapered surface 137 formed on the side where the rear surface 134 is located, near the second side end 132. A contact portion 135, constituted with a surface ranging perpendicular to the direction extending from front to rear relative to the body mount 100, is formed continuous to the tapered surface 137 at the body-side third tab 130 near the second side end 132. At the rear surface 134, a spring 136 is disposed at a position adjacent to the contact portion 135.

A mark assigned with reference numeral 116a in FIG. 8 indicates the position at which the spring 116 presses the front surface 214 of the accessory-side first tab 210, i.e., the specific phase of the spring force pressing position assumed along the circumferential direction. Likewise, a mark assigned with reference numeral 126a indicates the specific phase of the position at which the spring 126 presses the front surface 224 of the accessory-side second tab 220 assumed along the circumferential direction, and a mark assigned with reference numeral 136a indicates the specific phase of the position at which the spring 136 presses the front surface 234 of the accessory-side third tab 230 assumed along the circumferential direction.

As indicated in FIGS. 7 and 8, the contact portion 115 is located substantially at the top center of the body mount 100. The contact portion 125 is disposed at a position set apart from the second side end 122 of the body-side second tab 120 by a distance equal to the distance setting the contact portion 115 apart from the second side end 112 at the body-side first tab 110. The contact portion 135 is disposed at a position set apart from the second side end 132 of the body-side third tab 130 by a distance equal to the distance setting the contact portion 115 apart from the second side end 112 at the body-side first tab 110.

Figure 10A:
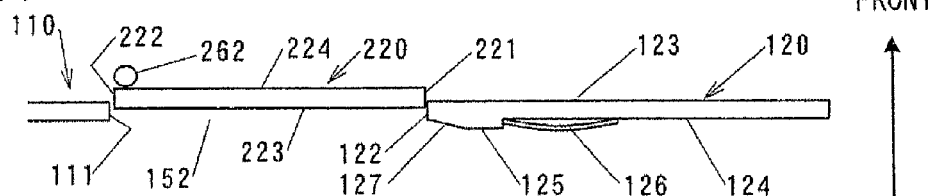
FIGS. 10A through 10F illustrate how the state of engagement between the accessory-side second tab and the body-side second tab changes as the photographic lens is mounted and dismounted.
Figure 10B:
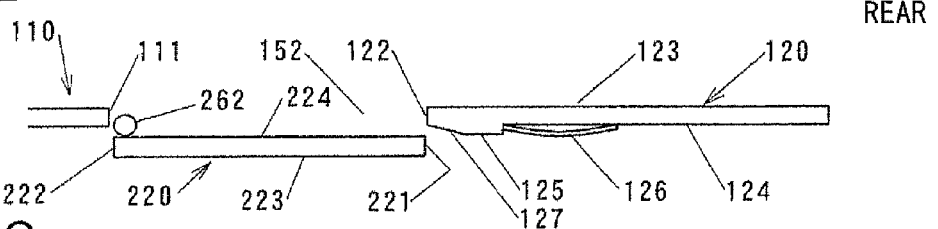

FIGS. 10A through 10F show changes in the state of engagement between the accessory-side second tab 220 and the body-side second tab 120 occurring in time series as the photographic lens 2 is mounted at the camera body 1 and then is dismounted from the camera body 1 in schematic views of the body-side second tab 120 expanded along the circumferential direction, taken from the outer side along the radial direction. FIG. 10A shows the accessory-side second tab 220 of the accessory mount 200 having been inserted at the correct interlock phase, passing through the body-side second gap 152. FIG. 10B shows the state of the accessory-side second tab 220 and the body-side second tab 120 assumed after the accessory-side second tab 220 passes through the body-side second gap 152 and the accessory mount reference surface 201 comes into contact with the body mount reference surface 101.

Figure 10C:
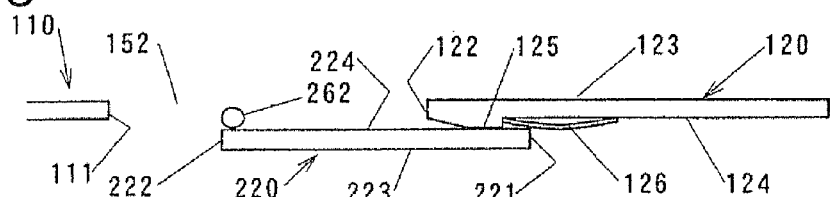
Figure 10D:
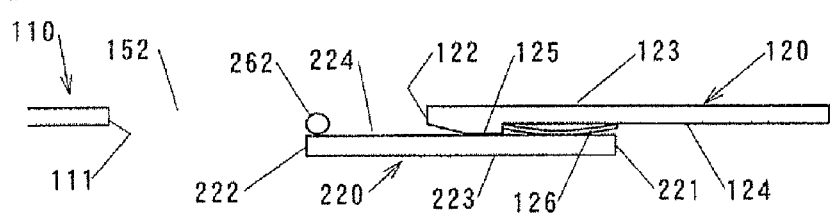

Subsequently, the photographic lens 2 is turned along the mounting direction, causing the accessory-side second tab 220 to move into a position to the rear of the body-side second tab 120, as shown in FIG. 10C. The accessory-side second tab 220 further moves to the rear of the spring 126, resulting in an application of a rearward force by the spring 126 to the accessory-side second tab 220, as illustrated in FIG. 10D. Once the photographic lens 2 is turned from the correct interlock phase by an extent matching the mounting angle along the mounting direction, the restricting member 262 comes into contact with the second side end 122 of the body-side second tab 120, as shown in FIG. 10E, thereby preventing further rotation of the photographic lens 2 along the mounting direction.

Figure 10E:
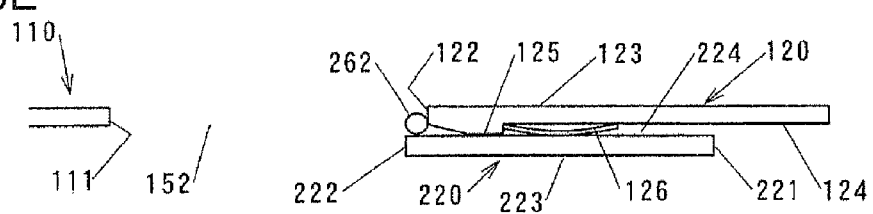
Figure 10F:
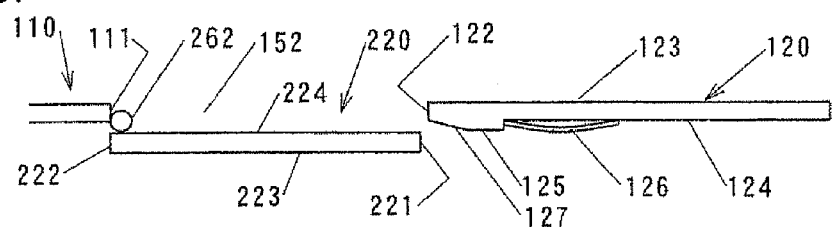

In the state shown in FIG. 10E, the photographic lens 2 is turned along the dismounting direction in order to dismount the photographic lens 2 from the camera body 1. Once the photographic lens 2 is turned along the dismounting direction by an extent matching the mounting angle, the restricting member 262 comes in contact with the first side end 111 of the body-side first tab 110, as illustrated in FIG. 10F, thereby preventing further rotation of the photographic lens 2 along the dismounting direction.

—Insertion of the Photographic Lens 2 at a Phase Other than the Correct Interlock Phase—

If the user attempts to insert the photographic lens 2 at a phase other than the correct interlock phase, at least two tabs among the body-side tabs 110 to 130 and at least two tabs among the accessory-side tabs 210 to 230 come into contact with each other at, at least, two locations, and thus, insertion of the accessory mount 200 through the body mount 100 is disallowed (deterred) in the embodiment.

As can be surmised by viewing FIG. 7, if the user attempts to mount the photographic lens 2 slightly offset from the correct interlock phase along the counterclockwise direction in the figure, the rear surface 213 of the accessory-side first tab 210 will come into contact with the front surface 113 of the body-side first tab 110, the rear surface 223 of the accessory-side second tab 220 will come into contact with the front surface 123 of the body-side second tab 120, and the rear surface 233 of the accessory-side third tab 230 will come into contact with the front surface 133 of the body-side third tab 130. As a result, the three body-side tabs 110 to 130 and the three accessory-side tabs 210 to 230 will be in contact with each other and insertion of the accessory mount 200 into the body mount 100 will be disallowed. This situation may arise when, for instance, the accessory-side tabs 210 to 230 in FIG. 8 are positioned frontward relative to the body-side tabs 110 to 130.

Figure 11:
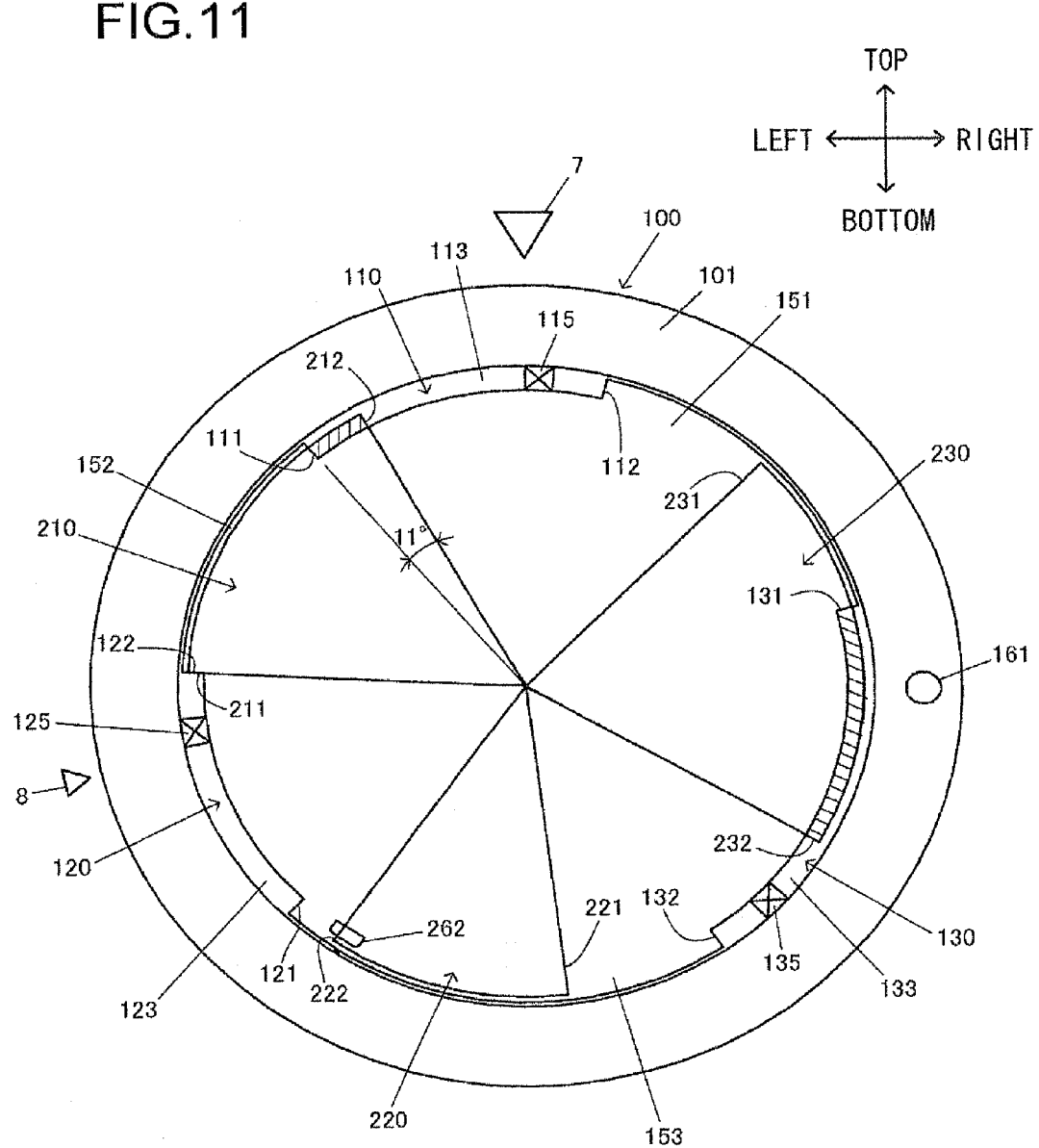
FIG. 11 shows a specific state of interference (state of overlap) between the body-side tabs and the accessory-side tabs.

If the user attempts to mount the photographic lens 2 turned by a greater extent along the counterclockwise direction relative to the state described above, the accessory-side second tab 220 will move frontward relative to the body-side third gap 153, as shown in FIG. 11 and thus, the accessory-side second tab 220 will no longer be in contact with any of the body-side tabs 110 to 130. However, the rear surface 213 of the accessory-side first tab 210 will be contact with the front surface 113 of the body-side first tab 110 and the rear surface 233 of the accessory-side third tab 230 will be contact with the front surface 133 of the body-side third tab 130. In this situation, the contact achieved by the two body-side tabs among the body-side tabs 110 to 130 and the two accessory-side tabs among the accessory-side tabs 210 to 230 disallows insertion of the accessory mount 200 through the body mount 100. The contact thus achieved by the body-side tabs 110 to 130 and the accessory-side tabs at a total of two contact locations, is indicated as the hatched areas in FIG. 11.

A slight counterclockwise rotation of the photographic lens 2 will alter the positional relationship of the two mounts relative to each other in FIG. 11 to a positional relationship whereby the rear surface 213 of the accessory-side first tab 210 contacts the front surface 123 of the body-side second tab 120. Namely, a slight counterclockwise turn of the photographic lens 2 will allow the body-side tabs 110 to 130 and the accessory-side tabs 210 to 230 to achieve contact at three contact locations. If, on the other hand, the photographic lens 2 in the state shown in FIG. 11 is turned along the clockwise direction, the rear surface 213 of the accessory-side first tab 210 and the front surface 113 of the body-side first tab 110 will contact each other over a larger area and the rear surface 233 of the accessory-side third tab 230 and the front surface 133 of the body-side third tab 130 will contact each other over a larger area.

In other words, FIG. 11 shows a state in which the contact of the rear surface 213 of the accessory-side first tab 210 and the front surface 113 of the body-side first tab 110 and the contact of the rear surface 233 of the accessory-side third tab 230 and the front surface 133 of the body-side third tab 130 are achieved at the two contact locations over the smallest contact area. The rear surface 213 of the accessory-side first tab 210 and the front surface 113 of the body-side first tab 110 contact each other at the interlock phase shown in FIG. 11 over an angular range, assumed by viewing the body mount 100 from the front side of the camera body 1, of 11°.

It is to be noted that there are other situations in which insertion of the accessory mount 200 through the body mount 100 is disallowed via a total of two contact locations where two tabs among the body-side tabs 110 to 130 and two tabs among the accessory-side tabs 210 to 230 contact each other, as described in detail later. Among the plurality of states in which insertion of the accessory mount 200 through the body mount 100 is disallowed via a total of two contact locations where two tabs among the body-side tabs 110 to 130 and two tabs among the accessory-side tabs 210 to 230 achieve contact, the smallest contact area is formed at either of the two contact locations is the in two specific conditions, i.e., the state shown in FIG. 11 and the state (not shown) achieved by rotating the photographic lens 2 in the state shown in FIG. 11 by 11° along the counterclockwise direction in the figure, as described below.

If the photographic lens 2 with the two mounts assuming the specific positional relationship relative to each other as shown in FIG. 11 is turned by 11° along the counterclockwise direction in the figure, the contact of the rear surface 213 of the accessory-side first tab 210 and the front surface 113 of the body-side first tab 110 will cease but the rear surface 213 of the accessory-side first tab 210 will come into contact with the front surface 123 of the body-side second tab 120. It is to be noted that contact will also be achieved as the rear surface 233 of the accessory-side third tab 230 comes into contact with the front surface 133 of the body-side third tab 130. The rear surface 213 of the accessory-side first tab 210 and the front surface 123 of the body-side second tab 120 will contact each other over an angular range, assumed by viewing the body mount 100 from the front side of the camera body 1, of 11°, as in the state shown in FIG. 11.

Thus, in this case too, contact will be achieved by the body-side tabs 110 to 130 and the accessory-side tabs 210 to 230 at a total of two contact locations. Among various states in which contact is achieved by the rear surface 213 of the accessory-side first tab 210 and the front surface 123 of the body-side second tab 120 and contact is achieved by the rear surface 233 of the accessory-side third tab 230 and the front surface 133 of the body-side third tab 130 at a total of two contact locations, the accessory-side tabs and the body-side tabs contact each other over the smallest area in this state.

Namely, while there are various insertion disallowed states, in which insertion of the accessory mount 200 through the body mount 100 is disallowed via a total of two contact locations where two tabs among the body-side tabs 110 to 130 and two tabs among the accessory-side tabs 210 to 230 contact each other, the rear surface 213 the accessory-side first tab 210 and the front surface 113 of the body-side first tab 110 contact each other over the smallest contact area in the state shown in FIG. 11. Likewise, the smallest contact area is also formed by the rear surface 213 of the accessory-side first tab 210 and the front surface 123 of the body-side second tab 120 in the insertion disallowed state with the photographic lens 2 turned counterclockwise by 11° relative to the state shown in FIG. 11, among the insertion disallowed states in which insertion of the accessory mount 200 through the body mount 100 is disallowed via a total of two contact locations where two tabs among the body-side tabs 110 to 130 and 2 tabs among the accessory-side tabs 210 to 230 contact each other. The interlock phase shown in FIG. 11 and the interlock phase assumed with the photographic lens 2 turned by 11° along the counterclockwise direction relative to the state shown in FIG. 11 are each referred to as a specific interlock phase.

As described above, a counterclockwise rotation of the photographic lens 2 in the state shown in FIG. 11 will cause the rear surface 213 of the accessory-side first tab 210 to come into contact with both the front surface 113 of the body-side first tab 110 and the front surface 123 of the body-side second tab 120 and cause the rear surface 233 of the accessory-side third tab 230 to come into contact with the front surface 133 of the body-side third tab 130. In other words, the body-side tabs 110 to 130 and the accessory-side tabs 210 to 230 will achieve contact at a total of three contact locations.

As the photographic lens 2 is turned further counterclockwise in the figure until the photographic lens 2 is rotated by 11° along the counterclockwise direction relative to the state shown in FIG. 11, as described above, the rear surface 213 of the accessory-side first tab 210 and the front surface 113 of the body-side first tab 110 will cease to be in contact with each other and thus, the number of contact locations where the body-side tabs 110 to 130 and the accessory-side tabs 210 to 230 contact each other will be reduced to two.

Figure 12:
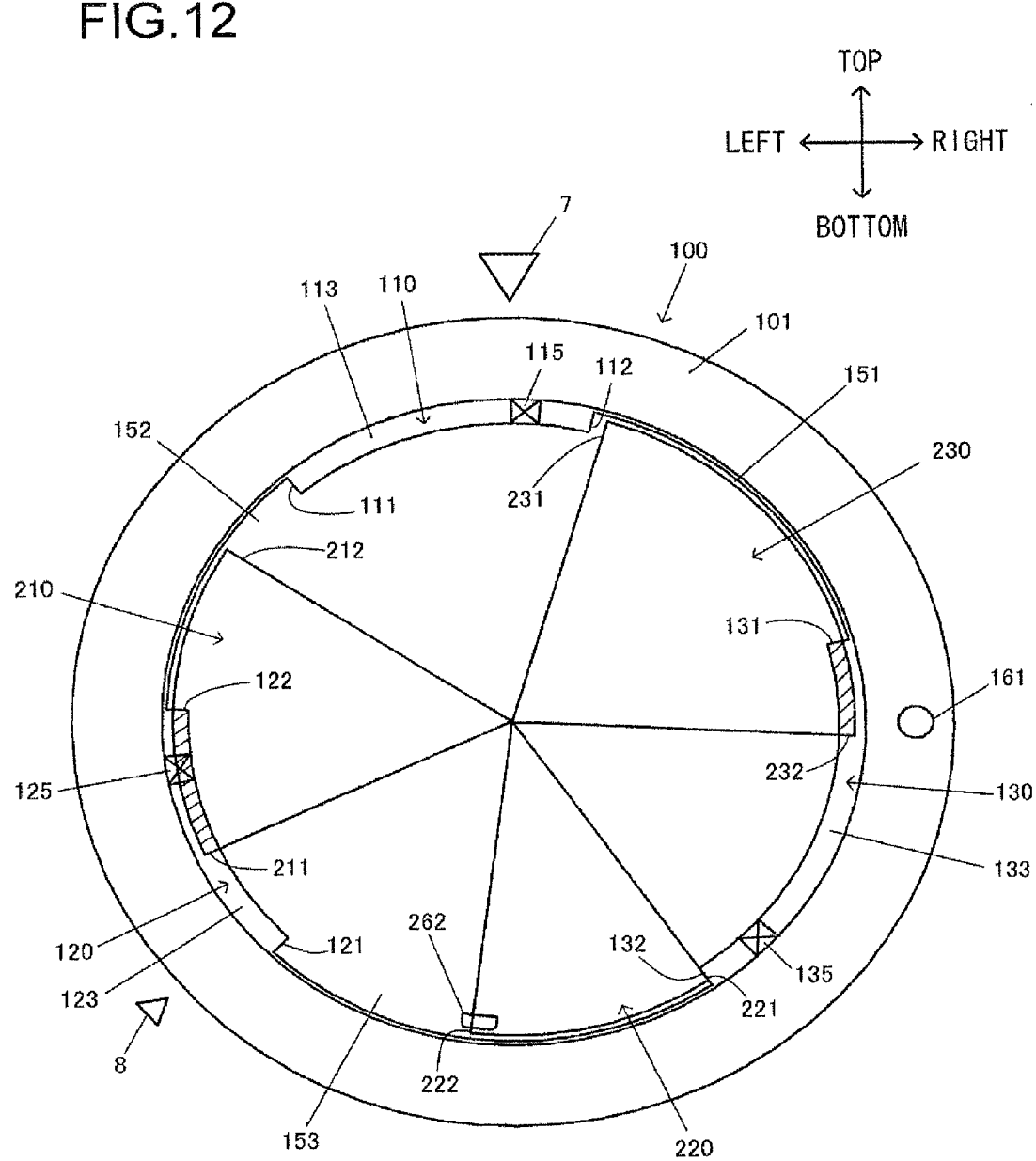
FIG. 12 shows a specific state of interference (state of overlap) between the body-side tabs and the accessory-side tabs.

As the photographic lens 2 is turned further along the counterclockwise direction in the figure, the state shown in FIG. 12 will be achieved.

As can be surmised by viewing FIG. 12, a slight counterclockwise turn of the photographic lens 2 will alter the positional relationship shown in FIG. 12, causing the rear surface 223 of the accessory-side second tab 220 to come into contact with the front surface 133 of the body-side third tab 130. In other words, contact will be achieved by the body-side tabs 110 to 130 and the accessory-side tabs 210 to 230 at a total of three contact locations. A further counterclockwise turn of the photographic lens 2 will cause the rear surface 233 of the accessory-side third tab 230 to come into contact with the front surface 113 of the body-side first tab 110 as well. In this situation, contact will be achieved by the body-side tabs 110 to 130 and the accessory-side tabs 210 to 230 over a total of four contact locations.

As the photographic lens 2 is turned further counterclockwise, the rear surface 233 of the accessory-side third tab 230 and the front surface 133 of the body-side third tab 130 will cease contact with each other and then, the rear surface 213 of the accessory-side first tab 210 and the front surface 123 of the body-side second tab 120, too, will cease contact with each other. In other words, contact will be achieved by the body-side tabs 110 to 130 and the accessory-side tabs 210 to 230 at a total of two contact locations under these circumstances, as shown in FIG. 13.

Figure 13:
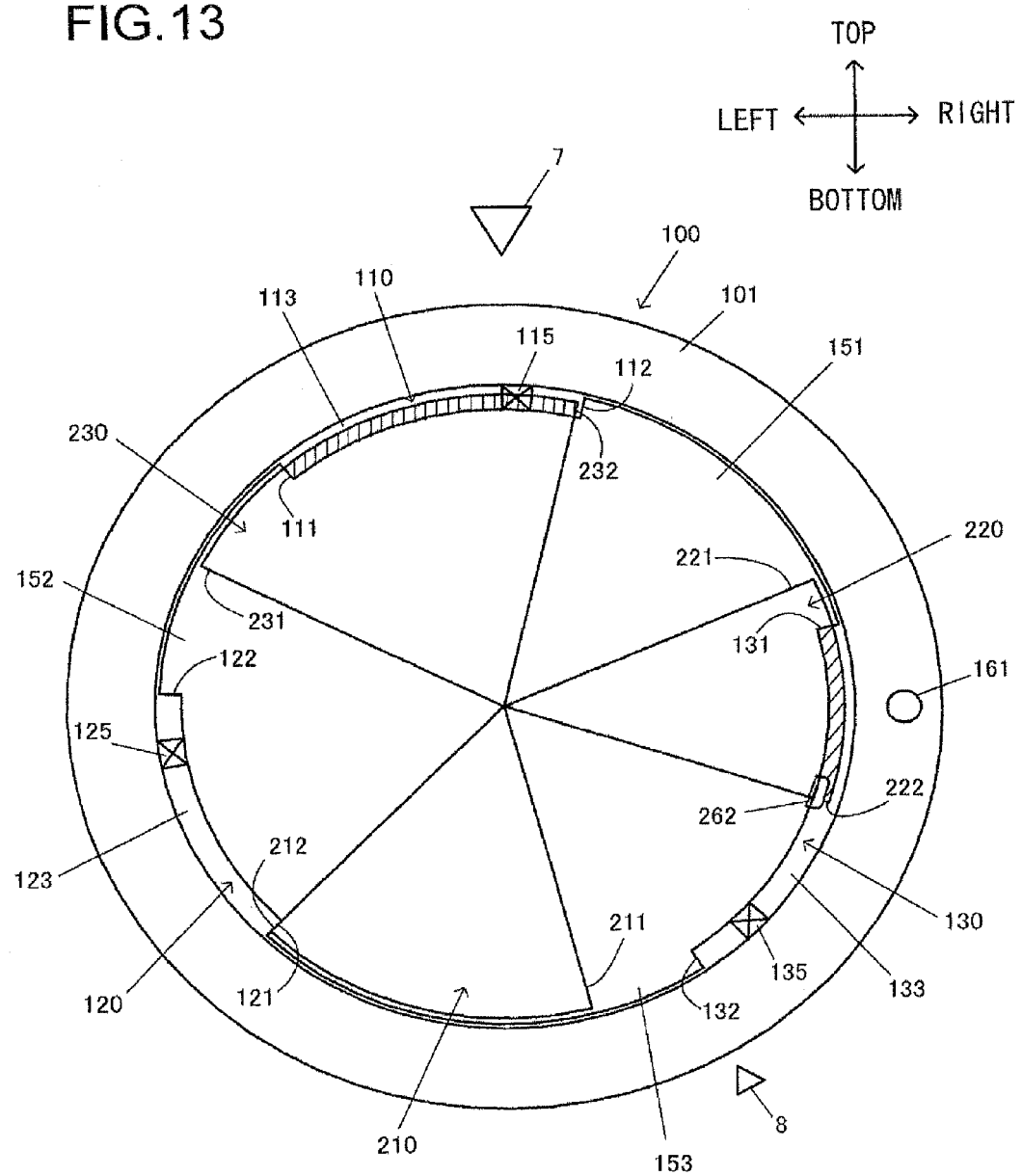
FIG. 13 shows a specific state of interference (state of overlap) between the body-side tabs and the accessory-side tabs.

A further counterclockwise turn of the photographic lens 2 in the state shown in FIG. 13 will cause a decrease in both the contact area over which the rear surface 223 of the accessory-side second tab 220 and the front surface 133 of the body-side third tab 130 are in contact with each other and the contact area over which the rear surface 233 of the accessory-side third tab 230 and the front surface 113 of the body-side first tab 110 are contact with each other. In other words, FIG. 13 shows a state in which the contact of the rear surface 223 of the accessory-side second tab 220 and the front surface 133 of the body-side third tab 130 and the contact of the rear surface 233 of the accessory-side third tab 230 and the front surface 113 of the body-side first tab 110 are achieved at the two contact locations over the largest contact area.

Figure 14:
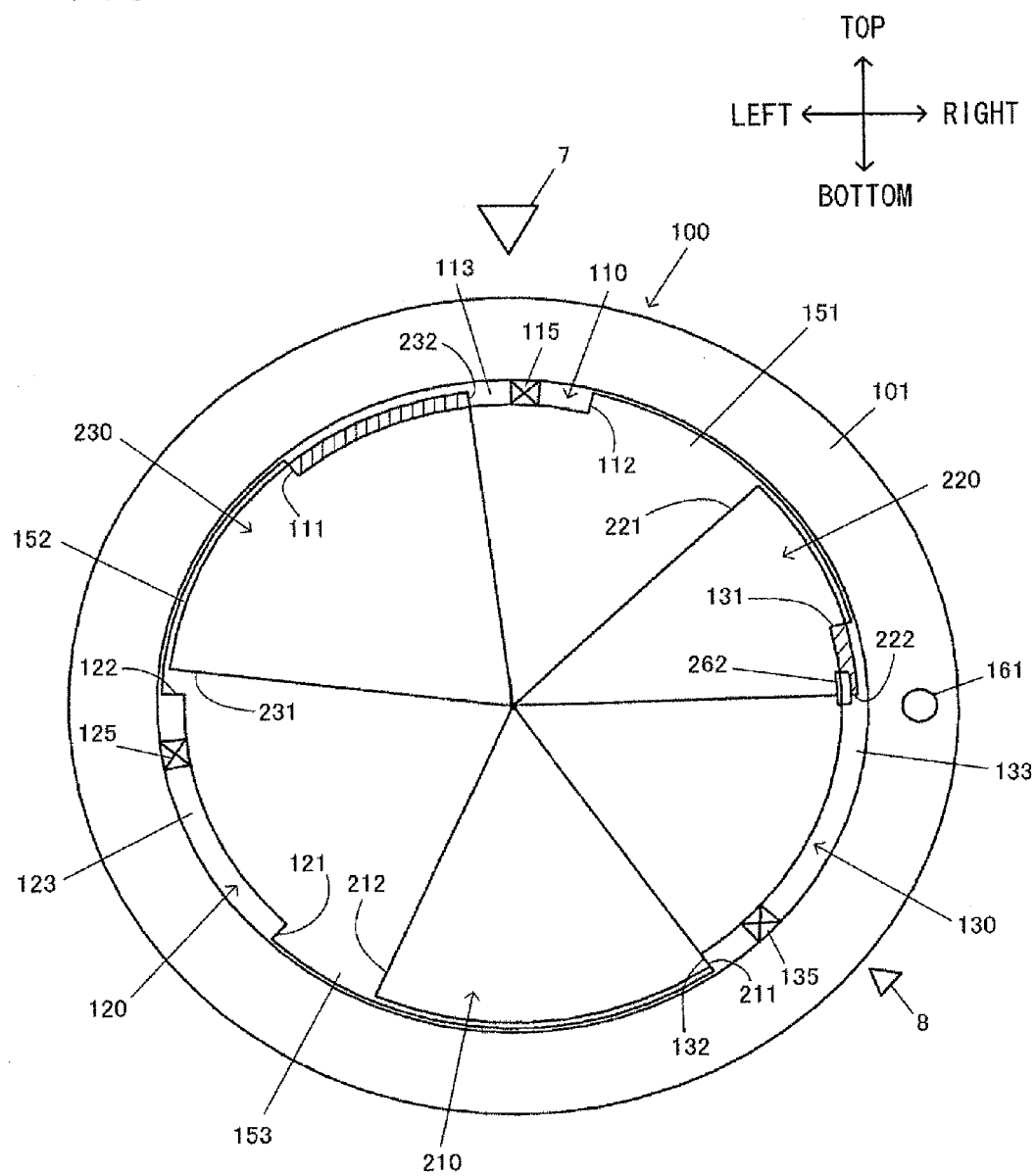
FIG. 14 shows a specific state of interference (state of overlap) between the body-side tabs and the accessory-side tabs.

FIG. 14 shows a state achieved by further turning the photographic lens 2 along the counterclockwise direction relative to the state shown in FIG. 13. Among various states in which the rear surface 223 of the accessory-side second tab 220 and the front surface 133 of the body-side third tab 130 contact each other and the rear surface 233 of the accessory-side third tab 230 and the front surface 113 of the body-side first tab 110 contact each other at a total of two contact locations, the accessory-side tabs and the body-side tabs contact each other over the smallest area in this state.

Figure 15:
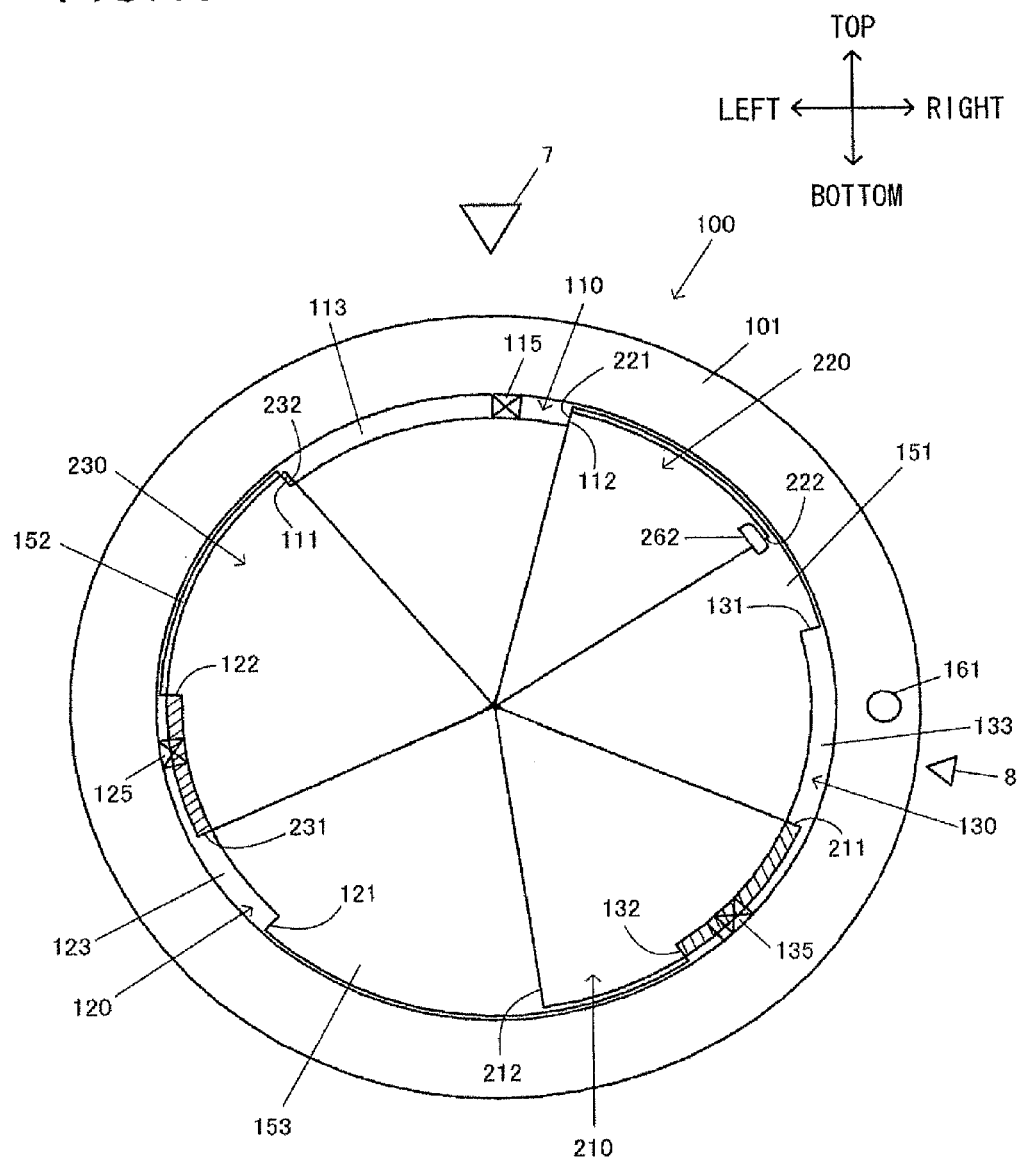
FIG. 15 shows a specific state of interference (state of overlap) between the body-side tabs and the accessory-side tabs.

A slight counterclockwise turn of the photographic lens 2 relative to the state shown in FIG. 14 will allow the rear surface 213 of the accessory-side first tab 210 and the front surface 133 of the body-side third tab 130 to come into contact with each other. At this time, contact will be achieved by the body-side tabs 110 to 130 and the accessory-side tabs 210 to 230 at a total of three contact locations. As the photographic lens 2 in this state is turned further along the counterclockwise direction in the figure, the rear surface 233 of the accessory-side third tab 230 and the front surface 123 of the body-side second tab 120 will come into contact with each other. In this state, contact will be achieved by the body-side tabs 110 to 130 and the accessory-side tabs 210 to 230 at a total of four contact locations. As the photographic lens 2 in this state is turned further along the counterclockwise direction in the figure, the rear surface 223 of the accessory-side second tab 220 and the front surface 133 of the body-side third tab 130 will cease contact with each other, as shown in FIG. 15. At this time, contact will be achieved by the body-side tabs 110 to 130 and the accessory-side tabs 210 to 230 at a total of three contact locations.

As the photographic lens 2 is slightly turned along the counterclockwise direction relative to the state shown in FIG. 15, the rear surface 223 of the accessory-side second tab 220 and the front surface 113 of the body-side first tab 110 will come into contact with each other but substantially simultaneously, the contact of the rear surface 233 of the accessory-side third tab 230 and the front surface 113 of the body-side first tab 110 will cease. As the photographic lens 2 is turned further along the counterclockwise direction in the figure, the correct interlock phase shown in FIG. 7 will be reestablished and any contact (interference) between the body-side tabs 110 to 130 and the accessory-side tabs 210 to 230 will cease.

—Accessory-Side Third Tab 230—

When contact is achieved by the body-side tabs 110 to 130 and the accessory-side tabs 210 to 230 at a total of two contact locations with the accessory-side third tab 230 in contact with a body-side tab at one of the contact locations, the accessory-side third tab 230 invariably contacts the body-side tab 110, 120 or 130 on the side where its second side end 232 is located (i.e., at the rear surface 233 near the second side end 232), rather than on the side where its first side end 231 is located (i.e., at the rear surface 233 near the first side end 231), as shown in FIGS. 11 through 14. In other words, when contact is achieved by the body-side tabs 110 to 130 and the accessory-side tabs 210 to 230 at a total of two contact locations and the accessory-side third tab 230 achieves contact at one of the contact locations, the function of preventing erroneous insertion is achieved in the area near the second side end 232 of the accessory-side third tab 230. The accessory-side third tab 230 is formed so that the area near its second side end 232 is positioned in the body-side third gap 153 without overlapping the body-side third tab 130 when the photographic lens 2 is mounted at the camera body 1 as shown in FIG. 8. Namely, when the photographic lens 2 is mounted at the camera body 1, the area near the second side end 232 of the accessory-side third tab 230 does not directly contribute to locking of the photographic lens 2 to the camera body 1.

In addition, near the first side end 231 of the accessory-side third tab 230, the front surface 234 is pressed by the spring 136 at the body-side third tab 130, and whenever an excessive external force is applied, the front surface 234 will come into contact with the contact portion 135, as explained earlier. This means that when the photographic lens 2 is mounted at the camera body 1, the force applied to lock the photographic lens 2 to the camera body 1 will be imparted primarily to the area near the first side end 231 at the accessory-side third tab 230.

In summary, the accessory-side third tab 230 is formed so that different functions are achieved in the area near the first side end 231 and the area near the second side end 232 along the direction in which the accessory-side third tab 230 extends.

—Body-Side First Tab 110—

When contact is achieved by the body-side tabs 110 to 130 and the accessory-side tabs 210 to 230 at a total of two contact locations with the body-side first tab 110 in contact with an accessory-side tab at one of the contact locations, the body-side first tab 110 invariably contacts the accessory-side tab 210, 220 or 230 on the side where its first side end 111 is located (i.e., at the front surface 113 near the first side end 111), rather than on the side where its second side end 112 is located (i.e., at the front surface 113 near the second side end 112), as shown in FIGS. 11, 13 and 14. In other words, when contact is achieved by the body-side tabs 110 to 130 and the accessory-side tabs 210 to 230 at a total of two contact locations and the body-side first tab 110 achieves contact at one of the contact locations, the function of preventing erroneous insertion is achieved in the area near the first side end 111 of the body-side first tab 110.

The spring 116 is disposed adjacent to the contact portion 115 at the body-side first tab 110 over the area near its second side end 112. Namely, the function of locking the photographic lens 2 having been mounted at the camera body 1 is achieved over the area near the second side end 112 of the body-side first tab 110.

In summary, the body-side first tab 110 is formed so that different functions are achieved in the area near the first side end 111 and the area near the second side end 112 along the direction in which the body-side first tab 110 extends.

The camera body 1 and the photographic lens 2 structured as described above achieve the following advantages.

(1) Three accessory-side tabs 210 to 230 assuming a uniform size and disposed over equal intervals and three body-side tabs 110 to 130 assuming a uniform size and disposed over equal intervals will allow the photographic lens 2 to be mounted at the camera body 1 at a phase other than the correct interlock phase. Accordingly, the three accessory-side tabs 210 to 230 are formed in varying sizes and are disposed over varying intervals and the three body-side tabs 110 to 130 are also formed in varying sizes and disposed over varying intervals. In addition, even if the user attempts to insert the photographic lens 2 at a phase other than the correct interlock phase, at least two tabs among the body-side tabs 110 to 130 and at least two tabs among the accessory-side tabs 210 to 230 come into contact with each other at a total of at least two contact locations, so as to disallow insertion of the accessory mount 200 through the body mount 100. If contact was achieved by a camera accessory mount tab and a camera body mount tab at a single contact location, the other two contact-free tabs on the accessory-side could assume positions between camera body-side tabs. In contrast, contact is achieved in the embodiment by the body-side tabs 110 to 130 and the accessory-side tabs 210 to 230 at, at least, two contact locations at a phase other than the correct interlock phase as described above, and consequently, erroneous mounting of the camera accessory can be reliably prevented.

(2) The restricting member 262, which comes in contact with the second side end 122 of the body-side second tab 120 and the first side end 111 of the body-side first tab 110, restricts the range over which the photographic lens 2 can be turned along the mounting direction and the dismounting direction. Since the rotational range of the photographic lens 2 along the mounting direction and the dismounting direction can be restricted via a single member assuming a simple shape, the manufacturing costs of the body mount 100 and the accessory mount 200 can be minimized.

(3) The restricting member 262 is disposed near a side end of the accessory-side second tab 220 assuming a smallest length along the circumference of the accessory mount 200. At the correct interlock phase, the accessory-side second tab 220 passes through the body-side second gap 152, which extends over an angular range of 47.5° along the circumferential edge of the circular opening of the camera body 1. In addition, the mounting angle assumed in the embodiment is 40.5°. This means that a range, over which the restricting member 262 is allowed to move between the second side end 122 of the body-side second tab 120 and the first side end 111 of the body-side first tab 110 within the angular range (47.5°) of the body-side second gap 152, is equivalent to the mounting angle. Accordingly, by disposing the restricting member 262 near a side end of the accessory-side second tab 220 assuming the smallest length along the circumference of the accessory mount 200, the mounting angle for the mount system constituted with the body mount 100 and the accessory mount 200 is defined. From a different perspective, the mounting angle setting can be rationalized as described below and the sizes of the body-side second gap 152 and the accessory-side second tab 220 may be regarded to have been set in correspondence to the mounting angle rationalized as described below. In any case, these structural features achieve a rational overall structure with no superfluous structural elements, to contribute toward minimization of the overall weight.

It is to be noted that at a smaller mounting angle, the accessory can be engaged with greater ease, the extent to which electrical contact points (not shown) at the camera body 1 and at the photographic lens 2 slide against each other can be reduced and the extent of wear of the electrical contact points occurring whenever the photographic lens 2 is exchanged can be reduced. However, if the mounting angle is very small, tabs engaged with each other may become inadvertently dismounted from each other, and in such a case, the photographic lens 2 may fall from the camera body. At the same time, the body mount 100 must assume a certain circumferential dimension in order to accommodate the springs 116, 126 and 136, the contact portions 115, 125 and 135 and the tapered surfaces 117, 127 and 137. Moreover, a sufficient mounting angle is required to ensure that the accessory-side tabs 210 to 230 are allowed to reliably mount the springs 116, 126 and 136 and the contact portions 115, 125 and 135 over the tapered surfaces 117, 127 and 137. The mounting angle of 40.5° adopted in the embodiment has been determined by taking into consideration all these factors.

(4) While the weight distribution of the photographic lens 2 is such that the photographic lens 2 tends to pull down on its front side (subject side), the forces applied from the springs 116, 126 and 136 sustain the accessory mount reference surface 201 in contact with the body mount reference surface 101 under typical operating conditions. However, if an external force exceeding the force of the springs, working along a direction matching that of gravity is applied to the photographic lens 2 in a photographing state with the camera body 1 in the upright attitude fixed to, for instance, a tripod, the spring 116 of the uppermost body-side first tab 110 will flex further to allow the front surface 214 of the accessory-side first tab 210 to come in contact with the contact portion 115 of the body-side first tab 110.

Figure 16:
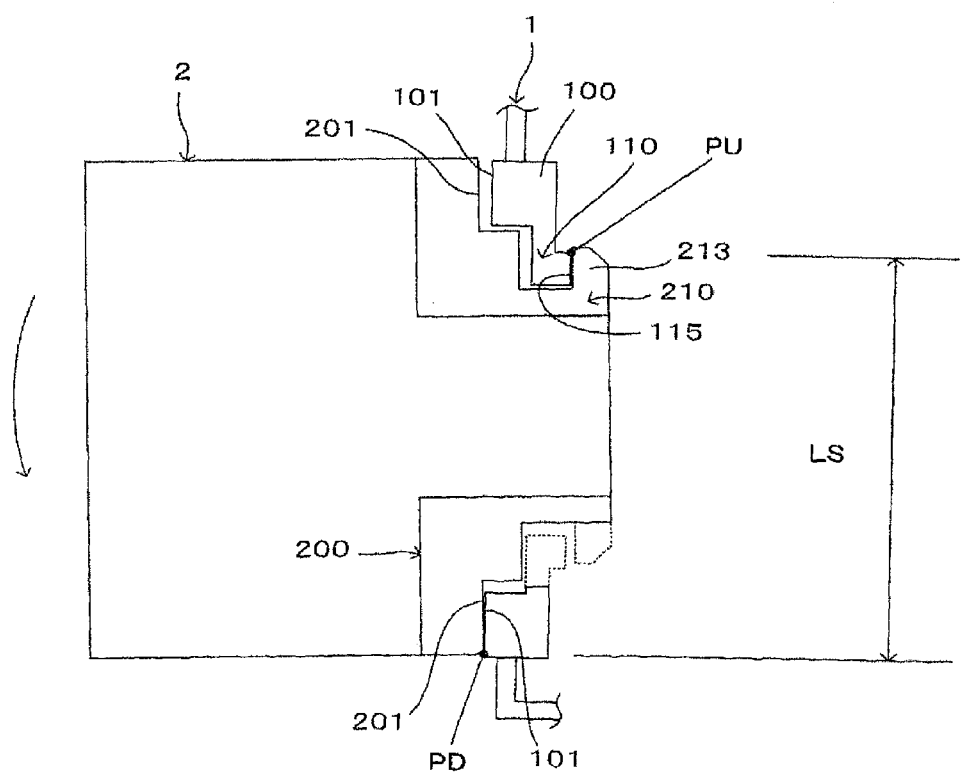
FIG. 16 illustrates the relationship between the body mount and the accessory mount that will manifest if an excessive external force is applied to the photographic lens along the direction matching that of gravitational force.

FIG. 16 illustrates this condition. It is to be noted that the intervals and the like formed between the individual parts are exaggerated in FIG. 16 so as to provide a clear illustration. In the state shown in FIG. 16, the accessory mount reference surface 201 and the body mount reference surface 101 are in contact with each other at a point PD on the lower side, the front surface 214 of the accessory-side first tab 210 and the contact portion 115 of the body-side first tab 110 are in contact with each other at a point PU on the upper side as described above and the weight of the photographic lens 2 and the external force applied to the photographic lens 2 are supported at these two points. Accordingly, the force applied to the two points PD and PU can be reduced by maximizing the distance LS extending along the vertical direction (along the direction of gravitational force) between the two points PD and PU.

This situation will not arise in a normal photographing condition unless an unintended external force is applied. However, the photographic lens 2, which normally assumes a cylindrical shape, tends to come into contact with various objects in real-world usage and may be employed in a range of circumstances. For this reason, the condition shown in FIG. 16 may be expected to arise fairly often and, therefore it is important to devise measures to effectively address the issues arising from such circumstances.

Figure 17:
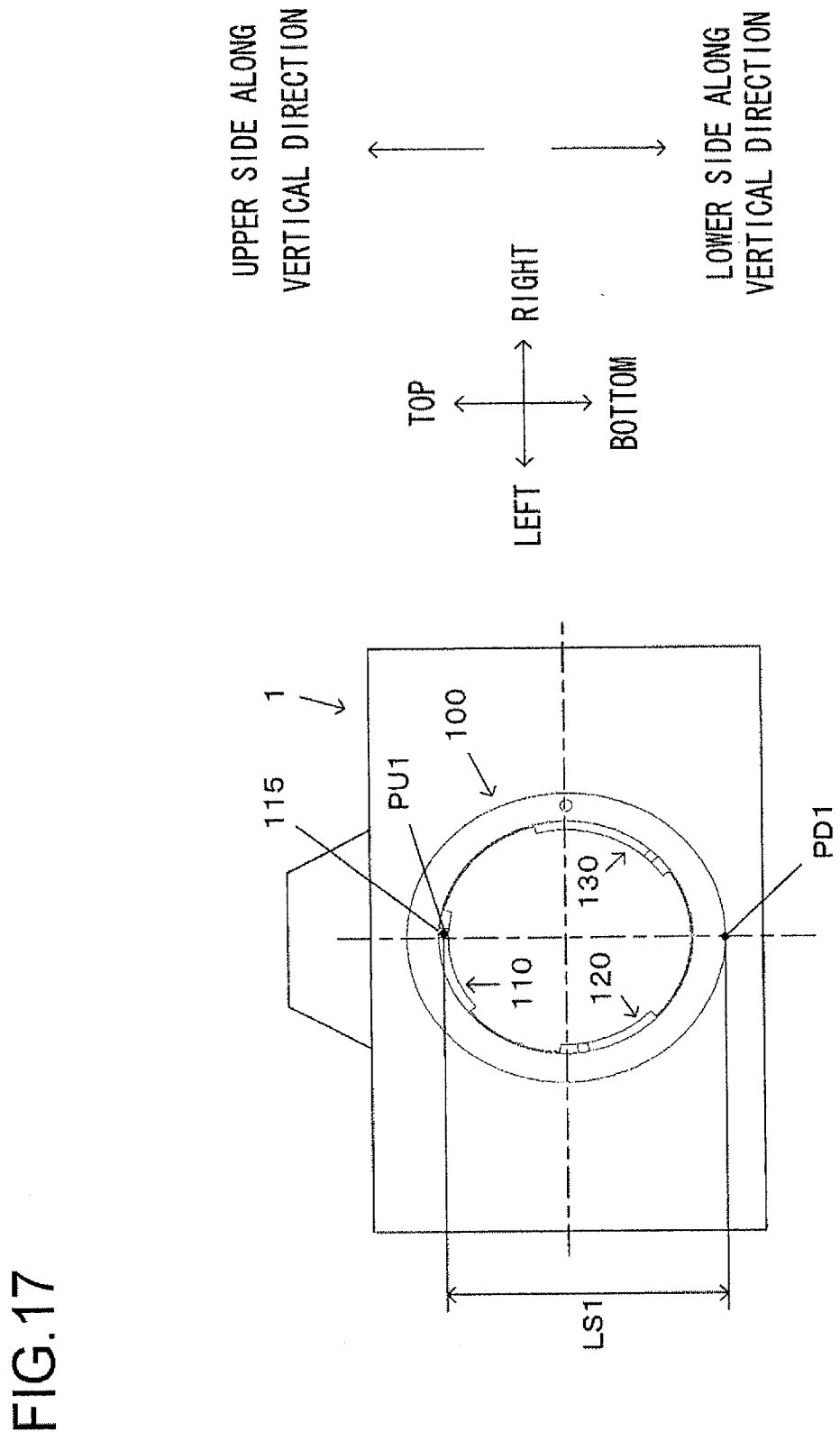
FIG. 17 indicates the contact points PD and PU and the distance LS assumed when the camera body is in a lateral orientation.
Figure 18:
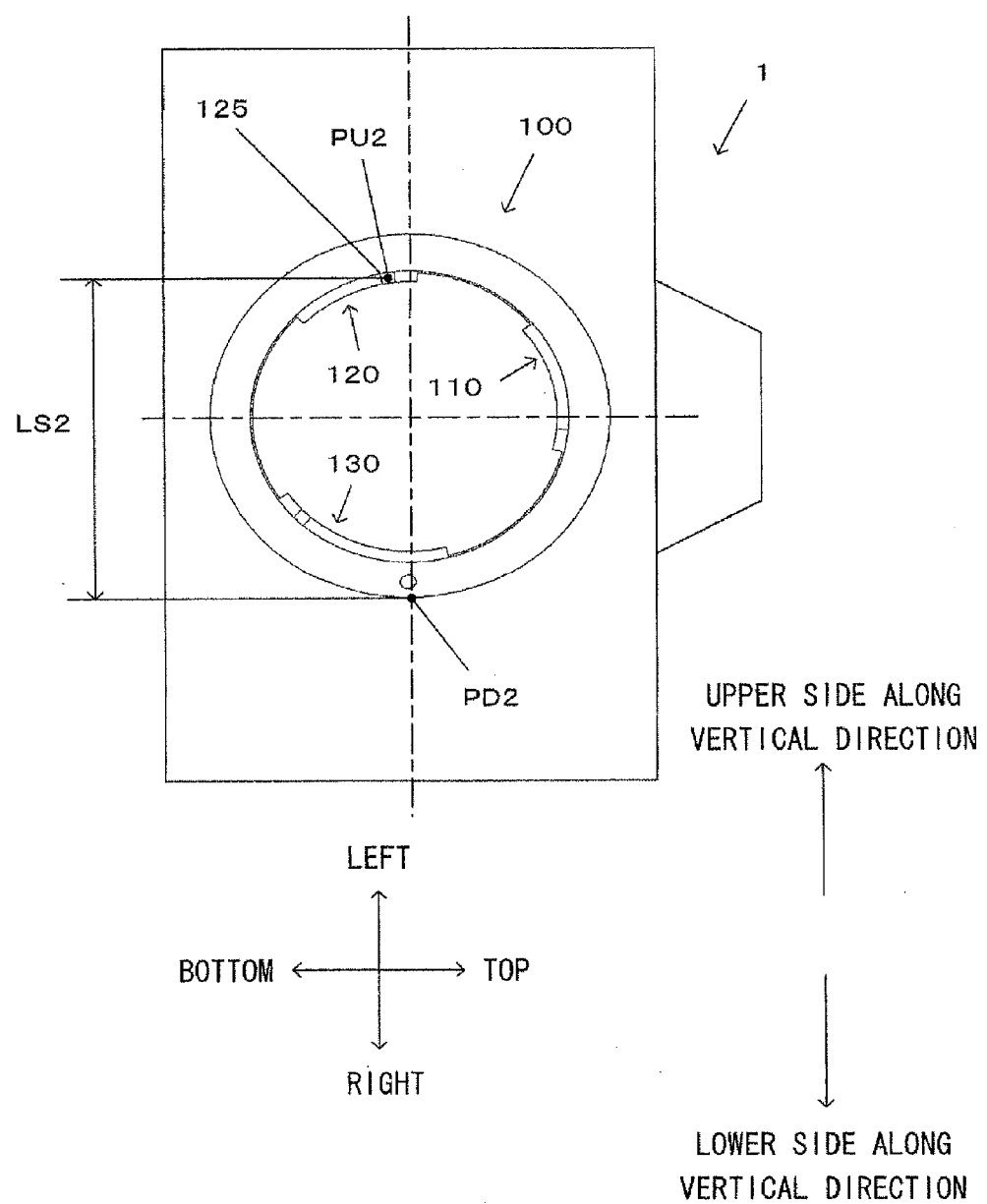
FIG. 18 indicates the contact points PD and PU and the distance LS assumed when the camera body is in a longitudinal orientation.
Figure 19:
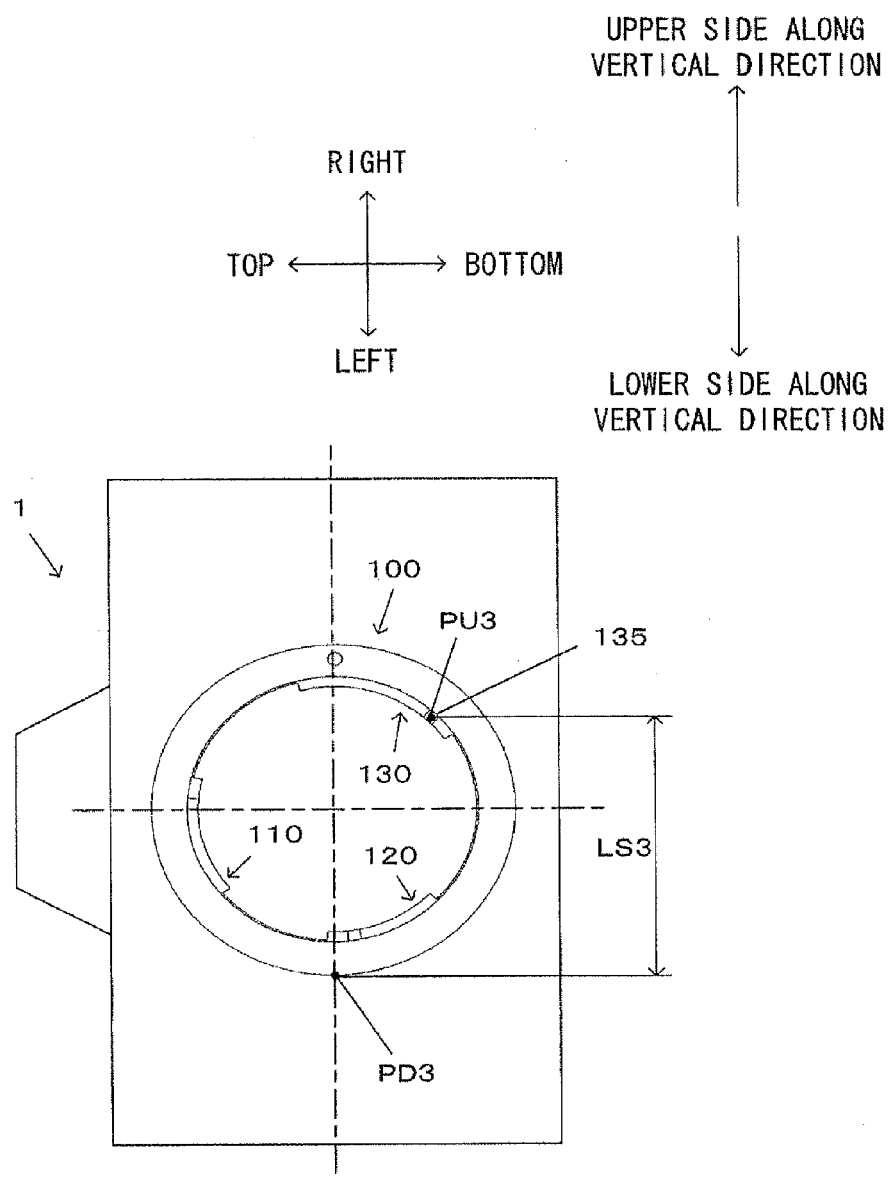
FIG. 19 indicates the contact points PD and PU and the distance LS assumed when the camera body is in another longitudinal orientation.

FIGS. 17 through 19 each indicate the contact points PD and PU and the distance LS corresponding to a specific attitude assumed by the camera body 1. It is to be noted that the camera body 1 assumes the upright attitude (lateral orientation) in FIG. 17, with the distance LS and the contact points PD and PU corresponding to this attitude respectively notated as LS1, PD1 and PU1. The camera body 1 assumes a longitudinal orientation in FIG. 18 achieved by turning the left side of the camera body 1 upward, with the distance LS and the contact points PD and PU corresponding to this attitude respectively notated as LS2, PD2 and PU2. The camera body 1 assumes a longitudinal orientation in FIG. 19 achieved by turning the right side of the camera body 1 upward, with the distance LS and the contact points PD and PU corresponding to the particular attitude respectively notated as LS3, PD3 and PU3. The distance LS1 assumed in the lateral orientation in FIG. 17 and the distance LS2 assumed in the longitudinal orientation in FIG. 18 are both substantially equal to the diameter of the body mount 100. However, the distance LS3 in the longitudinal orientation shown in FIG. 19 is markedly smaller than the distances LS1 and LS2.

For this reason, at a given level of external force applied to the photographic lens 2, the level of force working at PU3 will be greater than the levels of force working at PU1 and PU2.

Accordingly, the body-side third tab 130 in the embodiment is formed so as to assume a greater length along the circumferential direction compared to the body-side first tab 110 and the body-side second tab 120. Greater strength is thus assured for the body-side third tab 130 over the body-side first tab 110 and the body-side second tab 120. In addition, the accessory-side third tab 230 at the accessory mount 200, which is to come into contact with the contact portion 135 (i.e., PU3) when the photographic lens 2 is fully mounted, is formed to achieve a greater length along the circumferential direction than the accessory-side first tab 210 and the accessory-side second tab 220. Consequently, since ample strength is assured at the body-side third tab 130 and the accessory-side third tab 230, the body-side third tab 130 and the accessory-side third tab 230, which are to be subjected to the highest levels of force, will remain intact even when the camera body 1 assumes the longitudinal orientation shown in FIG. 19.

As described above, the advantage of reliably disallowing erroneous insertion at a phase other than the correct interlock phase and the advantage of assuring sufficient strength for the accessory mount 200 and the body mount 100 when the photographic lens 2 having been inserted at the correct interlock phase is fully mounted can both be achieved through the embodiment described above.

(5) As explained earlier, different functions are achieved in the area near the first side end 231 and in the area near the second side end 232 along the direction in which the accessory-side third tab 230 extends. As a result, the durability of the accessory-side third tab 230 is improved. The accessory-side third tab 230, where the application of force at PU3 occurs when the camera body 1 assumes the longitudinal orientation with the right side thereof turned upward, is subjected to the highest level of force. With the durability of this accessory-side third tab 230 coming under the heaviest onus improved as described above, the durability and the reliability of the accessory mount 200 itself are improved.

(6) As explained earlier, different functions are achieved in the area near the first side end 111 and in the area near the second side end 112 along the direction in which the body-side first tab 110 extends. The durability of the body-side first tab 110 is thus improved. The body-side first tab 110, where the spring 116, which, under the weight of the photographic lens 2, is subjected to a more significant and continuous onus compared to the other springs 126 and 136, and the application of force occurs at Pu1 as described earlier when the camera body 1 assumes the typical lateral orientation, is subjected to an onus most frequently. Since the durability of the body-side first tab 110 coming under the most frequent onus is improved, the durability and the reliability of the body mount 100 itself are improved.

(7) The contact portion 115 is set substantially at the top center of the body mount 100 in the structure achieved in the embodiment and thus, a large value can be set for LS1 mentioned earlier. As a result, the level of force applied at the contact point PU1 can be reduced, which improves the durability of the body-side first tab 110 and effectively prevents the photographic lens 2 from drooping down at its front side. At the same time, the body-side first tab 110 is set at the top center of the body mount 100 and, as a result, sufficient strength is assured for the contact portion 115. As a result, the durability of the body-side first tab 110 is improved. This ultimately leads to improvements both in the durability and in the reliability of the body mount 100.

(8) As indicated in FIG. 16, the lower areas of the rear surfaces of the body-side tabs 110 to 130 and the lower areas of the front surfaces of the accessory-side tabs 210 to 230 come into contact with each other least readily. This means that there is not a significant need for having the body-side tabs 110 to 130 and the accessory-side tabs 210 to 230 come into contact with each other over these areas. Accordingly, the largest body-side third gap 153 in the embodiment is positioned on the lower side of the body mount 100, as illustrated in FIG. 5. This, in turn, ensures that the body-side tabs 110 to 130 can be positioned in a highly rational configuration.

(9) The following is the rationale for disposing the accessory-side tabs 210 to 230 at the specific positions indicated in FIG. 6. Namely, it is desirable to assure a high degree of strength with a greater length assumed along the circumferential direction at the accessory-side first tab 210, which is positioned at the top center when the photographic lens 2 is mounted at the camera body 1 assuming the lateral orientation. However, since the largest body-side third gap 153 is set on the lower side of the body mount 100, as described earlier, the accessory-side third tab 230, which passes through the body-side third gap 153 when the accessory mount is inserted at the correct interlock phase, is formed to range over the greatest length along the circumferential direction. Accordingly, the accessory-side first tab 210 is formed to range over a second largest length along the circumferential direction. The accessory-side second tab 220, which is not subjected to as many requirements, is formed so as to extend over a smallest range along the circumferential direction. The accessory-side tabs 210 to 230 formed as described above can be disposed with a high level of rationality.

Second Embodiment

Figure 23:
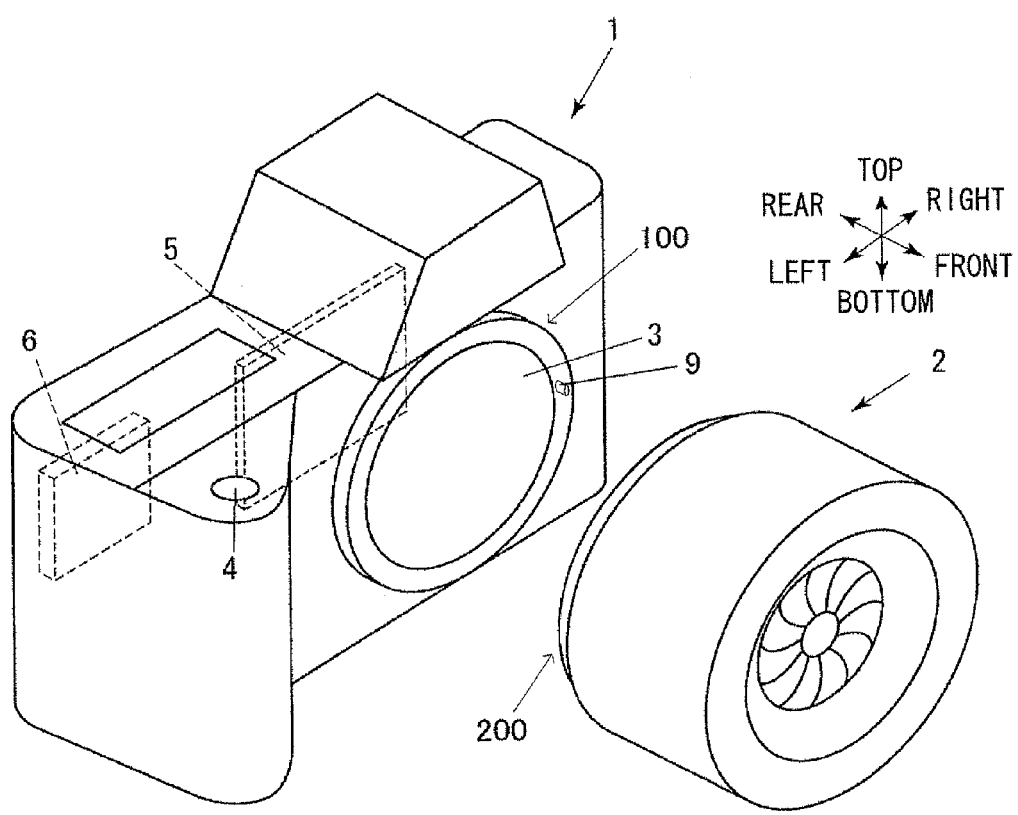
FIG. 23 is a perspective schematically illustrating a camera body with exchangeable lenses and a photographic lens that can be detachably mounted at the camera body, achieved in a second embodiment.

In reference to FIGS. 23 through 35, the camera accessory, the accessory mount, the camera body and the body mount achieved in a second embodiment of the present invention are described. FIG. 23 is a schematic perspective of a camera body 1 with the exchangeable lenses and an exchangeable photographic lens 2 that may be detachably mounted at the camera body 1, achieved in the second embodiment. A shutter release button 4, an image sensor 5 and a control circuit 6 that controls various units of the camera body 1 are disposed at the camera body 1. Reference numeral 3 indicates a photographic optical path through which a subject image departing the photographic lens 2 is guided to the image sensor 5. Reference numeral 9 indicates a lens retainer lock pin used to lock the photographic lens 2 having been mounted fully at the camera body 1, so as to disallow rotation thereof.

—Body Mount 100—

Figure 24A:
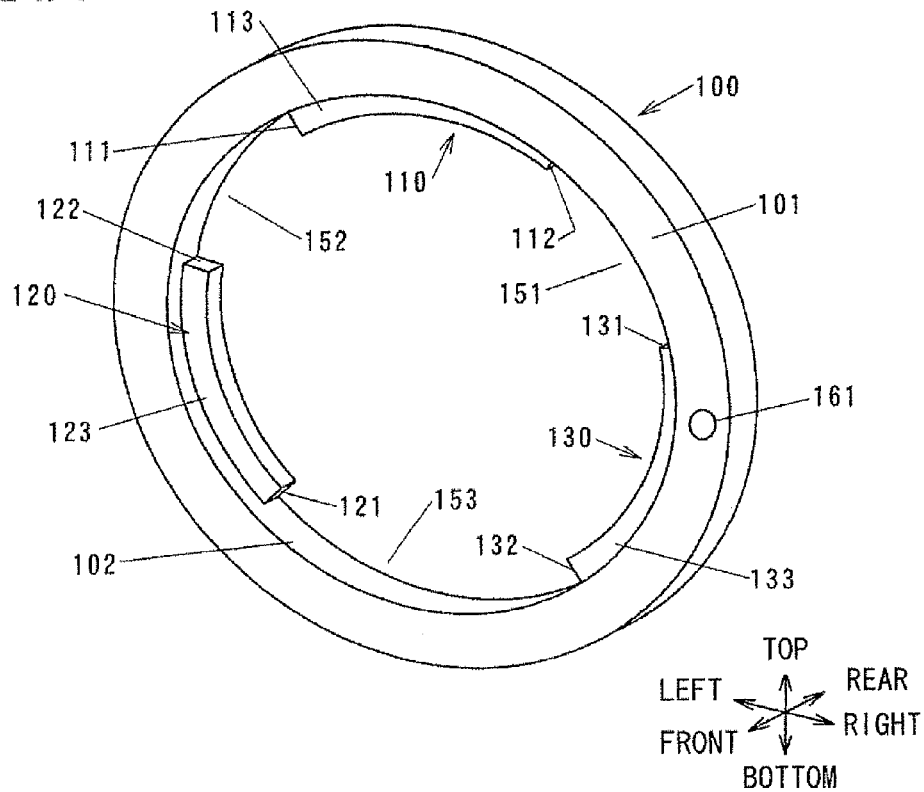
FIGS. 24A and 24B present a perspective schematically illustrating the structure of the body mount 100, viewed along a diagonal direction from a front right viewpoint relative to the camera body.
Figure 24B:
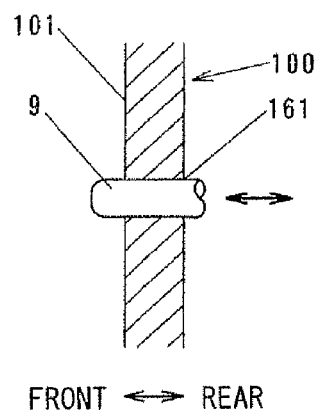

FIG. 24A is a schematic perspective illustrating the structure of the body mount 100, viewed along a diagonal direction from a front right viewpoint relative to the camera body 1 and FIG. 24B is a sectional view of the body mount 100 over an area around the lens retainer lock pin 9. The body mount 100 adopts a bayonet structure that includes three tabs (body-side tabs) set apart from one another along the circumferential edge of a circular opening (photographic optical path) at the camera body 1, each projecting inward from the outer side of the opening circumference. Among the three body-side tabs, the body-side tab located at the uppermost position is referred to as a body-side first tab 110, the body-side tab located next to the body-side first tab 110 along the counterclockwise direction in the figure is referred to as a body-side second tab 120 and the body-side tab located next to the body-side second tab 120 along the counterclockwise direction is referred to as a body-side third tab 130.

Reference numeral 101 indicates a body mount reference surface. The body mount reference surface 101 is a ring-shaped flat surface formed so as to face toward the front side. As the photographic lens 2 is mounted at the camera body 1, the body mount reference surface 101 comes into contact with an accessory mount reference surface 201 of the accessory mount 200, which is to be described in detail later, thereby regulating the position assumed by the photographic lens 2 along the front-rear direction. Reference numeral 102 indicates an inner circumferential surface of the cylindrical body mount 100. The inner circumferential surface 102, which interlocks with a fitting portion 202 of the accessory mount 200 to be detailed below, is used as a reference surface, in reference to which the optical axis of the photographic lens 2 is aligned with the optical axis of the camera body 1 (the central axis of the photographic optical path 3).

Reference numeral 161 indicates a pin hole through which the lens retainer lock pin 9 projects out or retracts in. It is to be noted that a force applied by a spring (not shown) pushes the lens retainer lock pin 9 to project out at the body mount reference surface 101, as shown in FIG. 24 B. As the user presses a lens release button (not shown), the lens retainer lock pin 9 retracts backward relative to the body mount reference surface 101 against the force imparted by the spring (not shown).

—Accessory Mount 200—

Figure 25:
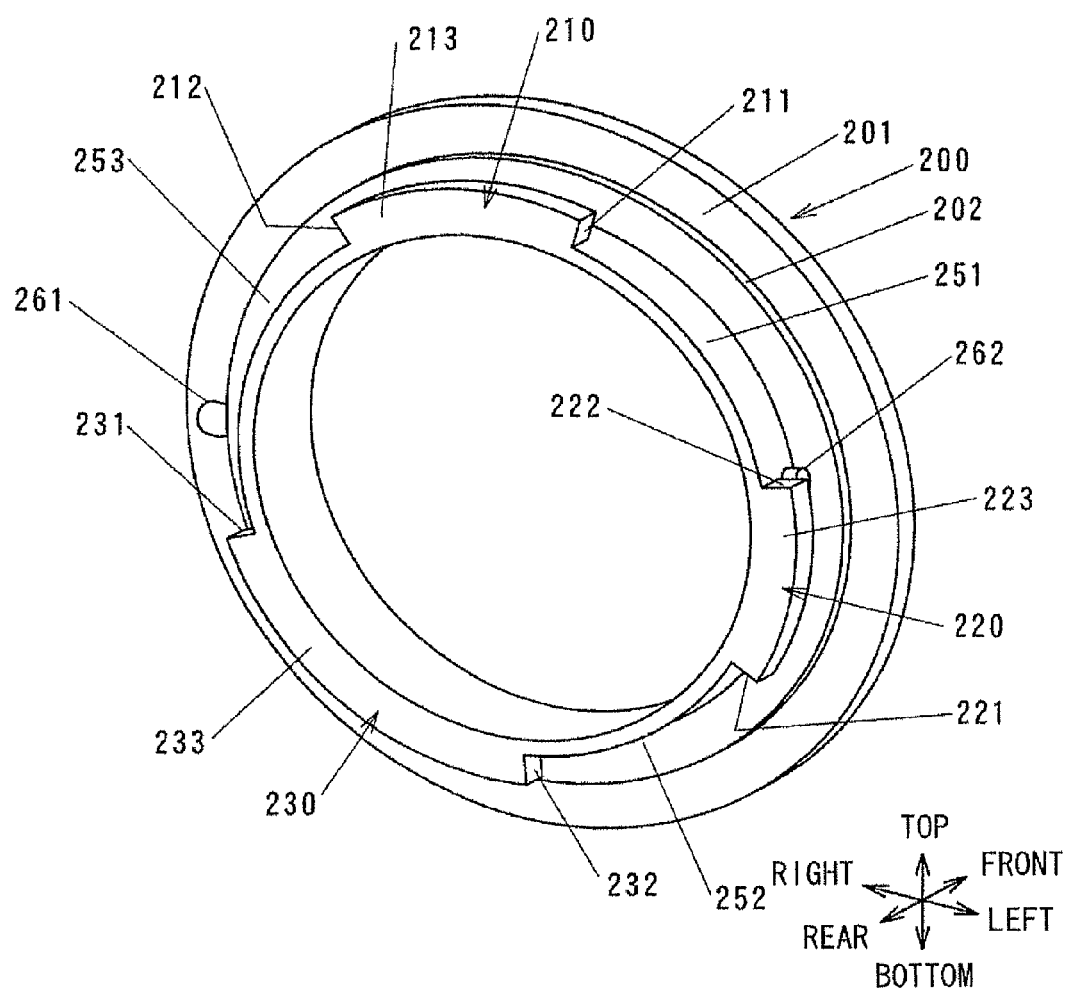
FIG. 25 is a perspective schematically illustrating the structure of the accessory mount, viewed along a diagonal direction from a rear left viewpoint relative to the photographic lens.

FIG. 25 is a perspective schematically illustrating the structure of the accessory mount 200, viewed along a diagonal direction from a rear left viewpoint relative to the photographic lens 2. It is to be noted that FIG. 25 shows the accessory mount 200 with the photographic lens 2 fully mounted at the camera body 1 (mounting complete state), i.e., in a photographing-enabled state. This means that the top-bottom/left-right orientation of the accessory mount 200 shown in FIG. 25 matches the top-bottom/left-right orientation of the camera body 1. Unless specifically noted, the following description is given by assuming that the top-bottom/left-right orientation of the accessory mount 200 is the orientation in the mounting complete state.

The accessory mount 200 adopts a bayonet structure that includes three tabs (accessory-side tabs) set apart from one another along the circumferential direction, each projecting from the inner side of the circumference toward the outer side of the circumference. Among the three accessory-side tabs, the accessory-side tab located at the uppermost position is referred to as an accessory-side first tab 210, the accessory-side tab located next to the accessory-side first tab 210 along the clockwise direction in the figure is referred to as an accessory-side second tab 220 and the accessory-side tab located next to the accessory-side second tab 220 along the clockwise direction is referred to as an accessory-side third tab 230.

The space created between two consecutive accessory-side tabs through which a body-side tabs passes when the photographic lens 2 is being mounted or dismounted as explained later, is referred to as an accessory-side gap. The accessory-side gap present between the accessory-side first tab 210 and the accessory-side second tab 220 is referred to as an accessory-side first gap 251, the accessory-side gap located next to the accessory-side first gap 251 along the clockwise direction in the figure is referred to as an accessory-side second gap 252 and the accessory-side gap located next to the accessory-side second gap along the clockwise direction is referred to as an accessory-side third gap 253.

The surface of the accessory-side first tab 210 facing rearward is referred to as a rear surface 213, the side end of the accessory-side first tab 210 facing the accessory-side first gap 251 is referred to as a first side end 211 and the side end of the accessory-side first tab 210 facing the accessory-side third gap 253 is referred to as a second side end 212. Likewise, the surface of the accessory-side second tab 220 facing rearward is referred to as a rear surface 223, the side end of the accessory-side second tab 220 facing the accessory-side second gap 252 is referred to as a first side end 221, and the side end of the accessory-side second tab 220 facing the accessory-side first gap 251 is referred to as a second side end 222. The surface of the accessory-side third tab 230 facing rearward is referred to as a rear surface 233, the side end of the accessory-side third tab 230 facing the accessory-side third gap 253 is referred to as a first side end 231 and the side end of the accessory-side third tab 230 facing the accessory-side second gap 252 is referred to as a second side end 232. The first side ends 211, 221 and 231 are tab ends facing toward the mounting direction, to be described in detail later, whereas the second side ends 212, 222 and 232 are tab ends facing toward a direction (dismounting direction) opposite the mounting direction.

It is to be noted that, although not shown in FIG. 25, the surface of the accessory-side first tab 210 facing forward is referred to as a front surface 214. Likewise, the surface of the body-side second tab 220 facing forward and the surface of the accessory-side third tab 230 facing forward are respectively referred to a front surface 224 and a front surface 234.

Reference numeral 201 indicates an accessory mount reference surface. The accessory mount reference surface 201 is a ring-shaped flat surface formed so as to face rearward, and is in contact with the body mount reference surface 101 when the photographic lens 2 is fully mounted at the camera body 1. Reference numeral 202 indicates a fitting portion. The fitting portion 202 is a cylindrical portion that fits at the inner circumferential surface 102 of the body mount 100 and is used for reference when aligning the optical axis of the photographic lens 2 with the optical axis of the camera body 1 (the central axis of the photographic optical path 3). Reference numeral 261 indicates a pin hole. As the lens retainer lock pin 9, which projects out or retracts into the pin hole 161 at the body mount 100, is inserted through the pin hole 261, rotation of the fully mounted photographic lens 2 relative to the camera body 1 (body mount 100) becomes disallowed and the photographic lens 2 thus becomes locked.

Figure 26A:
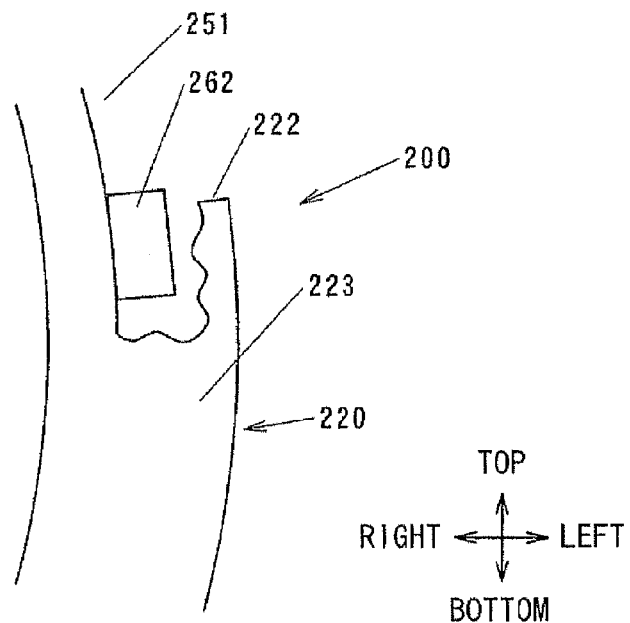
FIGS. 26A and 26B indicate the position at which a restricting member is disposed.
Figure 26B:
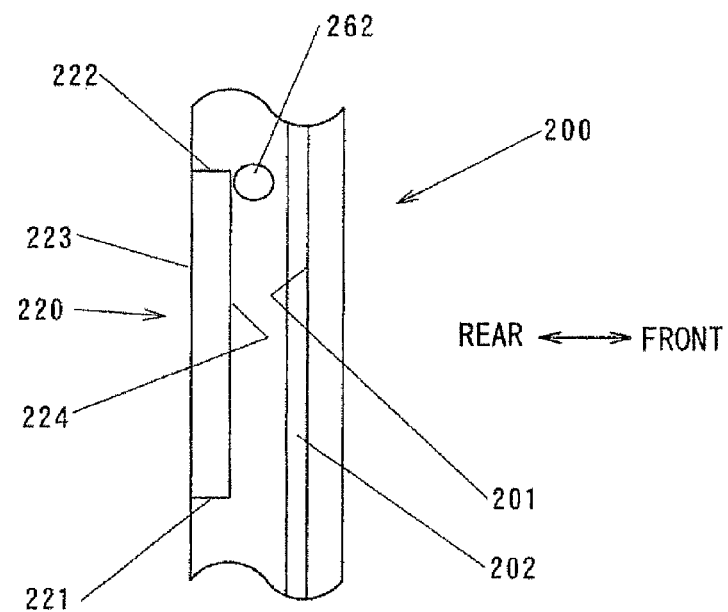

A restricting member 262, which limits the rotation range of the photographic lens 2 (accessory mount 200) relative to the camera body 1 (body mount 100) while the photographic lens 2 is mounted or dismounted, is disposed frontward relative to the accessory-side second tab 220 near its second side end 222, as shown in FIG. 25 and in FIGS. 26A and 26B. The restriction of the rotation range achieved via the restricting member 262 will be described in detail later. The restricting member 262 may be, for instance, a headed pin screwed in from the outer side of the accessory mount 200 along the radial direction. It is to be noted that FIG. 26A shows the accessory-side second tab 220 near the second side end 222, viewed from the rear-side, whereas FIG. 26B shows the accessory-side second tab 220 near the second side and 222, viewed from the left side.

—Positions of Body-Side Tabs and Body-Side Gaps—

Figure 27:
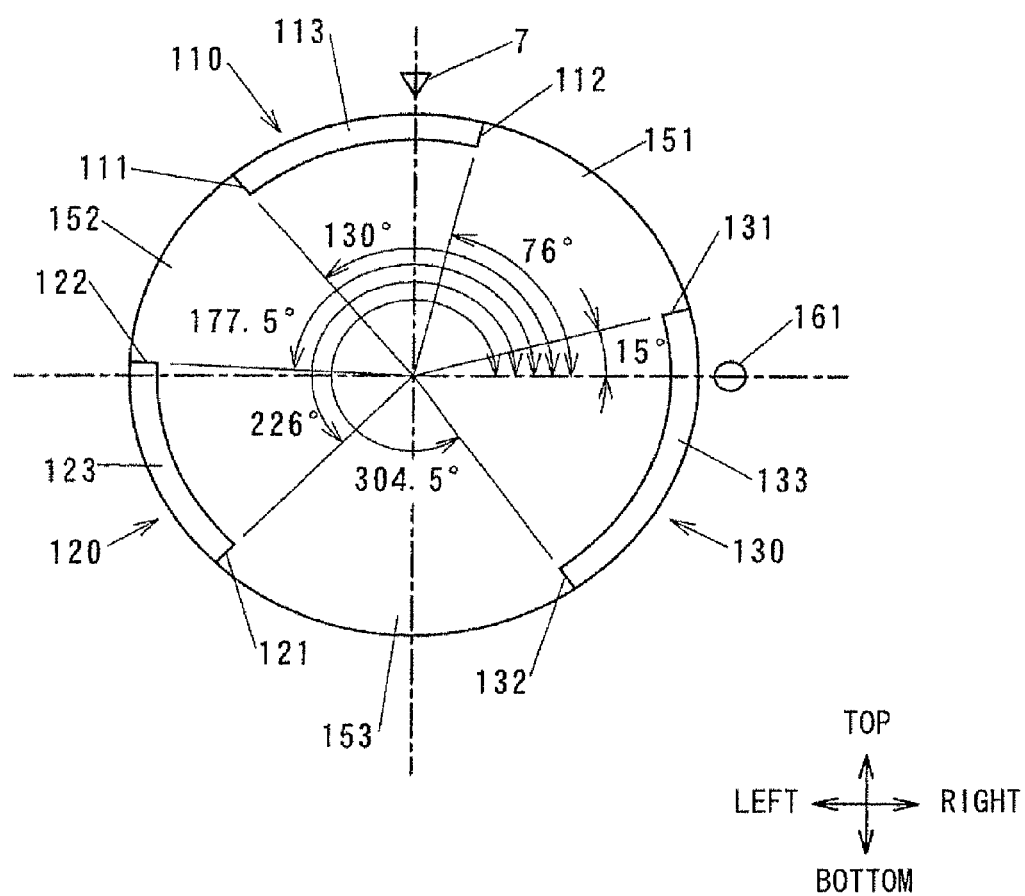
FIG. 27 indicates the positions of the body-side tabs and the body-side gaps at the body mount viewed from the front side of the camera body.

FIG. 27 indicates the positions of the body-side tabs and body-side gaps at the body mount 100 viewed from the front side of the camera body 1. A reference angular position is taken along the three o'clock direction at the body mount 100 viewed from the front side of the camera body 1 and various angles representing the positions at which the body-side tabs are disposed, are assumed along the counterclockwise direction relative to the three o'clock direction. Namely, the body-side first tab 110 extends over an angular range of 76° to 130°, the body-side second tab 120 extends over an angular range of 177.5° to 226° and the body-side third tab 130 extends over an angular range of 304.5° to 15° (375°).

The sizes of the individual body-side tabs 110 to 130 can each be indicated by the corresponding angular range along the circumferential edge of the circular opening at the body mount 100. Namely, the body-side first tab 110 has a 54° angular range, the body-side second tab 120 has a 48.5° angular range and the body-side third tab 130 has a 70.5° angular range. Likewise, the sizes of the individual body-side gaps 151 to 153 can each be indicated by the corresponding angular range along the circumferential edge of the circular opening at the camera body 1. Namely, the body-side first gap 151 has a 61° angular range, the body-side second gap 152 has a 47.5° angular range and the body-side third gap 153 has a 78.5° angular range. The body-side second gap 152 (47.5°) is thus the smallest gap at the camera body mount 100.

Reference numeral 7 in FIG. 27 indicates an index mark at the camera body 1. The index mark 7 is used as a reference mark when mounting the photographic lens 2 at the camera body 1. The index mark 7 assumes a 90° angular position counterclockwise relative to the reference three o'clock direction taken at the body mount 100 viewed from the front side of the camera body.

—Positions of Accessory-Side Tabs and Accessory-Side Gaps—

Figure 28:
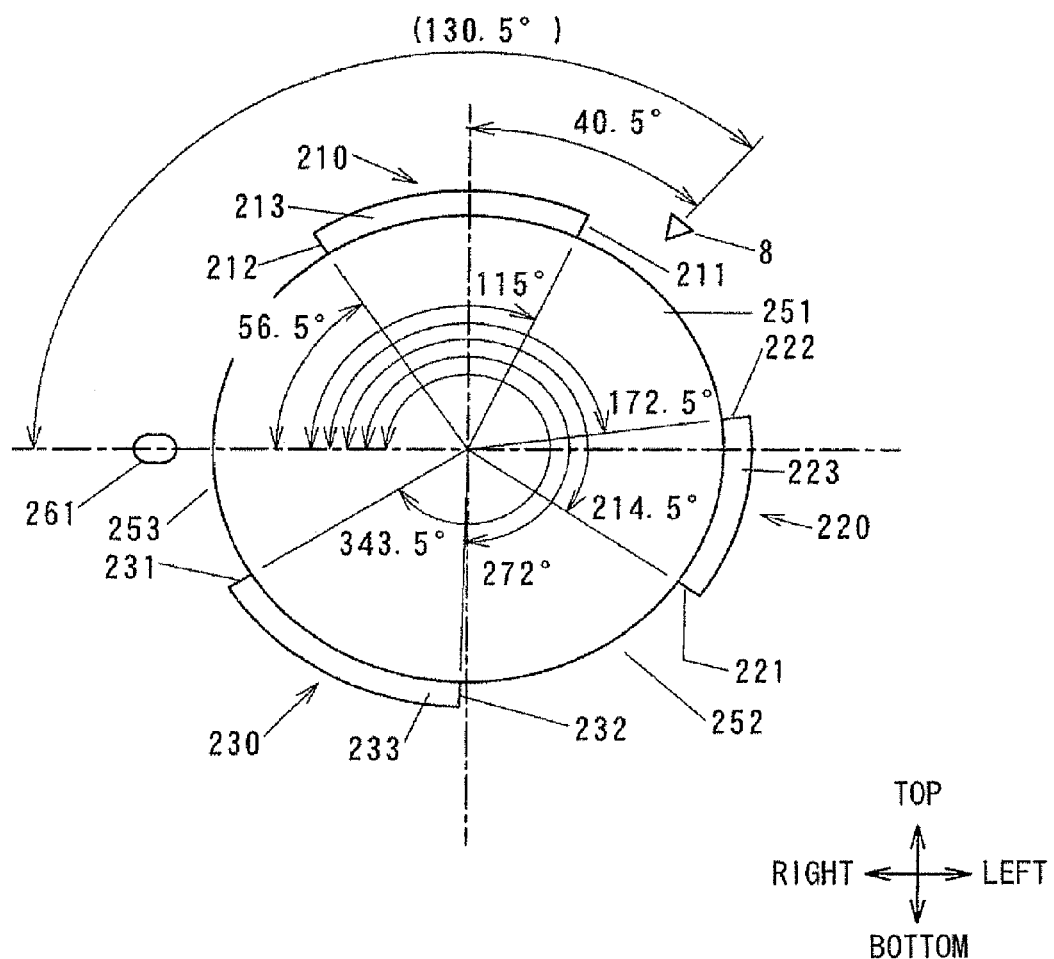
FIG. 28 indicates the positions of the accessory-side tabs and the accessory-side gaps at the accessory mount viewed from the rear side of the photographic lens.

FIG. 28 indicates the positions of the accessory-side tabs and the accessory-side gaps at the accessory mount 200 viewed from the rear side of the photographic lens 2. A reference angular position is taken along the nine o'clock direction at the accessory mount 200 viewed from the rear side of the photographic lens 2 fully mounted at the camera body. Various angles, representing the positions at which the accessory-side tabs are disposed, are assumed along the clockwise direction relative to the nine o'clock direction. Namely, the accessory-side first tab 210 extends over an angular range of 56.5° to 115°, the accessory-side second tab 220 extends over an angular range of 172.5° to 214.5° and the accessory-side third tab 230 extends over an angular range of 272° to 343.5°.

The ranges over which the accessory-side tabs 210 to 230 extend along the circumference of the accessory mount 200 can each be indicated by the corresponding angular range along the circumference of the accessory mount 200. Namely, the accessory-side first tab 210 has a 58.5° angular range, the accessory-side second tab 220 has a 42° angular range and the accessory-side third tab 230 has a 71.5° angular range. In other words, the angles indicating the ranges of the first through third accessory-side tabs, each representing the range of a circular arc extending along the circumferential direction, are; 58.7° for the accessory-side first tab 210, 42° for the accessory-side second tab 220 and 71.5° for the accessory-side third tab 230. This means that the smallest tab among the accessory-side tabs is the accessory-side second tab 220 (42°).

Likewise, the sizes of the individual accessory-side gaps 251 to 253 can each be indicated by the corresponding angular range along the circumference of the accessory mount 200. Namely, the accessory-side first gap 251 has a 57.5° angular range, the accessory-side second gap 252 has a 57.5° angular range and the accessory-side third gap 253 has a 73° angular range.

Reference numeral 8 in FIG. 28 indicates an index mark 8 at the photographic lens 2. The index mark 8 is used as a reference mark when mounting the photographic lens 2 at the camera body 1. The index mark 8 assumes a 130.5° angular position clockwise relative to the reference nine o'clock direction taken at the accessory mount 200 viewed from the rear side of the photographic lens 2 in the mounting complete state. This angle is equal to a value representing the sum of 90° and a mounting angle of 40.5° to be described in detail later.

As explained earlier, the restricting member 262 is disposed frontward relative to the accessory-side second tab 220 near its second side end 222. This means that the restricting member 262 is disposed near the accessory-side second tab 220 extending over the shortest range along the circumference of the accessory mount 200 (with the smallest angular range along the circumference of the accessory mount 200).

—Mounting the Photographic Lens 2 at the Camera Body 1—

Figure 29:
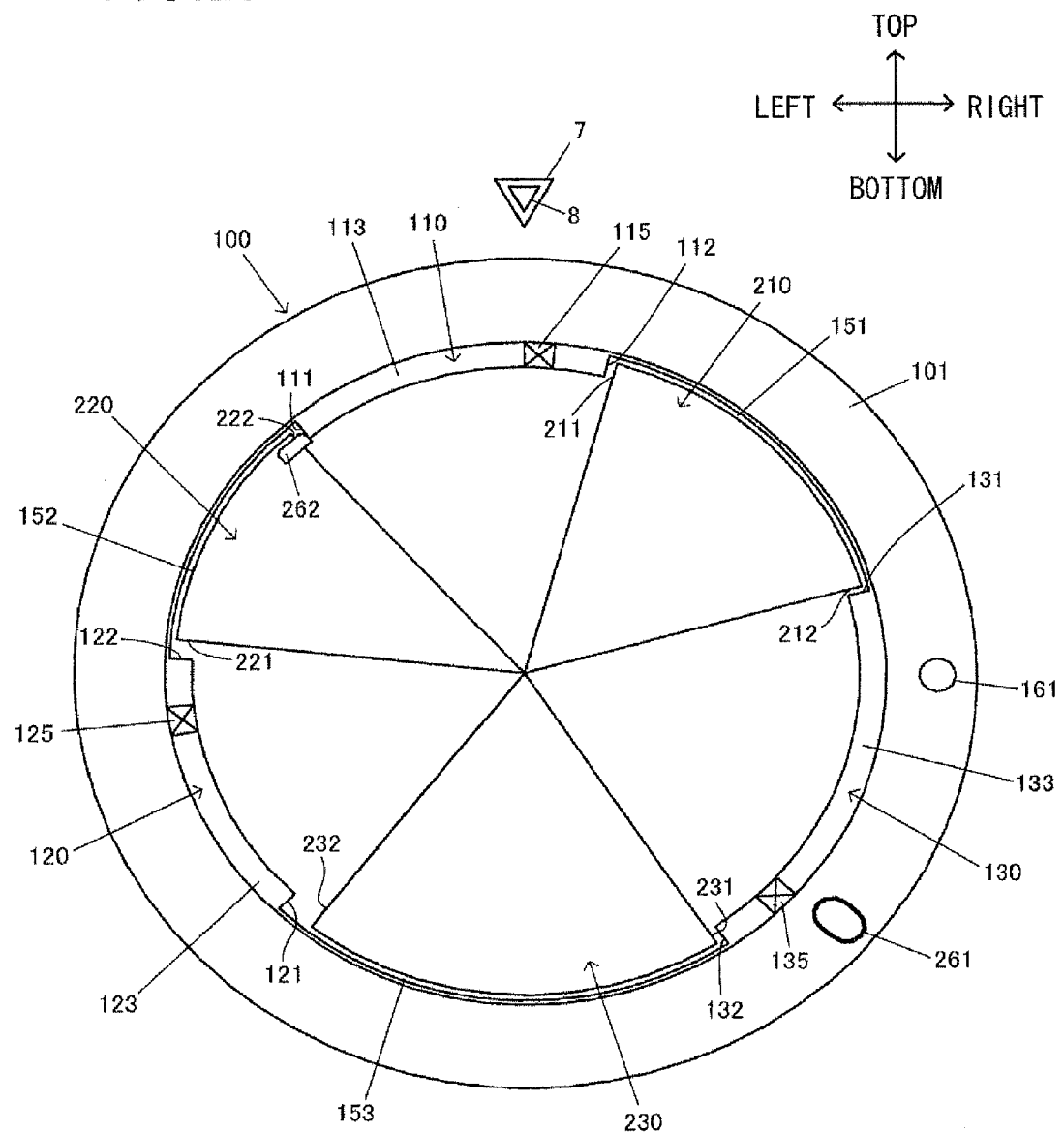
FIG. 29 shows a specific state of interference (state of overlap) between the body-side tabs and the accessory-side tabs.

The photographic lens 2 structured as described above is mounted at the camera body 1 through the following procedure. It is to be noted that the rotational position assumed by the photographic lens 2 relative to the camera body 1 when the axis extending along the front-rear direction through the center of the photographic optical path 3 of the camera body 1 and the optical axis of the photographic lens 2 are aligned with each other is to be hereafter referred to simply as an interlock phase. While sustaining the alignment of the axis extending along the front-rear direction through the center of the photographic optical path 3 at the camera body 1 and the optical axis of the photographic lens 2, the photographic lens 2 is mounted at the camera body 1 by aligning the rotational position of the index mark at the photographic lens 2 with the rotational position of the index mark at the camera body 1. When the two index marks are aligned, the photographic lens 2 and the camera body 1 achieve a positional relation relative to each other in which the body-side tabs 110 to 130 and the accessory-side tabs 210 to 230 do not interfere with each other, as shown in FIG. 29, and the accessory mount 200 can be thus inserted through the body mount 100 until the accessory mount reference surface 201 contacts the body mount reference surface 101. The interlock phase assumed in this state is to be referred to as a correct interlock phase. It is to be noted that in FIG. 29, showing a specific state of interference (state of overlap) between the body-side tabs 110 to 130 and the accessory-side tabs 210 to 230, the accessory-side tabs are shown as fan-shaped members in a schematic representation.

As the accessory mount 200 is inserted at the body mount 100 at the correct interlock phase, the accessory-side first tab 210 passes from front to back through the body-side first gap 151, the accessory-side second tab 220 passes from front to back through the body-side second gap 152 and the accessory-side third tab 230 passes from front to back through the body-side third gap 153. Likewise, the body-side first tab 110 passes from back to front through the accessory-side first gap 251 (no reference numeral appended in FIG. 29), the body-side second tab 120 passes from back to front through the accessory-side second gap 252 (no reference numeral appended in FIG. 29) and the body-side third tab 130 passes from back to front through the accessory-side third gap 253 (no reference numeral appended in FIG. 29) as the accessory mount 200 is inserted through the body mount 100 at the correct interlock phase.

Figure 30:
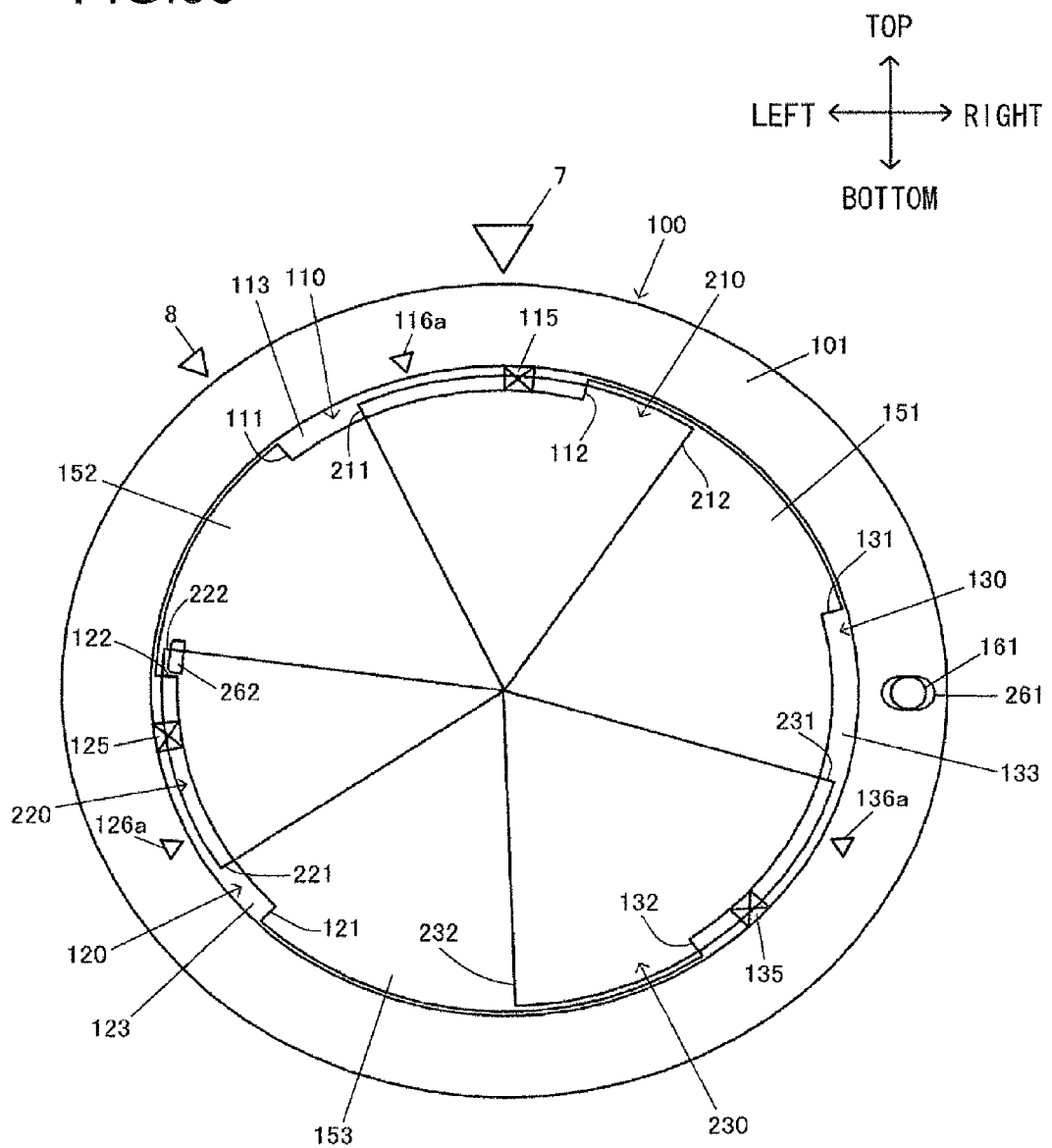
FIG. 30 shows a specific state of interference (state of overlap) between the body-side tabs and the accessory-side tabs.

As the photographic lens 2 is turned along the counterclockwise direction viewed from the front side of the camera body 1 after the accessory mount 200 is inserted through the body mount 100 at the correct interlock phase, the accessory-side first tab 210 takes up a position to the rear of the body-side first tab 110, the accessory-side second tab 220 takes up a position to the rear of the body-side second tab 120 and the accessory-side third tab 230 takes up a position to the rear of the body-side third tab 130. When the photographic lens 2 is turned by 40.5° relative to the correct interlock phase along the counterclockwise direction viewed from the front side of the camera body 1, as shown in FIG. 30, the lens retainer lock pin 9 projecting out through the pin hole 161 at the body mount 100 is inserted through the pin hole 261 at the accessory mount 200, thereby restricting counterclockwise rotation. It is to be noted that when the lens release button (not shown) is depressed so as to cause the lens retainer lock pin 9 to retract backward relative to the body mount reference surface 101 and the photographic lens 2 is rotated counterclockwise, the restricting member 262 comes in contact with the second side end 122 of the body-side second tab 120, thereby restricting rotation along the counterclockwise direction.

In other words, once the photographic lens 2 is turned by 40.5° along the counterclockwise direction from the correct interlock phase, the accessory mount 200 becomes engaged with the body mount 100 (engagement of the accessory-side tabs and the body-side tabs is completed) and thus, the photographic lens 2 becomes fully mounted. The rotational angle of 40.5°, by which the photographic lens 2 is turned from the correct interlock phase to the phase at which mounting of the photographic lens 2 is completed, is to be referred to as a mounting angle. In addition, the counterclockwise turning direction mentioned above may be otherwise referred to as a mounting direction.

When the photographic lens 2 is fully mounted, the position of the pin hole 261 at the accessory mount 200 is aligned with the position of the pin hole 161 at the body mount 100. The lens retainer lock pin 9 projecting out through the pin hole 161 at the body mount 100 is thus inserted through the pin hole 261.

—Dismounting the Photographic Lens 2 from the Camera Body 1—

The photographic lens 2 is dismounted from the camera body 1 through the following procedure. The lens release button (not shown) disposed at the camera body 1 is depressed so as to retract the lens retainer lock pin 9 from the pin hole 261. As the photographic lens 2 is turned back to the correct interlock phase along the clockwise direction viewed from the front side of the camera body 1 in this state, the accessory-side tabs and the body-side tabs become dismounted. When the photographic lens 2 is turned to the correct interlock phase, the restricting member 262 comes in contact with the first side end 111 of the body-side first tab 110, thereby preventing further rotation along the clockwise direction. In other words, the state shown in FIG. 29 is resumed. Since the body-side tabs 110 to 130 and the accessory-side tabs 210 to 230 do not interfere with each other at the correct interlock position, as explained earlier, the photographic lens 2 can be pulled forward and separated from the camera body 1. It is to be noted that the clockwise turning direction mentioned above may be otherwise referred to as a dismounting direction.

As described above, if the user attempts to mount the photographic lens 2 onto the camera body 1 while holding down the lens release button (not shown), the restricting member 262 comes in contact with the second side end 122 of the body-side second tab 120, thereby restricting rotation of the photographic lens 2 along the mounting direction. In addition, when the photographic lens 2 currently mounted at the camera body 1 is dismounted from the camera body 1, the restricting member 262 contacts the first side end 111 of the body-side first tab 110 so as to restrict rotation along the dismounting direction. In the description, the end surface of the restricting member 262 that comes in contact with the second side end 122 of the body-side second tab 120 as the user attempts to mount the photographic lens 2 at the camera body 1 while holding down the lens release button (not shown) will be referred to as a mounting side end surface. In addition, the end surface of the restricting member 262 that comes in contact with the first side end 111 of the body-side first tab 110 as the user dismounts the photographic lens 2 from the camera body 1 will be referred to as a dismounting side end surface. Namely, the mounting side end surface of the restricting member 262 is set apart, along the clockwise direction in FIG. 29, from the second side end 122 of the body-side second tab 120 by an extent matching the sum of the mounting angle and the angle representing a predetermined interval at the accessory mount 200 inserted at the body mount 100 at the correct interlock phase, as shown in FIG. 29. In addition, the dismounting side end surface of the restricting member 262 is set apart, along the counterclockwise direction in FIG. 29, from the first side end 111 of the body-side first tab 110 by an extent matching the angle representing the predetermined interval at the accessory mount 200 inserted through the body mount 100 at the correct interlock phase, as shown in FIG. 29.

—Insertion of the Photographic Lens 2 at a Phase Other than the Correct Interlock Phase—

If the user attempts to insert the photographic lens 2 at a phase other than the correct interlock phase, at least two tabs among the body-side tabs 110 to 130 at the body mount 100 and at least two tabs among the accessory-side tabs 210 to 230 at the accessory mount 200 come into contact with each other at, at least, two contact locations, and thus, insertion of the accessory mount 200 through the body mount 100 is disallowed (deterred) in the embodiment.

As can be surmised by viewing FIG. 29, if the user attempts to mount the photographic lens 2 slightly offset from the correct interlock phase along the counterclockwise direction in the figure, the rear surface 213 of the accessory-side first tab 210 will come into contact with the front surface 113 of the body-side first tab 110, the rear surface 223 of the accessory-side second tab 220 will come into contact with the front surface 123 of the body-side second tab 120, and the rear surface 233 of the accessory-side third tab 230 will come into contact with the front surface 133 of the body-side third tab 130. As a result, the three body-side tabs 110 to 130 and the three accessory-side tabs 210 to 230 will be in contact with each other and insertion of the accessory mount 200 into the body mount 100 will thus be disallowed. This situation may arise when, for instance, the accessory-side tabs 210 to 230 in FIG. 30 are positioned frontward relative to the body-side tabs 110 to 130.

Figure 31:
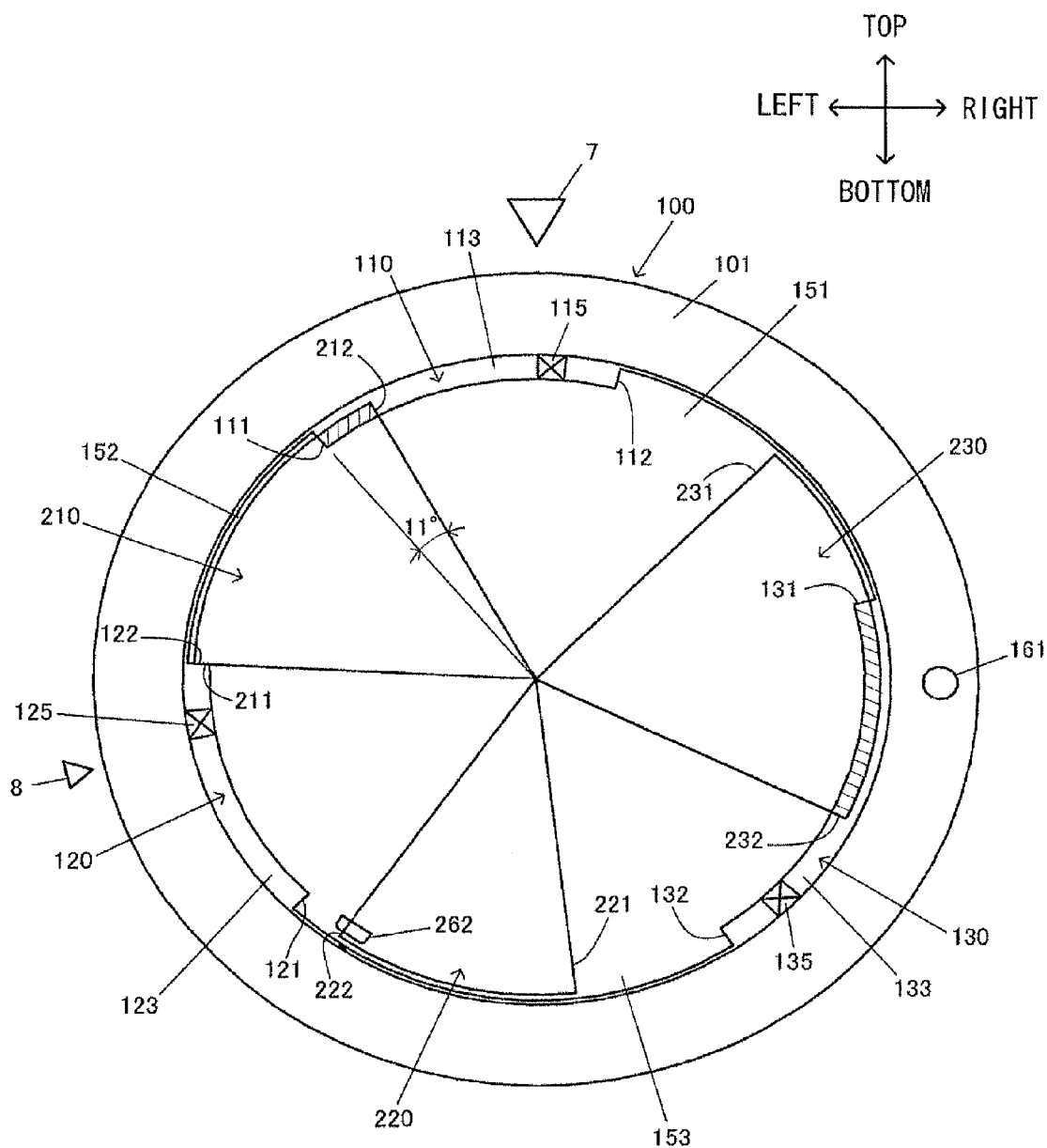
FIG. 31 shows a specific state of interference (state of overlap) between the body-side tabs and the accessory-side tabs.

If the user attempts to mount the photographic lens 2 offset by a greater extent along the counterclockwise direction relative to the state described above, the accessory-side second tab 220 will move frontward relative to the body-side third gap 153, as shown in FIG. 31 and thus, the accessory-side second tab 220 will no longer be in contact with any of the body-side tabs 110 to 130. However, the rear surface 213 of the accessory-side first tab 210 will be contact with the front surface 113 of the body-side first tab 110 and the rear surface 233 of the accessory-side third tab 230 will be contact with the front surface 133 of the body-side third tab 130. In this situation, the contact achieved by the two body-side tabs among the body-side tabs 110 to 130 and the two accessory-side tabs among the accessory-side tabs 210 to 230 disallows insertion of the accessory mount 200 through the body mount 100. The contact thus achieved by the body-side tabs 110 to 130 and the accessory-side tabs at a total of two contact locations is indicated as the hatched areas in FIG. 31.

A slight counterclockwise rotation of the photographic lens 2 will alter the positional relationship of the two mounts relative to each other in FIG. 31 to a positional relationship whereby the rear surface 213 of the accessory-side first tab 210 contacts the front surface 123 of the body-side second tab 120. Namely, a slight counterclockwise turn of the photographic lens 2 will allow the body-side tabs 110 to 130 and the accessory-side tabs 210 to 230 to achieve contact at three contact locations. If, on the other hand, the photographic lens 2 in the state shown in FIG. 31 is turned along the clockwise direction, the rear surface 213 of the accessory-side first tab 210 and the front surface 113 of the body-side first tab 110 will contact each other over a larger area and the rear surface 233 of the accessory-side third tab 230 and the front surface 133 of the body-side third tab 130 will contact each other over a larger area.

In other words, FIG. 31 shows a state in which the contact of the rear surface 213 of the accessory-side first tab 210 and the front surface 113 of the body-side first tab 110 and the contact of the rear surface 233 of the accessory-side third tab 230 and the front surface 133 of the body-side third tab 130 are achieved at the two contact locations over the smallest contact area. The rear surface 213 of the accessory-side first tab 210 and the front surface 113 of the body-side first tab 110 contact each other at the interlock phase shown in FIG. 31 over an angular range, assumed by viewing the body mount 100 from the front side of the camera body 1, of 11°.

It is to be noted that there are other situations in which insertion of the accessory mount 200 through the body mount 100 is disallowed via a total of two contact locations where two tabs among the body-side tabs 110 to 130 and two tabs among the accessory-side tabs 210 to 230 contact each other. Among the plurality of states in which insertion of the accessory mount 200 through the body mount 100 is disallowed via a total of two contact locations where two tabs among the body-side tabs 110 to 130 and two tabs among the accessory-side tabs 210 to 230 achieve contact, the smallest contact area is formed at either of the two contact locations in two specific conditions, i.e., the state shown in FIG. 31 and the state (not shown) achieved by rotating the photographic lens 2 in the state shown in FIG. 31 by 11° along the counterclockwise direction in the figure, as described below.

If the photographic lens 2 with the two mounts assuming the specific positional relationship relative to each other as shown in FIG. 31 is turned by 11° along the counterclockwise direction in the figure, the contact of the rear surface 213 of the accessory-side first tab 210 and the front surface 113 of the body-side first tab 110 will cease but the rear surface 213 of the accessory-side first tab 210 will come into contact with the front surface 123 of the body-side second tab 120. It is to be noted that contact will also be achieved as the rear surface 233 of the accessory-side third tab 230 comes into contact with the front surface 133 of the body-side third tab 130. The rear surface 213 of the accessory-side first tab 210 and the front surface 123 of the body-side second tab 120 will contact each other over an angular range, assumed by viewing the body mount 100 from the front side of the camera body 1, of 11°, as in the state shown in FIG. 31.

Thus, in this case too, contact will be achieved by the body-side tabs 110 to 130 and the accessory-side tabs 210 to 230 at a total of two contact locations. Among various states in which the contact is achieved by the rear surface 213 of the accessory-side first tab 210 and the front surface 123 of the body-side second tab 120 and contact is achieved by the rear surface 233 of the accessory-side third tab 230 and the front surface 133 of the body-side third tab 130 at a total of two contact locations, the accessory-side tabs and the body-side tabs contact each other over the smallest area in this state.

Namely, while there are various insertion disallowed states, in which insertion of the accessory mount 200 through the body mount 100 is disallowed via a total of two contact locations where two tabs among the body-side tabs 110 to 130 and two tabs among the accessory-side tabs 210 to 230 contact each other, the rear surface 213 of the accessory-side first tab 210 and the front surface 113 of the body-side first tab 110 contact each other over the smallest contact area in the state shown in FIG. 31. Likewise, the smallest contact area is also formed by the rear surface 213 of the accessory-side first tab 210 and the front surface 123 of the body-side second tab 120 in the insertion disallowed state with the photographic lens 2 turned counterclockwise by 11° relative to the state shown in FIG. 31, among the insertion disallowed states in which insertion of the accessory mount 200 through the body mount 100 is disallowed via a total of two contact locations among the body-side tabs 110 to 130 and two tabs among the accessory-side tabs 210 to 230 contact each other. The interlock phase shown in FIG. 31 and the interlock phase assumed with the photographic lens 2 turned by 11° along the counterclockwise direction relative to the state shown in FIG. 31 are each referred to as a specific interlock phase.

As described above, a counterclockwise rotation of the photographic lens 2 in the state shown in FIG. 31 will cause the figure, the rear surface 213 of the accessory-side first tab 210 to come into contact with both the front surface 113 of the body-side first tab 110 and the front surface 123 of the body-side second tab 120 and cause the rear surface 233 of the accessory-side third tab 230 to come into contact with the front surface 133 of the body-side third tab 130. In other words, the body-side tabs 110 to 130 and the accessory-side tabs 210 to 230 will achieve contact at a total of three contact locations.

As the photographic lens 2 is turned further counterclockwise in the figure until the photographic lens 2 is rotated by 11° along the counterclockwise direction relative to the state shown in FIG. 31, as described above, the rear surface 213 of the accessory-side first tab 210 and the front surface 113 of the body-side first tab 110 will cease to be in contact with each other and thus, the number of contact locations where the body-side tabs 110 to 130 and the accessory-side tabs 210 to 230 contact each other will be reduced to two.

Figure 32:
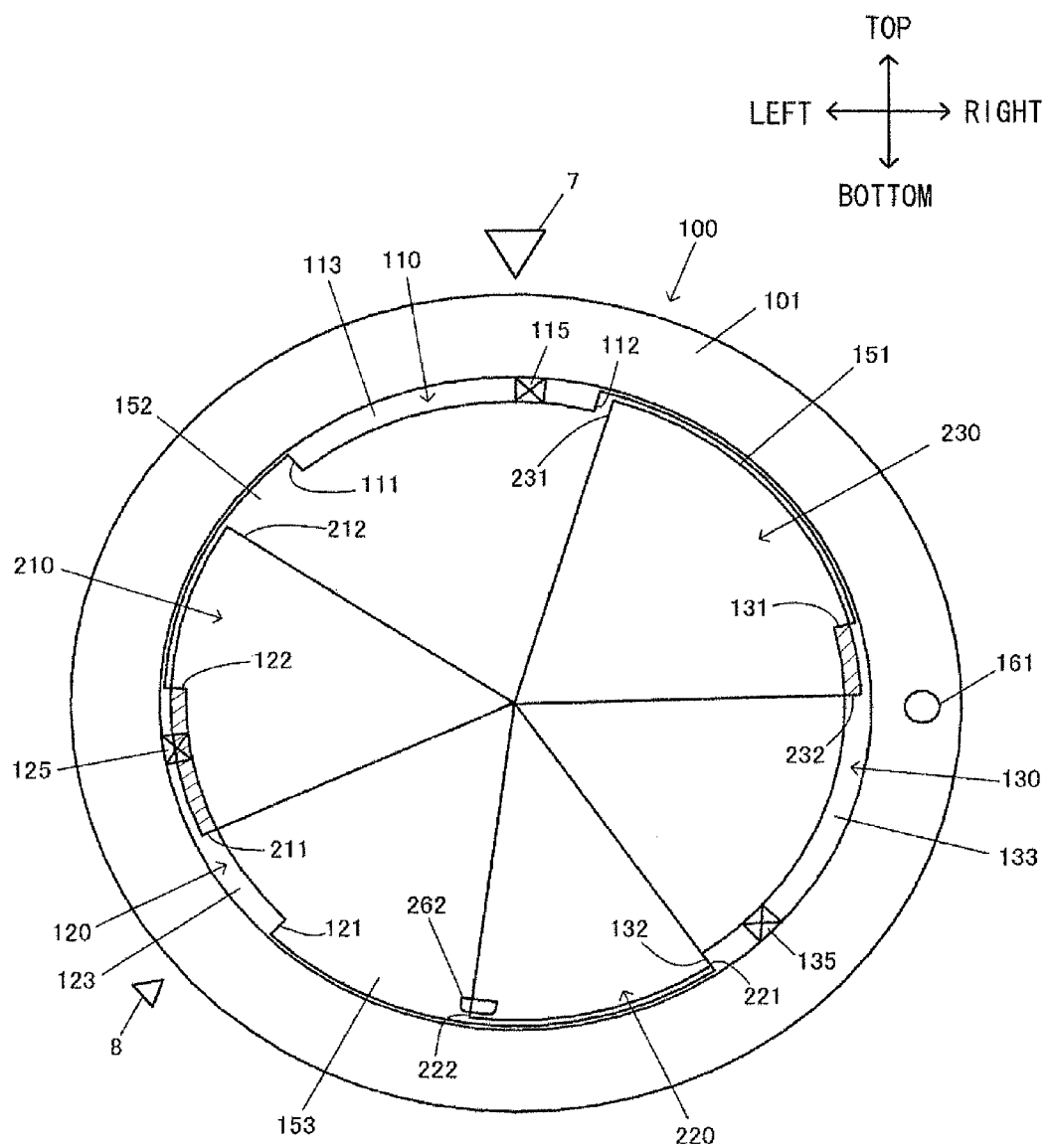
FIG. 32 shows a specific state of interference (state of overlap) between the body-side tabs and the accessory-side tabs.

As the photographic lens 2 is turned further along the counterclockwise direction in the figure, the state shown in FIG. 32 will be achieved.

As can be surmised by viewing FIG. 32, a slight counterclockwise turn of the photographic lens 2 will alter the positional relationship shown in FIG. 32, causing the rear surface 223 of the accessory-side second tab 220 to come into contact with the front surface 133 of the body-side third tab 130. In other words, contact will be achieved by the body-side tabs 110 to 130 and the accessory-side tabs 210 to 230 at a total of three contact locations. A further counterclockwise turn of the photographic lens 2 will cause the rear surface 233 of the accessory-side third tab 230 to come into contact with the front surface 113 of the body-side first tab 110 as well. In this situation, contact will be achieved by the body-side tabs 110 to 130 and the accessory-side tabs 210 to 230 over a total of four contact locations.

As the photographic lens 2 is turned further counterclockwise, the rear surface 233 of the accessory-side third tab 230 and the front surface 133 of the body-side third tab 130 will cease contact with each other and then, the rear surface 213 of the accessory-side first tab 210 and the front surface 123 of the body-side second tab 120, too, will cease contact with each other. In other words, contact will be achieved by the body-side tabs 110 to 130 and the accessory-side tabs 210 to 230 at a total of two contact locations under these circumstances, as shown in FIG. 33.

Figure 33:
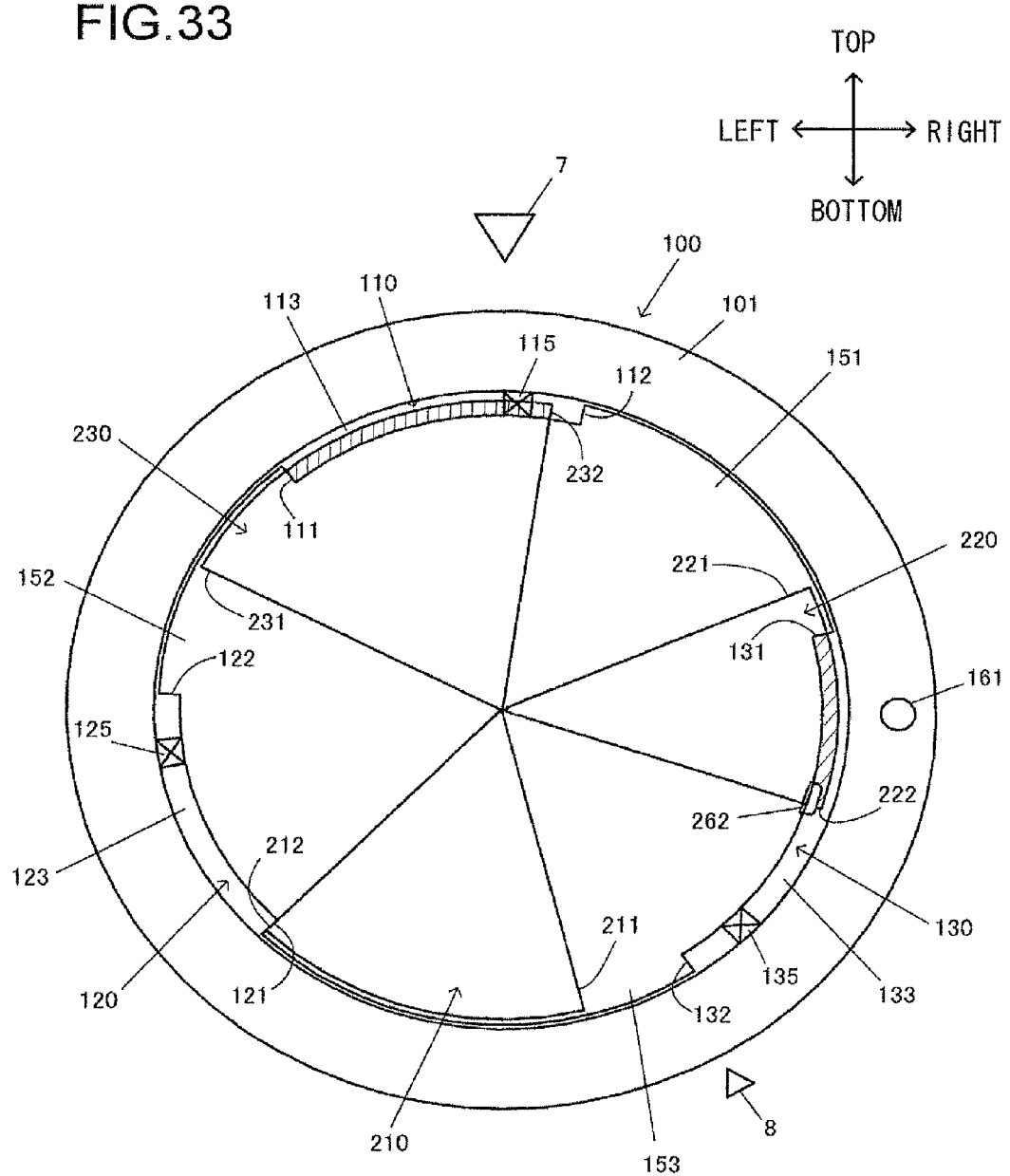
FIG. 33 shows a specific state of interference (state of overlap) between the body-side tabs and the accessory-side tabs.

A further counterclockwise turn of the photographic lens 2 in the state shown in FIG. 33 will cause a decrease in both the contact area over which the rear surface 223 of the accessory-side second tab 220 and the front surface 133 of the body-side third tab 130 are in contact with each other and the contact area over which the rear surface 233 of the accessory-side third tab 230 and the front surface 113 of the body-side first tab 110 are contact with each other. In other words, FIG. 33 shows a state in which the contact of the rear surface 223 of the accessory-side second tab 220 and the front surface 133 of the body-side third tab 130 and the contact of the rear surface 233 of the accessory-side third tab 230 and the front surface 113 of the body-side first tab 110 are achieved at two contact locations over the largest contact area.

Figure 34:
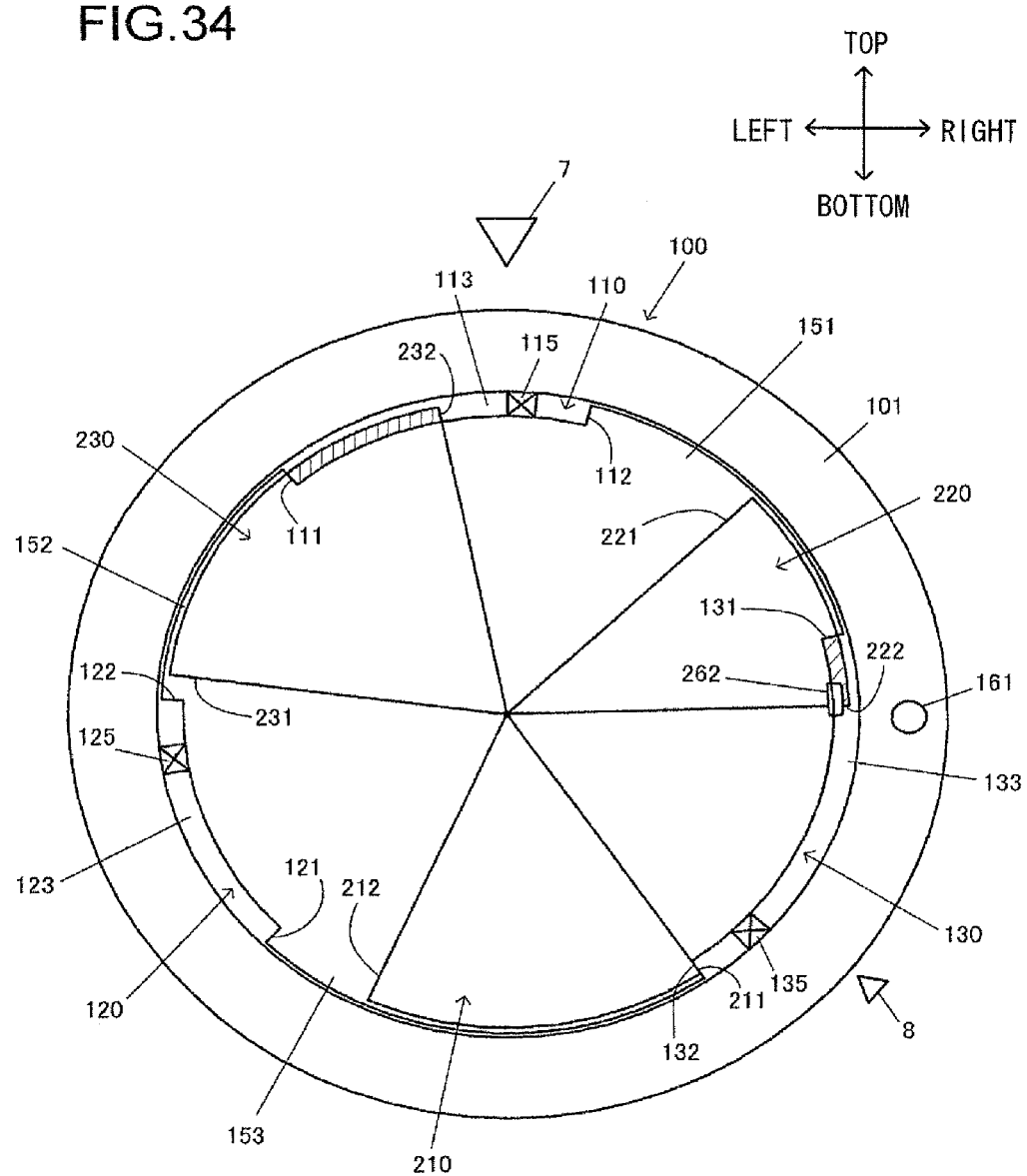
FIG. 34 shows a specific state of interference (state of overlap) between the body-side tabs and the accessory-side tabs.

FIG. 34 shows a state achieved by further turning the photographic lens 2 along the counterclockwise direction relative to the state shown in FIG. 33. Among various states in which the rear surface 223 of the accessory-side second tab 220 and the front surface 133 of the body-side third tab 130 contact each other and the rear surface 233 of the accessory-side third tab 230 and the front surface 113 of the body-side first tab 110 contact each other at a total of two contact locations, the accessory-side tabs and the body-side tabs contact each other over the smallest area in this state.

A slight counterclockwise turn of the photographic lens 2 relative to the state shown in FIG. 34 will allow the rear surface 213 of the accessory-side first tab 210 and the front surface 133 of the body-side third tab 130 to come into contact with each other. At this time, contact will be achieved by the body-side tabs 110 to 130 and the accessory-side tabs 210 to 230 at a total of three contact locations. As the photographic lens 2 in this state is turned further along the counterclockwise direction in the figure, the rear surface 233 of the accessory-side third tab 230 and the front surface 123 of the body-side second tab 120 will come into contact with each other. In this state, contact will be achieved by the body-side tabs 110 to 130 and the accessory-side tabs 210 to 230 at a total of four contact locations.

Figure 35:
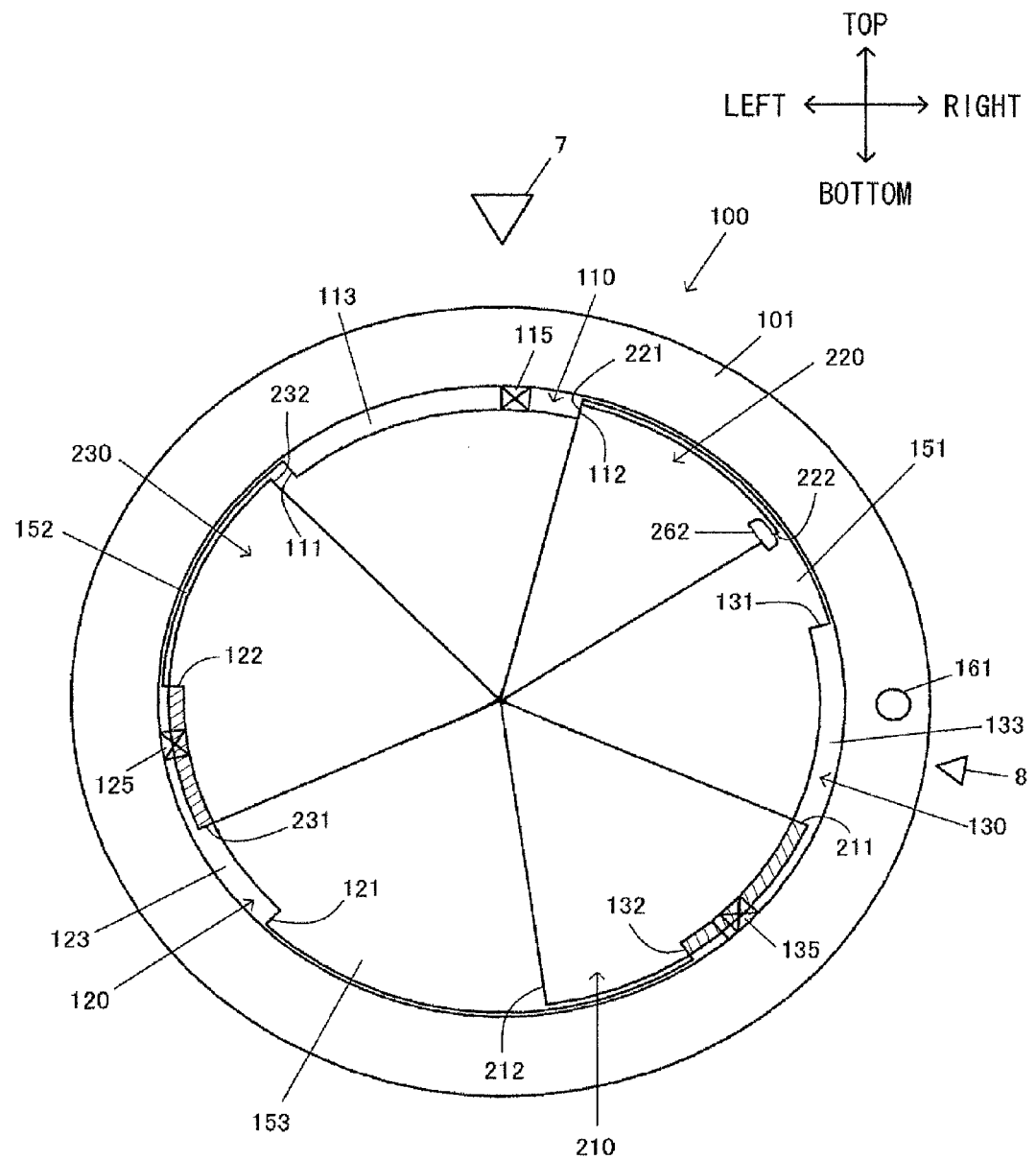
FIG. 35 shows a specific state of interference (state of overlap) between the body-side tabs and the accessory-side tabs.

As the photographic lens 2 in this state is turned further along the counterclockwise direction in the figure, the rear surface 223 of the accessory-side second tab 220 and the front surface 133 of the body-side third tab 130 will cease contact with each other. At this time, contact will be achieved by the body-side tabs 110 to 130 and the accessory-side tabs 210 to 230 at a total of three contact locations. As shown in FIG. 35, when the photographic lens 2 is further turned along the counterclockwise direction, the rear surface 233 of the accessory-side third tab 230 ceases contact with the front surface 113 of the body-side first tab 110. At this point, the body-side tabs 110 through 130 and the accessory-side tabs 210 through 230 contact each other at a total of two contact locations.

As the photographic lens 2 is slightly turned along the counterclockwise direction relative to the state shown in FIG. 35, the rear surface 223 of the accessory-side second tab 220 and the front surface 113 of the body-side first tab 110 will come into contact with each other. At this time, the body-side tabs 110 through 130 and the accessory-side tabs 210 through 230 contact each other at a total of three contact locations. As the photographic lens 2 is turned further along the counterclockwise direction in the figure, the correct interlock phase shown in FIG. 29 will be reestablished and any contact (interference) between the body-side tabs 110 to 130 and the accessory-side tabs 210 to 230 will cease.

—Rationale for Disposing the Restricting Member 262 at the Accessory-Side Second Tab 220—

In the embodiment, the restricting member 262 is disposed at the accessory-side second tab 220 so as to achieve the following advantages.

(1) Among the three tabs (210, 220 and 230) present on the accessory-side, the accessory-side second tab 220 ranges over the shortest distance along the circumference of the accessory mount 200. In other words, the accessory-side second tab 220 assumes the shortest circular arc length among the three tabs. This means that the exchangeable lens 2 can be mounted at the camera body 1 at the correct interlock phase simply by rotating the exchangeable lens 2 by an extent matching the circular arc length of the accessory-side second tab 220. Likewise, the exchangeable lens 2 can be dismounted from the camera body 1 simply by rotating the exchangeable lens 2 (along the direction opposite from the direction in which it is rotated during the mounting operation) by the extent matching the circular arc length of the accessory-side second tab 220. Namely, by disposing the restricting member at the accessory-side tab 220, the extent to which the user needs to rotate the accessory to mount or dismount it can be minimized. Consequently, the rotating operation onus placed on the user while mounting or dismounting the accessory (exchangeable lens 2) can be reduced and the length of time required to mount or dismount the accessory (exchangeable lens 2) can be reduced as well.

(2) In the embodiment, a single restricting member 262 is used both to restrict the range of rotation when mounting the accessory and restrict the range of rotation when dismounting the accessory, instead of using two separate restricting members in correspondence to the mounting operation and the dismounting operation. As a result, the number of required parts can be minimized and the mount structure can be simplified.

(3) The restricting member 262 located at the second tab 220 physically contacts a tab end of a body-side tab, which is present at a position where damage does not occur readily while the camera is in use. In other words, the restricting member 262 restricts the range of rotation of the accessory (exchangeable lens 2) being mounted or dismounted by coming into physical contact with an end portion (an end portion of the body-side tab) located at a less vulnerable position.

This point is explained in further detail below. The accessory-side second tab 220 at which the restricting member 262 is disposed moves through the body-side second gap 152 with the narrowest angular range along the circumferential edge of the circular opening at the camera body 1 while the photographic lens 2 is being mounted (at the correct interlock phase). The angular range of the body-side second group 152 along the circumferential edge of the circular opening at the camera body 1 is 47.5°. This means that the accessory-side first tab 210 (with its angular range of 58.5°) and the accessory-side third tab 230 (with its angular range of 71.5°), assuming greater angular ranges than the 47.5° angular range cannot pass through the body-side second gap 152. Thus, at any phase other than the correct interlock phase, there is no risk of the accessory-side first tab 210 or the accessory-side third tab 230 moving into the body-side second gap 152 and consequently, the first side end 111 of the body-side first tab 110 and the second side end 122 of the body-side second tab 120, which define the angular range of the body-side second gap 152, are less likely to be damaged.

The following problem would arise if the first side end 111 of the body-side first tab 110 and the second side end 122 of the body-side second tab 120 were susceptible to damage.

As explained earlier, the first side end 111 of the body-side first tab 110 comes in contact with the restricting member 262 while the photographic lens 2 is being dismounted from the camera body 1 so that the photographic lens 2 does not rotate along the dismounting direction any more than necessary. Thus, if the first side end 111 of the body-side first tab 110 becomes damaged and, for instance, chipped, the photographic lens 2 will be allowed to rotate along the dismounting direction further than necessary. Under such circumstances, the second side end 212 of the accessory-side first tab 210 may move further rearward relative to the body-side third tab 130 or the second side end 232 of the accessory-side third tab 230 may move further rearward relative to the body-side second tab 120, causing the photographic lens 2 to jam at the camera body 1.

As explained earlier, the second side end 122 of the body-side second tab 120 comes in contact with the restricting member 262 while the photographic lens 2 is being mounted at the camera body 1 by the user holding down the lens release button so as to ensure that the photographic lens 2 is not allowed to rotate along the mounting direction any further than necessary. As the photographic lens 2 mounted at the camera body 1 while holding down the lens release button (not shown) is turned along the mounting direction until the restricting member 262 comes in contact with the second side end 122 of the body-side second tab 120, at the position of the lens retainer lock pin 9 and the position of the pinhole 261 at the accessory mount 200 may become slightly offset relative to each other.

However, since the lens retainer lock pin 9 has a rounded end, the accessory mount 200, having rotated by a greater extent than necessary along the mounting direction, will be repositioned to assume the correct phase, as the lens retainer lock pin 9, driven with the force imparted from the spring (not shown) passes through the pin hole 261 once the user releases the lens release button, as long as the offset of the pin hole 261 is slight. Otherwise, as the user releases the lens release button and the photographic lens 2 is caused to move back slightly, the lens retainer lock pin 9 will slip through the pin hole 261, thereby setting the accessory mount 200 at the correct phase.

If the second side end 122 at the body-side second tab 120 becomes damaged, however, the position of the lens retainer lock pin 9 and the position of the pin hole 261 at the accessory mount 200 may become offset relative to each other by a significant extent as the photographic lens 2 is mounted at the camera body 1 while the lens release button (not shown) is held down. Under such circumstances, even if the user releases the lens release button, the lens retainer lock pin 9 will be unable to pass through the pin hole 261 and thus the accessory mount 200, having turned along the mounting direction by an excessive extent, will not resume the correct phase. As a result, problems such as disabled photographing operation due to an offset of electrical contact points (not shown) via which signals and the like are exchanged by the photographic lens 2 and the camera body 1, will occur.

In the embodiment, it is ensured that the first side end 111 of the body-side first tab 110 and the second side end 122 of the body-side second tab 120 are less susceptible to damage as described above, so as to prevent such problems and provide a more reliable camera system.

—Accessory-Side Tab 230—

As explained earlier, the front surface 234 of the accessory-side third tab 230, is pressed by the spring 136 at the body-side third tab 130 over an area near the first side end 231 and whenever an excessive external force is applied, the front surface 234 will come into contact with the contact portion 135. This means that when the photographic lens 2 is mounted at the camera body 1, the force applied to lock the photographic lens 2 to the camera body 1 will be applied primarily to the area near the first side end 231 at the accessory-side third tab 230.

—Body-Side First Tab 110—

When contact is achieved by the body-side tabs 110 to 130 and the accessory-side tabs 210 to 230 at a total of two contact locations with the body-side first tab 110 in contact with an accessory-side tab at one of the contact locations, the body-side first tab 110 invariably contacts the accessory-side tab 210, 220 or 230 on the side where its first side end 111 is located (i.e., at the front surface 113 near the first side end 111), rather than on the side where its second side end 112 is located (i.e., at the front surface 113 near the second side end 112), as shown in FIGS. 31, 33 and 34. In other words, when contact is achieved by the body-side tabs 110 to 130 and the accessory-side tabs 210 to 230 at a total of two contact locations and the body-side first tab 110 achieves contact at one of the contact locations, the function of preventing erroneous insertion is achieved in the area near the first side end 111 of the body-side first tab 110.

The spring 116 is disposed adjacent to the contact portion 115 at the body-side first tab 110 over the area near its second side end 112. Namely, the function of locking the photographic lens 2 having been mounted at the camera body 1 is achieved over the area near the second side end 112 of the body-side first tab 110.

In summary, the body-side first tab 110 is formed so that different functions are achieved in the area near the first side end 111 and the area near the second side end 112 along the direction in which the body-side first tab 110 extends.

The camera body 1 and the photographic lens 2 achieved in the second embodiment as described above achieve the following advantages in addition to the advantages of the first embodiment.

(1) In the embodiment, by disposing the restricting member 262 at the accessory-side second tab 220 assuming the smallest length along the circumference of the accessory mount 200, the extent to which the user needs to rotate the accessory to mount or dismount it can be minimized. Consequently, the rotating operation onus placed on the user while mounting or dismounting the accessory can be reduced and the length of time required to mount or dismount the accessory can be reduced as well.

(2) In the embodiment, a single restricting member 262 is used both to restrict the range of rotation when mounting the accessory and to restrict the range of rotation when dismounting the accessory. As a result, the number of required parts can be minimized and the mount structure can be simplified.

(3) In the embodiment, the restricting member 262 located at the second tab 220 physically contacts a tab end of a body-side tab, which is present at a position where damage does not occur readily. In other words, the restricting member 262 restricts the range of rotation of the accessory being mounted or dismounted by coming into physical contact with an end portion (an end portion of the body tab) located at a less vulnerable position. As a result, a rotation regulating structure assuring a high level of durability is achieved, which, in turn, makes it possible to improve the durability of the bayonet-type mount structure.

In other words, the body-side second gap 152 is formed so as to assume a narrower angular range along the circumferential edge of the circular opening at the camera body 1 compared to the other body-side gaps 151 and 153, so as to ensure that the accessory-side first tab 210 or the accessory-side third tab 230 does not move into the body-side second gap 152 at any phase other than the correct interlock phase and thus, improve the durability of the bayonet mount structure as described above.

—Variations—

(1) While the accessory-side tabs 210 to 230 are fixed onto the main body of the photographic lens 2 and the photographic lens 2 is mounted or dismounted by turning it along the mounting direction or the dismounting direction relative to the camera body 1 in the embodiments described above, the present invention is not limited to this example. For instance, the present invention may be adopted in conjunction with a structure that includes accessory-side tabs 210 to 230 rotatably disposed relative to the main body of the photographic lens 2 and allows the photographic lens 2 to be mounted at the camera body 1 simply by rotating the accessory-side tabs 210 to 230 alone along the mounting direction once the photographic lens 2 is positioned at the correct interlock phase.

Figure 20B:
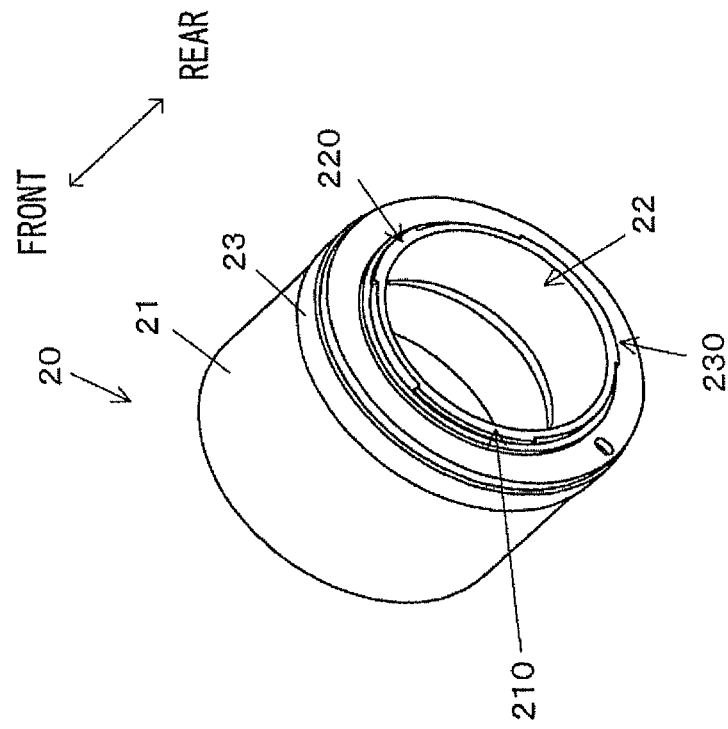
FIGS. 20A and 20B present an example of a variation.
Figure 20A:
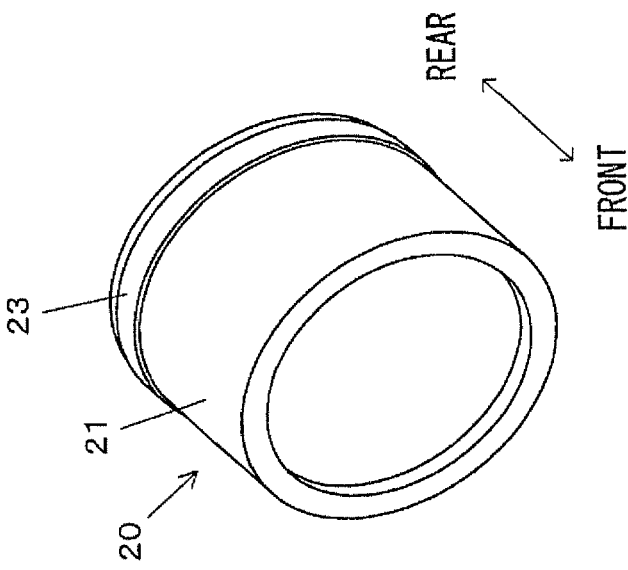

FIGS. 20A and 20B present external views of a photographic lens 20 with accessory-side tabs 210 to 230 formed thereat so that they are able to rotate relative to the main body of the photographic lens 2. The photographic lens 20 includes a lens barrel 21, a bayonet tube 22 disposed rotatably relative to the lens barrel 21, at which accessory-side tabs 210 to 230 are disposed, and an operation ring 23 via which the bayonet tube 22 is rotated relative to the lens barrel 21. It is to be noted that in FIGS. 20A and 20B and other figures in reference to which the following description is provided, the same reference numerals are assigned to members similar to those already described so as to preclude the necessity for a repeated explanation thereof.

Figure 21:
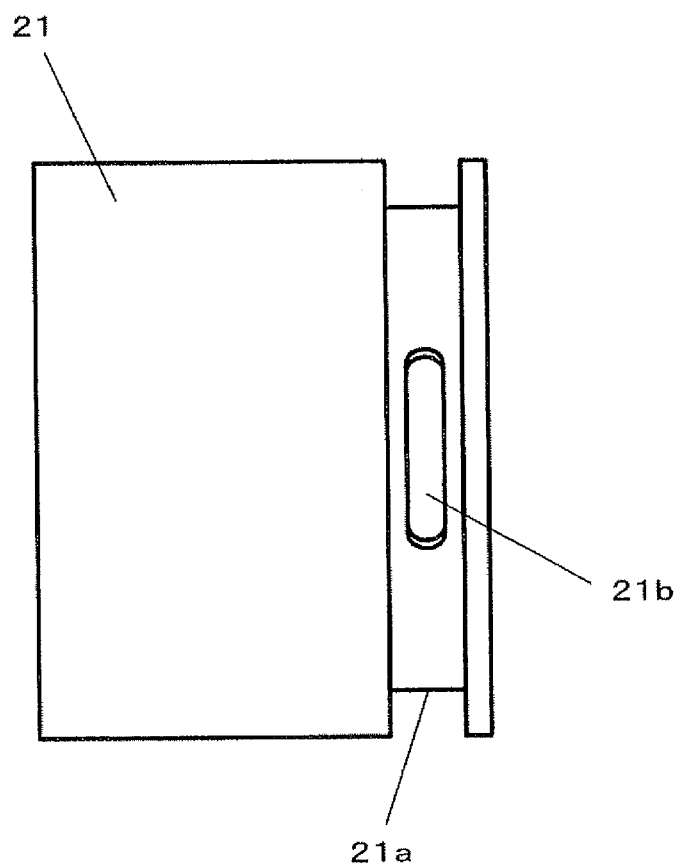
FIG. 21 illustrates the variation example.

FIG. 21 presents an external view of the lens barrel 21, whereas FIGS. 22A to 22D schematically illustrate the structure of the photographic lens 20. As shown in FIG. 21, a fitting groove 21a at which the operation ring 23 fits is formed at the rear of the lens barrel 21. An elongated hole 21b, through which a pin 24 connecting the operation ring 23 with the bayonet tube 22 is allowed to move, is formed at the bottom of the fitting groove 21a. As indicated in the sectional views presented in FIGS. 22A and 22D, the operation ring 23 fits into the fitting groove 21a at the lens barrel 21 and the operation ring 23 and the bayonet tube 22 are linked with each other via the pin 24. Reference numeral 25 indicates a lens. As the operation ring 23 is rotated relative to the lens barrel 21 in the photographic lens 20 structured as described above, the bayonet tube 22, i.e., the accessory-side tabs 210 to 230, turns together with the operation ring 23 relative to the lens barrel 21. The photographic lens 20 assuming this structure can be mounted at the camera body 1 without having to turn the lens barrel 21, by simply operating the operation ring 23 to turn the bayonet tube 22 alone along the mounting direction once the photographic lens 20 is positioned at the correct interlock phase. It is to be noted that FIG. 22D is a sectional view taken along C-C in FIG. 22A.

(2) The photographic lenses 2 and 20 described above each represent an example of a camera accessory. The present invention is not limited to these examples and may be adopted in conjunction with any of various types of camera accessories such as a converter lens used to adjust the focal length or an adapter used to adjust the distance from the photographic lens mount surface to the image capturing plane, as long as it includes an accessory mount 200, which can be engaged with a body mount 100.

(3) While the restricting member 262 described above is headed pin disposed at the accessory mount 200, an area near the second side end 222, for instance, may be formed in a specific shape so as to function as a restricting member 262, instead of providing a separate member. Namely, an area near the second side end 222 may be formed to assume a shape that will allow the area to function as a restricting member 262 through injection molding at an accessory mount 200 constituted with a resin injection mold. In addition, the restricting member 262 may be constituted with two pins; a first pin that includes a mounting side end surface, such as that explained earlier, and a second pin, different from the first pin, which includes a dismounting side end surface such as that described earlier. As a further alternative, instead of disposing separate members such as the first pin and the second pin, an area near the second side end 222 may be formed so as to assume shapes resembling a first pin and a second pin.

(4) The body mount 100 described above may be disposed at the photographic lens 2 and the accessory mount 200 described above may be disposed at the camera body 1.

(5) An explanation has been given above in reference to the embodiments on an example in which the present invention is adopted in a camera system comprising the camera body 1 and the exchangeable lens 2. However, the present invention is not limited to this example and may be adopted in any system other than a camera system, as long as it includes a mount at which the exchangeable lens 2 can be detachably mounted. Such a system may be, for instance, an electronic device such as a projector. A system similar to those described in reference to the embodiments can be achieved by equipping the projector with an exchangeable projection lens that can be detachably mounted.

(6) Various embodiments and variations described above may be adopted in combination.

It is to be noted that the present invention is not limited to specific structural features of the embodiments described above in any way whatsoever and that a camera accessory that can be detachably engaged with a camera body equipped with a camera body mount, adopting any of various structures and equipped with an accessory mount assuming a bayonet structure with first through third tabs set over intervals in a circumferential direction running along the circumference of a circle with a specific diameter and projecting radially from the circumference, characterized in that the accessory mount is allowed to be inserted through the camera body mount without any of the first through third tabs being hindered by any of three camera body-side tabs at the camera body mount, as long as the accessory mount is inserted at the camera body mount at a correct interlock phase, that the first through third tabs extend along the circumferential direction over varying lengths, with the first tab extending over a greatest length along the circumferential direction among the first through third tabs and the third tab extending over a smallest length along the circumferential direction among the first through third tabs, that the accessory mount includes a restricting member disposed near the third tab, that when the first through third tabs are rotated along the circumference in a first rotating direction in order to mount the accessory mount, having been inserted at the correct interlocked phase, at the body mount, the restricting member comes into contact with a side end of the camera body-side tab, thereby restricting the rotation range in the first rotating direction and that when the first through third tabs are rotated along the circumference in a second rotating direction opposite from the first rotating direction in order to dismount the accessory mount from the body mount, the restricting member comes into contact with a side end of another camera body-side tab different from the one camera body-side tab, thereby restricting the rotation range in the second rotating direction, and an accessory mount adopting any of various structures, which may be included in the camera accessory, are all within the scope of the present invention.

Furthermore, the present invention is not limited in any way whatsoever by the specific details of the embodiments described above and a camera body that can be detachably engaged with a camera accessory equipped with an accessory mount, adopting any of various structures and equipped with a body mount adopting a bayonet structure with first through third tabs, set over intervals along a circumferential edge of a circular opening at the camera body and projecting from the circumferential edge along a radial direction toward an inner side, characterized in that the body mount allows the accessory mount to be inserted thereat without any of the first through third tabs coming into contact with any of three accessory-side tabs at the accessory mount, as long as the accessory mount is inserted at a correct interlock phase, that the first tab and the second tab are disposed next to each other, that an interval between the first tab and the second tab is narrowest among intervals between tabs set next to each other among the first through third tabs and that an angle by which the accessory mount having been inserted at the correct interlock phase is allowed to rotate relative to the body mount is defined by the interval between the first tab and the second tab, and a body mount adopting any of various structures that may be included in the camera body, are all within the scope of the present invention.

According to the present invention described above, a bayonet-type mount assuring better ease of operation is achieved.

The above described embodiments are examples and various modifications can be made without departing from the scope of the invention.

What is claimed is:

1. An accessory that can be engaged by a rotating action in a predetermined direction, with a camera body that includes a body-side mount assuming a bayonet structure having a plurality of body-side tabs, the accessory comprising:
   a plurality of accessory-side tabs having different lengths from each other along the predetermined direction, that transfers from a first state at which the plurality of accessory-side tabs are inserted between the plurality of body-side tabs, to a second state at which the plurality of accessory-side tabs engage the plurality of body-side tabs through the rotating action in the predetermined direction; and
   a restricting member disposed at a third longest tab among the plurality of accessory-side tabs, that restricts movement in the predetermined direction by abutting a corresponding body-side tab of the plurality of body-side tabs.

2. The accessory according to claim 1, wherein
   the restricting member abuts the corresponding body-side tab when rotated in the predetermined direction by 40.5 degrees from the first state.

3. The accessory according to claim 2, wherein
the restricting member is disposed so that at least part of the restricting member overlaps with the third longest tab in a direction parallel to an axis of the rotating action in the predetermined direction.

4. An accessory that can be engaged by a rotating action in a predetermined direction, with a camera body that includes a body-side mount assuming a bayonet structure having a plurality of body-side tabs, the accessory comprising:
   a plurality of accessory-side tabs that transfers from a first state at which the plurality of accessory-side tabs are inserted between the plurality of body-side tabs, to a second state at which the plurality of accessory-side tabs engage the plurality of body-side tabs through the rotating action in the predetermined direction; and
   a restricting member that abuts a corresponding body-side tab of the plurality of body-side tabs when rotated in the predetermined direction by 40.5 degrees from the first state, wherein
   the plurality of accessory-side tabs differ from each other in terms of length along the predetermined direction, and
   the restricting member is disposed at a comparatively short accessory-side tab among the plurality of accessory-side tabs.

\* \* \* \* \*